(12) United States Patent
Niimi et al.

(10) Patent No.: US 7,186,490 B1
(45) Date of Patent: *Mar. 6, 2007

(54) PHOTOSENSITIVE MATERIAL, ELECTROPHOTOGRAPHIC PHOTORECEPTOR USING THE MATERIAL, AND ELECTROPHOTOGRAPHIC IMAGE FORMING METHOD AND APPARATUS USING THE PHOTORECEPTOR

(75) Inventors: Tatsuya Niimi, Numazu (JP); Tetsuro Suzuki, Fuji (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,958

(22) Filed: May 8, 2000

(30) Foreign Application Priority Data

| May 6, 1999 | (JP) | ................... 11-125872 |
| Jun. 10, 1999 | (JP) | ................... 11-164181 |
| Oct. 21, 1999 | (JP) | ................... 11-299145 |

(51) Int. Cl.
  G03G 5/06     (2006.01)
  C09B 47/04    (2006.01)
  C09B 47/08    (2006.01)

(52) U.S. Cl. .................. 430/78; 430/59.5; 430/96; 540/140; 540/141

(58) Field of Classification Search .............. 430/56, 430/58.05, 58.8, 59.5, 78, 96, 58.65; 399/116, 399/159; 540/140, 141
See application file for complete search history.

(56) References Cited

U.S. PATENT DOCUMENTS

| 4,734,348 A * | 3/1988 | Suzuki et al. ................. 430/96 |
| 4,863,822 A * | 9/1989 | Fukagai et al. .......... 430/58.05 |
| 4,994,566 A * | 2/1991 | Mimura et al. ................ 430/78 |
| 5,028,502 A * | 7/1991 | Yuh et al. ...................... 430/31 |
| 5,213,929 A * | 5/1993 | Takano et al. ................ 430/78 |
| 5,215,840 A * | 6/1993 | Itami et al. ................. 430/59.5 |
| 5,298,353 A * | 3/1994 | Ohmori ....................... 430/78 |
| 5,409,792 A * | 4/1995 | Yanus et al. ............... 430/58.6 |
| 5,430,526 A * | 7/1995 | Ohkubo et al. |
| 5,547,790 A | 8/1996 | Umeda et al. |
| 5,595,846 A * | 1/1997 | Shigematsu et al. .......... 430/78 |
| 5,618,645 A * | 4/1997 | Nakano et al. ............... 430/56 |
| 5,677,094 A | 10/1997 | Umeda et al. |

(Continued)

FOREIGN PATENT DOCUMENTS

EP    0384470 A2 *  8/1990   ................. 540/141

(Continued)

OTHER PUBLICATIONS

Japanese Patent Office English-Language Translation of JP 11-140337 (Pub. May 1999).*

(Continued)

*Primary Examiner*—Janis L. Dote
(74) *Attorney, Agent, or Firm*—Oblon, Spivak, McClelland, Maier & Neustadt, P.C.

(57) ABSTRACT

A titanyl phthalocyanine crystal having an X-ray diffraction spectrum having a plurality of diffraction peaks in which a maximum diffraction peak is observed at a Bragg ($2\theta$) angle of $27.2°\pm0.2°$ and a diffraction peak is observed at a lowest Bragg ($2\theta$) angle of $7.3°\pm0.2°$ when a specific X-ray of Cu—K$\alpha$ having a wavelength of 1.514 Å irradiates the titanyl phthalocyanine crystal. A photoreceptor having a photosensitive layer including the titanyl phthalocyanine crystal is also provided.

14 Claims, 12 Drawing Sheets

U.S. PATENT DOCUMENTS

| | | | | |
|---|---|---|---|---|
| 5,804,343 | A | | 9/1998 | Umeda et al. ................ 430/96 |
| 5,804,344 | A | * | 9/1998 | Mitsumori ................ 430/58.5 |
| 5,853,935 | A | | 12/1998 | Suzuki et al. ................ 430/83 |
| 5,871,876 | A | | 2/1999 | Ikuno et al. ................ 430/96 |
| 6,087,055 | A | | 7/2000 | Niimi ................ 430/58.7 |
| 6,132,911 | A | | 10/2000 | Niimi ................ 430/58.7 |
| 6,218,533 | B1 | | 4/2001 | Niimi ................ 540/140 |
| 6,284,420 | B1 | * | 9/2001 | Liu et al. ................ 430/59.5 |
| 6,326,112 | B1 | | 12/2001 | Tamura et al. ............ 430/58.7 |
| 7,029,810 | B2 | * | 4/2006 | Toda et al. ................ 430/58.7 |

FOREIGN PATENT DOCUMENTS

| | | | |
|---|---|---|---|
| JP | 2-28265 | * | 1/1990 |
| JP | 11-140337 | * | 5/1999 |

OTHER PUBLICATIONS

Ladd, M.F.C. et al, Structure Determination by X-Ray Crystallography, Plenum Press, NY (1985), pp. 424-426.*

US Patent & Trademark Office English-Language Translation of JP 11-140337 (pub. May 25, 1999).*

Derwent Abstract Acc. No. 1989-302238 describing JP 02-028265, published Jan. 31, 2000.*

Diamond, A.S., ed., Handbook of Imaging Materials, Marcel Dekker, Inc., NY (1991), pp. 396-397.*

Patent Abstracts of Japan; Publication No. 02028265 A; Publication Date Jan. 30, 1990; Mimura Yoshikazu, et al.; Filed Mar. 15, 1989; Application No. 01064801.

Patent Abstracts of Japan; Publication No. 02008256 A; Publication Date Jan. 11, 1990; Suzuki Tetsuyoshi, et al. Filed Nov. 5, 1988; Application No. 63279663.

Patent Abstracts of Japan; Publication No. 01299874 A; Publication Date Dec. 4, 1989; Enokida Toshio; Filed May 26, 1988; Application No. 63129327.

Patent Abstracts of Japan; Publication No. 03035064 A; Publication Date Feb. 15, 1991; Kinoshita Akira, et al.; Filed Jun. 30, 1989; Application No. 01170355.

Patent Abstracts of Japan; Publication No. 03035245 A, Publication Date Feb. 15, 1991; Kinoshita Akira, et al.; Filed Jun. 30, 1989; Application No. 01170360.

Patent Abstracts of Japan; Publication No. 03037669 A, Publication Date Feb. 19, 1991; Oda Yasuhiro, et al.; Filed Jul. 4, 1989; Application No. 01173733.

Patent Abstracts of Japan; Publication No. 03269064 A; Publication Date Nov. 29, 1991; Tokia Akihiko, et al.; Filed Mar. 20, 1990; Application No. 02068089.

Patent Abstracts of Japan; Publication No. 07319179 A; Publication Date Dec. 8, 1995; Yamazaki Kazuo, et al.; Filed May 27, 1994; Application No. 06136636.

Patent Abstracts of Japan; Publication No. 57148745 A; Publication Date Sep. 14, 1982; Hiratsuka Hiroaki, et al.; Filed Mar. 11, 1981; Application No. 56033977.

Patent Abstracts of Japan; Publication No. 59036254 A; Publication Date Feb. 28, 1984; Nakarai Toyoaki, et al.; Filed Aug. 23, 1982; Application No. 57146538.

Patent Abstracts of Japan; Publication No. 59044054 A; Publication Date Mar. 12, 1984; Nishioka Yoichi, et al.; Filed Sep. 6, 1982; Application No. 57153982.

Patent Abstracts of Japan; Publication No. 59031965 A; Publication Date Feb. 21, 1984; Nakarai Toyoaki, et al.; Filed Aug. 16, 1982; Application No. 57142458.

Patent Abstracts of Japan; Publication No. 61239248 A; Publication Date Oct. 24, 1986; Oaku Kenichi, et al.; Filed Apr. 16, 1985; Application No. 60079240.

Patent Abstracts of Japan; Publication No. 62067094 A; Publication Date Mar. 26, 1987; Suzuki Tetsuyoshi, et al.; Filed Sep. 18, 1985; Application No. 60205541.

Patent Abstracts of Japan; Publication No. 59049544 A; Publication Date Mar. 22, 1984; Nogami Sumitaka, et al.; Filed Sep. 16, 1982; Application No. 57159469.

Patent Abstracts of Japan; Publication No. 59166959 A; Publication Date Sep. 20, 1984; Matsuura Taketoshi, et al.; Filed Mar. 14, 1983; Application No. 58040798.

Patent Abstracts of Japan; Publication No. 63000366 A; Publication Date Jan. 5, 1988; Takagishi Iwao; Filed Jun. 19, 1986; Application No. 61143445.

Patent Abstracts of Japan; Publication No. 63116158 A; Publication Date May 20, 1988; Enokida Toshio, et al. Filed Nov. 5, 1987; Application No. 61262030.

Patent Abstracts of Japan; Publication No. 63196067 A; Publication Date Aug. 15, 1988; Taguchi Kenji, et al. Filed Feb. 10, 1987; Application No. 62027155.

Patent Abstracts of Japan; Publication No. 01017066 A; Publication Date Jan. 20, 1989; Fujimaki Yoshihide, et al.; Filed Jul. 10, 1987; Application No. 62173640.

Fujimaki, et al., "High Photosensitivity of an Organic Photoreceptor", IS&T's Seventh International Congress on Advances in Non-Impact Printing Technologies, Oct. 6-11, 1991, vol. One, pp. 269-275.

U.S. Appl. No. 09/734,718, filed Dec. 13, 2000.

Pending U.S. Appl. No. 09/796,470, filed Mar. 2, 2001.

U.S. Appl. No. 09/817,151, filed Mar. 27, 2001.

Pending U.S. Appl. No. 09/903,718, filed Jul. 13, 2001.

U.S. Appl. No. 09/942,574, filed Aug. 31, 2001.

Pending U.S. Appl. No. 09/985,347, filed Nov. 2, 2001.

Pending U.S. Appl. No. 09/985,368, filed Nov. 2, 2001.

Pending U.S. Appl. No. 09/985,348, filed Nov. 2, 2001.

Pending U.S. Appl. No. 09/985,375, filed Nov. 2, 2001.

Pending U.S. Appl. No. 10/020,925, filed Dec. 19, 2001.

Pending U.S. Appl. No. 10/205,413, filed Jul. 26, 2002.

Fujimaki, et al., "High Photosensitivity of an Organic Photreceptor", IS&T's Seventh International Congress on Advances in Non-Impact Printing Technologies, Oct. 6-11, 1991, vol. One, pp. 269-275.

U.S. Appl. No. 10/804,067, filed Mar. 19, 2004, Toda et al.

U.S. Appl. No. 10/927,050, filed Aug. 27, 2004, Niimi et al.

U.S. Appl. No. 10/944,614, filed Sep. 20, 2004, Niimi et al.

U.S. Appl. No. 10/665,155, filed Sep. 22, 2003, Toda et al.

U.S. Appl. No. 11/219,886, filed Sep. 7, 2005, Niimi et al.

U.S. Appl. No. 11/332,545, filed Jan. 17, 2006, Tamoto et al.

U.S. Appl. No. 11/367,786, filed Mar. 6, 2006, Ohta et al.

U.S. Appl. No. 11/364,325, filed Mar. 1, 2006, Niimi.

U.S. Appl. No. 11/474,258, filed Jun. 26, 2006, Niimi.

* cited by examiner

Present Application Invention Crystal

Comparative Synthesis Example in Methanol

Comparative Synthesis Example in Aniline

PHOTOSENSITIVE MATERIAL, ELECTROPHOTOGRAPHIC PHOTORECEPTOR USING THE MATERIAL, AND ELECTROPHOTOGRAPHIC IMAGE FORMING METHOD AND APPARATUS USING THE PHOTORECEPTOR

BACKGROUND OF THE INVENTION

1. Field of the Invention

The present invention relates to a photosensitive material, a coating dispersion including the photosensitive material, and an electrophotographic photoreceptor using the photosensitive material. In addition, the present invention relates to an electrophotographic image forming method, process cartridge and apparatus using the electrophotographic photoreceptor.

2. Discussion of the Background

Recently the growth of electrophotographic information processing apparatus (hereinafter image forming apparatus) such as copiers, printers and facsimiles is remarkable. In particular, photo-printers capable of recording digital information using light have been drastically improving in recording qualities and reliability. This digital recording technique is applied to copiers as well as photo-printers. The digital copiers to which this digital technique is applied have various image forming functions. Therefore it is considered that the demand for the digital copiers increases more and more.

At the present time, laser diodes (LDs) and light emitting diodes (LEDs) are used as light sources for the photo-printers because of being small in size, and having a relatively low cost and good reliability. The LEDs which are typically used for the photo-printers emit light having a wavelength of 660 nm. The LDs which are typically used for the photo-printers emit near infrared light. Therefore, a need exists for a photoreceptor having high sensitivities over a wavelength range including the visible region and the near infrared region.

The wavelength range over which an electrophotographic photoreceptor has sensitivity almost equal to the wavelength range over which the charge generation material used in the photoreceptor has photosensitivity. Therefore, various kinds of materials, such as azo type pigments, polycyclic quinone type pigments, trigonal system selenium, phthalocyanine pigments and the like, have been developed for the charge generation materials.

Among these pigments, titanyl phthalocyanine (hereinafter sometimes referred to as TiOPc), which has been disclosed in Japanese Laid-Open Patent Publications Nos. 3-35064, 3-35245, 3-37669, 3-269064 and 7-319179, is very useful for a photoreceptor for image forming apparatus such as printers and copiers, which use an LED or LD as a light source. This is because titanyl phthalocyanine is sensitive to light having a relatively long wavelength of from 600 to 800 nm.

A photoreceptor used for electrophotography such as Carlson process and the like processes is required to have the following charge properties as well as the high sensitivity to the specific light mentioned above:

(1) good charging ability such that a high electric potential can be formed and maintained in a dark place;

(2) good charge decaying ability such that the electric potential previously formed on the photoreceptor rapidly decays and the residual potential is low when the photoreceptor is exposed to light; and (3) good charge stability such that the photoreceptor can maintain a good charging ability and a good charge decaying ability even when the photoreceptor is used for a long time.

In particulars in high sensitive photoreceptors such as photoreceptors including TiOPc, the charging ability thereof tends to deteriorate and the residual potential tends to increase when the photoreceptors are repeatedly used. Namely, the photoreceptors including TiOPc have an insufficient charge stability. Therefore, a need exists for a photoreceptor including TiOPc, which has good charge stability.

On the other hand, charging methods using a charging roller have been proposed to decrease the amount of ozone and NOx generated and to save charging energy. In the charging methods, the charging roller charges a photoreceptor while contacting the surface of the photoreceptor, or being close to the surface of the photoreceptor. It is certain that when a charging roller is used, the amount of ozone and NOx generated and the voltage applied to the charging roller can be decreased compared to the case using an indirect charging device such as scorotrons. However, a problem of breakdown of the photoreceptor tends to occur. The reason of the breakdown is not known yet. However, it is considered that the breakdown tends to occur because discharging is performed in a narrow gap between the photoreceptor and the charging roller. Effective solutions of this breakdown have not yet been proposed.

The methods for synthesizing TiOPc and the electrophotographic properties of TiOPc have been disclosed in Japanese Laid-Open Patent Publications Nos. 57-148745, 59-36254, 59-44054, 59-31965, etc. In addition, various crystal forms are known with respect to TiOPc, and Japanese Laid-Open Patent Publications Nos. 59-49544, 59-166959, 61-239248, 62-67094, 63-366, 63-116158, 63-196067, 64-17066 etc. have disclosed TiOPcs having a different crystal form.

The TiOPc crystal disclosed in Japanese Laid-Open Patent Publication No. 61-239248 has good electroconductivity, and therefore, the photoreceptor which includes only the TiOPc crystal as the charge generation material has good photosensitivity. However, the photoreceptor has a large charge decay in a dark place. In addition, the charging ability of the photoreceptor deteriorates when the photoreceptor is repeatedly used.

Such problems occur even when the TiOPc crystal having an X-ray diffraction spectrum such that a diffraction peak is observed at a Bragg ($2\theta$) angle of 7.5° is used together with another TiOPc crystal, for example, having a peak at an angle of 27.2°.

When a photoreceptor is improved so that image defects mentioned above are not produced, the life of the photoreceptor mainly depends on the abrasion amount of the photosensitive layer thereof. In a conventional charge transport layer in which a low-molecular-weight charge transport material in a molecular state are dispersed in an inactive polymer, it is needed to increase the concentration of the charge transport material to increase mobility of the charge transport material. When the concentration of the charge transport material increases, the abrasion resistance of the charge transport layer deteriorates.

To improve the abrasion resistance, a charge transport polymer, in which a group having a charge transport function is incorporated in a polymer, is used in the charge transport layer. The photoreceptor including a charge transport polymer has relatively good abrasion resistance compared to the photoreceptor including a low-molecular-weight charge transport material. In addition, a group having a charge transport function can be included in a polymer at a high concentration, and therefore a charge transport layer having high mobility can be prepared. However, charge transport polymers generally have a relatively large gas permeability compared to the photoreceptor including a low-molecular-weight charge transport material because the group having a charge transport function is typically bulky. Therefore, the photoreceptor including a charge transport polymer has poor resistance to gases. Therefore, problems caused by ozone and the like gases tend to occur when the photoreceptor is used for a long time.

Because of these reasons, a need exists for a photoreceptor having high sensitivity, good charge stability and good resistance to gases.

SUMMARY OF THE INVENTION

Accordingly, an object of the present invention is to provide a photosensitive material which has high photosensitivity and good charge stability even when repeatedly used for a long time.

Another object of the present invention is to provide a coating dispersion useful for manufacturing a photoreceptor having high sensitivity and good charge stability when used for a long time.

Yet another object of the present invention is to provide a photoreceptor which has good resistance to gases and high sensitivity and which has good charge stability such that good charging ability and charge decaying ability can be maintained even when the photoreceptor is repeatedly used for a long time.

Still another object of the present invention is to provide an electrophotographic image forming method, process cartridge and apparatus in which good images can be stably produced at a high speed without hardly causing breakdown of the photoreceptor even when images are repeatedly produced for a long time.

To achieve these objects, the present invention contemplates the provision of a titanyl phthalocyanine crystal which has an X-ray diffraction spectrum having a plurality of diffraction peaks in which a maximum diffraction peak is observed at a Bragg (2θ) angle of 27.2°±0.2° and a diffraction peak is observed at a lowest Bragg (2θ) angle of 7.3°±0.2° when a specific X-ray of Cu—Kα (wavelength of 1.542 Å) irradiates the titanyl phthalocyanine crystal.

The titanyl phthalocyanine crystal preferably has another diffraction peak at a Bragg (2θ) angle of 9.4°±0.2°, wherein there is preferably no peak between the peak at an angle of 7.3° and the peak at an angle of 9.4°.

The titanyl phthalocyanine crystal may have no peak from 25.5±0.2° to the maximum diffraction peak at a Bragg (2θ) angle of 27.2±0.2°.

The titanyl phthalocyanine crystal is preferably synthesized without using a halogenated titanium. In addition, the titanyl phthalocyanine is preferably prepared by changing the crystal form of a titanyl phthalocyanine having an amorphous crystal form in an organic solvent including water.

In another aspect of the present invention, a coating dispersion useful for manufacturing an electrophotographic photoreceptor is provided in which the titanyl phthalocyanine crystal of the present invention mentioned above is dispersed in a solvent.

The solvent preferably includes a solvent selected from the group consisting of ketone-type and ester-type organic solvents. In addition, the dispersion preferably includes a polyvinyl acetal resin having a vinyl acetate unit ratio not less than 4% by mole as a binder resin.

In yet another aspect of the present invention, an electrophotographic photoreceptor is provided which has a photosensitive layer which includes a charge generation material and a charge transport material and which is formed overlying an electroconductive substrate, wherein the charge generation material includes the titanyl phthalocyanine crystal of the present invention.

The photosensitive layer preferably includes a polyvinyl acetal resin having a vinyl acetate unit ratio not less than 4% by mole as a binder resin. In addition, the photosensitive layer preferably has an absorption spectrum such that an absorption peak is observed at a wavelength not greater than 810 nm.

In a further aspect of the present invention, an electrophotographic image forming method is provided which uses the photoreceptor of the present invention mentioned above.

In a still further aspect of the present invention, an electrophotographic image forming apparatus is provided which includes the photoreceptor of the present invention mentioned above. A process cartridge including at least the photoreceptor may be used for the image forming apparatus.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like of corresponding parts throughout and wherein.

DESCRIPTION OF THE PREFERRED EMBODIMENTS

Figure 1:
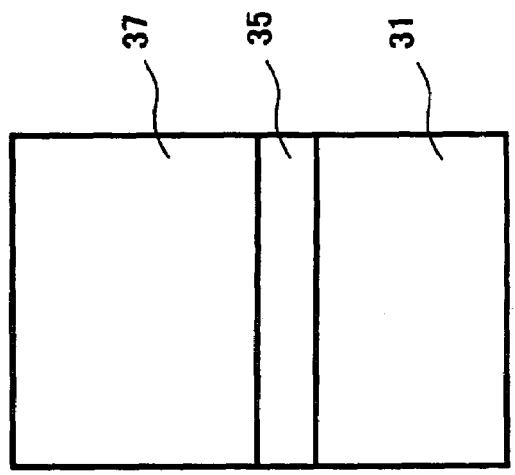
FIG. 1 is a schematic cross-sectional view of an embodiment of the electrophotographic photoreceptor of the present invention.

The structure of the titanyl phthalocyanine crystal of the present invention is as follows:

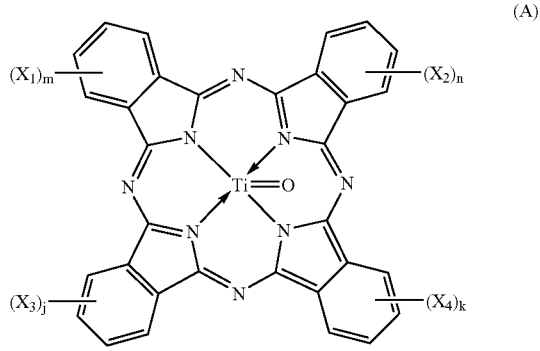

(A)

wherein X1, X2, X3 and X4 independently represent a halogen atom, and n, m, j and k are independently 0 or an integer of from 1 to 4.

The TiOPc crystal of the present invention has at least diffraction peaks at Bragg (2θ) angles of 7.3° and 27.2°. It is not clarified whether a TiOPc crystal having the peak of 27.2° also has the peak of 7.3°, or both a TiOPc crystal having the peak of 27.2° and a TiOPc crystal having the peak of 7.3° are present therein. However, it is clarified by the experiment mentioned below that the TiOPc crystal of the present invention is different from the TiOPc crystal disclosed in Japanese Laid-Open Patent Publication No. 61-239248. In addition, when the TiOPc crystal of the present invention is used for a photoreceptor, such problems mentioned above (i.e., deterioration of the charging ability, and large charge decay in a dark place) do not arise. Therefore, the present invention is different from the known TiOPc crystals.

As mentioned above, digital image forming apparatus such as copiers, printers and facsimiles are increasing more and more. The monochrome documents produced by these digital image forming apparatus typically have an image ratio not greater than 10%. In addition, light such as LDs and LEDs, which irradiates the photoreceptors of the apparatus to form latent images, has a high power. When such light irradiates the photoreceptors for a long time, the photoreceptors are fatigued by the light. Therefore, a nega-posi developing method is typically used for the digital image forming apparatus. Namely, a charged photoreceptor is exposed to light image (i.e., an image area is light and a background area is dark) to form a latent image in which the image area to be developed has a relatively low potential compared to the background area. Then the latent image is developed with a toner having a charge whose polarity is the same as that of the charge formed on the background area of the photoreceptor. Thus, the toner, which is repulsed by the charge on the background area, is formed on the image area, resulting in formation of toner images.

In the nega-posi developing method, a portion of surface of the photoreceptor, which has a relatively low potential, attracts the toner, resulting in formation of background fouling or black spots. These image defects sometimes result in fatal errors in documents such as drawings and English documents because the black spots tend to be considered to be a point or a period. When the photoreceptor of the present invention is used, these image defects can be reduced even though the TiOPc crystal of the present invention has an X-ray diffraction spectrum slightly different from those of the conventional TiOPcs crystals.

When a charging roller is used as a charger of electrophotographic image forming apparatus, these image defects are observed more frequently than the apparatus using a non-contact charger. Therefore, the photoreceptor has a relatively short life when a charging roller is used. The present inventors have examined the relationship between the crystal form of TiOPc used in a photoreceptor and the image qualities of images when the photoreceptor is repeatedly used. As a result of the examination, it is found that the TiOPc crystal of the present invention (i.e., TiOPc having the specific X-ray diffraction spectrum mentioned above) is used in a photoreceptor, these image defects can be considerably improved even when the photoreceptor is repeatedly used.

TiOPcs are typically prepared by the following method:

(1) a TiOPc pigment is synthesized in a solvent;

(2) the synthesized pigment is washed with a solvent;

(3) the pigment is refined by, for example, recrystallization; and (4) the crystal form of the refined pigment is changed, if desired.

These operations are performed while the pigment is dispersed in a liquid. The thus prepared dispersion including a pigment is filtered or centrifuged to prepare a wet cake of the pigment, and then the wet cake is dried to prepare a powder of the TiOPc crystal.

The TiOPc crystal of the present invention can be prepared by changing the synthesizing conditions, and/or washing/refining conditions, for example, by changing a solvent and the like. Alternatively, the crystal form can be changed in the crystal changing process to prepare the TiOPc crystal of the present invention. For example, the following methods can be used for the crystal changing process:

(1) the solvent of a liquid including a TiOPc pigment is changed;

(2) a liquid including a TiOPc pigment is subjected to a mechanical treatment under load conditions; or (3) a sulfuric acid pasting method in which TiOPc having an amorphous crystal form, which is prepared by dissolving titanyl phthalocyanine in sulfuric acid and then adding the solution into water, is subjected to a crystal changing process in which the TiOPc pigment having an amorphous form is contacted with an organic solvent in the presence of water.

Among these methods, the method (3) is preferably used for preparing the TiOPc crystal of the present invention. In particular, the TiOPc crystal of the present invention is preferably prepared by changing the crystal form of a TiOPc pigment which has an amorphous form and which has an X-diffraction spectrum in which a maximum peak is observed at an angle of from 7.0° to 7.5°. In addition, the half width of the maximum peak is preferably not less than 1°.

Suitable solvents for use in the crystal form changing process include any organic solvents which can produce a TiOPc having a desired crystal form when used in the crystal changing process. In particular, the solvent preferably includes one or more solvents selected from the group consisting of tetrahydrofuran, cyclohexanone, toluene, methylene chloride, carbon disulfide, o-dichlorobenzene, and 1,1,2-trichloroethane.

The TiOPc crystal of the present invention has poor reactivity with reactive gases by itself, and therefore the photoreceptor using the TiOPc crystal has good resistance to gases. When the TiOPc crystal is used in combination with a charge transport polymer, a photoreceptor having good charging ability and good abrasion resistance can be provided. Such a good photoreceptor cannot be provided by using either the TiOPc crystal or the charge transport polymer.

The TiOPc crystal of the present invention has good carrier generation ability. However, the carrier generation ability of the TiOPc crystal is sometimes deteriorated (i.e., the photosensitivity deteriorates or the residual potential increases when repeatedly used) by the charge transport material used in combination therewith depending on the species of the charge transport material. As a result of examination of the present inventor, it is found that the good carrier generation ability can be exerted when the TiOPc crystal is used together with a charge transport material having a specific mobility. In the photoreceptor of the present invention, the mobility of the charge transport material is preferably not less than $1 \times 10^{-5}$ cm$^2$/V·sec at a field strength at which a light image is formed on the photoreceptor in an image forming apparatus.

Various methods are known for synthesizing TiOPcs. The characteristics of the resultant TiOPc crystals change depending on the manufacturing methods. Among the methods, a TiOPc manufactured by a method using a halogenated titanium has poor charge properties when repeatedly used for a long time. Therefore, it is preferable to synthesize a TiOPc crystal by a method without using a halogenated titanium as a raw material. Namely, it is preferable to use a synthesizing method using, for example, an organic titanium compound and the like compound as a raw material.

In the present invention, the X-ray diffraction spectrum of a TiOPc crystal can be obtained using a marketed X-ray diffractometer.

In the present invention, the peak intensity of a peak in the X-ray diffraction spectrum at a Bragg (2θ) angle of, for example, 7.3°, 27.2° and 28.6° is determined as follows:
(1) an X-ray diffraction spectrum is obtained;
(2) the base line of the spectrum is corrected; and
(3) the peak intensity of a peak is defined as the height of the peak from the base line.

The peak ratio is defined as the ratio of the peak intensity of a peak to the peak intensity of another peak.

Then the dispersion of the present invention in which the TiOPc crystal of the present invention is dispersed in a dispersion medium and which is used for manufacturing the photoreceptor of the present invention will be explained.

As a dispersion medium, any known solvents can be used as long as the solvents do not change the crystal form of the TiOPc crystal of the present invention. In particular, ketone type solvents or ester type solvents are preferably used.

Specific examples of the ketone type solvents include acetone, methyl ethyl ketone, 2-pentanone, 3-pentanone, 2-hexanone, 2-methyl-4-pentanone, 2-heptanone, isophorone, cyclohexanone, methylcyclohexanone, acetophenone, and the like solvents. Specific examples of the ester type solvents include ethyl formate, propyl formate, butyl formate, methyl acetate, ethyl acetate, propyl acetate, butyl acetate, ethyl propionate, butyl propionate and the like. These solvents are used alone or in combination.

Then a binder resin for use in the dispersion of the present invention will be explained.

As a binder resin, any known resins can be used as long as the resins can make the dispersion stable and do not deteriorates the electrophotographic properties of the resultant photoreceptor.

Among these resins, polyvinyl acetal resins are preferably used. Polyvinyl acetal has the following formula:

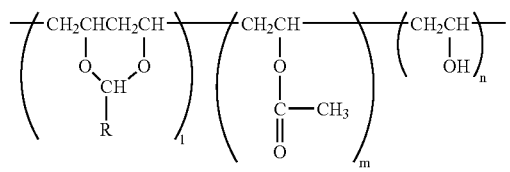

Among the polyvinyl acetal resins, polyvinyl butyral resins having a formula in which the group R in the formula is a propyl group are preferably used. In particular, polyvinyl acetal resins having a vinyl acetate unit ratio not less than 4% by mole are preferable. At this point, the vinyl acetate unit ratio is defined as the mole fraction of the vinyl acetate repeating unit in a polyvinyl acetal resin. Namely, the vinyl acetate unit ratio is represented as (m)/(l+m+n). These resins are employed alone or in combination. In addition, one or more other resins may be used in combination with these polyvinyl acetal resins.

The mobility of the charge transport layer can be measured by a time-of-flight method, a xerographic method or the like method.

When the mobility is measured with respect to a wide field strength range, a time-of-flight method or a Xerographic method can be used. The time-of-flight method is typically used because the mobility can be measured in a wide range of field strength. The time-of-flight method is as follows:
(1) a charge transport layer to be measured is sandwiched with electrodes, at least one of which is transparent;
(2) the charge transport layer is exposed to pulsed exciting light, which has a relatively short-wavelength, such as nitrogen laser light so that the charge transport material is excited and generates carriers; and
(3) the mobility of the carriers generated is measured.

Hereinafter, the electrophotographic photoreceptor of the present invention will be explained referring to drawings.

Figure 2:
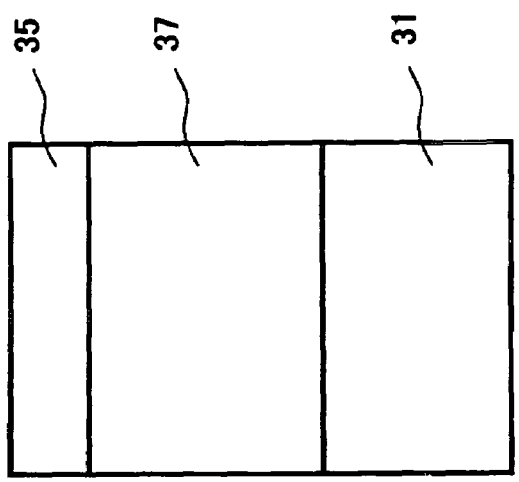
FIG. 2 is a schematic cross-sectional view of another embodiment of the electrophotographic photoreceptor of the present invention.

FIGS. 1 and 2 are schematic views illustrating cross sections of embodiments of the multi-layer type electrophotographic photoreceptor of the present invention. The photoreceptor as shown in FIG. 1 has a multi-layer structure in which a charge generation layer 35 which includes a charge generating material as a main component is formed on an electroconductive substrate 31, and a charge transport layer 37 which includes a charge transport material as a main component is formed on the charge generation layer 35. FIG. 2 illustrates another embodiment of the multi-layer photoreceptor in which a charge generation layer 35 is formed on a charge transport layer 37.

Suitable materials for use as the electroconductive substrate 31 include materials having a volume resistance not greater than $10^{10}$ Ωcm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is deposited or sputtered. In addition, a tube can also be used as the substrate 31 which is prepared by tubing a plate of a metal such as aluminum, aluminum alloys, nickel, stainless steel and the like or tubing by a method such as impact ironing or direct ironing, and then treating the surface of the tube by cutting, super finishing, polishing and the like. Further, endless belts of a metal such as nickel, stainless steel and the like, which have been disclosed, for example, in Japanese Laid-Open Patent Publication No. 52-36016, can also be used as the substrate 31.

Furthermore, substrates, in which a coating liquid including a binder resin and an electroconductive powder is coated on the supporters mentioned above, can be used as the substrate 31. Specific examples of the electroconductive powder include carbon black, acetylene black, powders of metals such as aluminum, nickel, iron, nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like.

The electroconductive layer can be formed by coating a coating liquid in which an electroconductive powder and a binder resin are dispersed or dissolved in a proper solvent such as tetrahydrofuran, dichloromethane, methyl ethyl ketone, toluene and the like, and then drying the coated liquid.

In addition, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins, with an electroconductive material, are also used as the substrate 31.

Next, the photosensitive layer of the photoreceptor of the present invention will be explained.

In the present invention, the photosensitive layer may be a single-layer type photoreceptor or a multi-layer type photoreceptor.

At first, multi-layer type photoreceptors in which the charge generation layer 35 and the charge transport layer 37 are overlaid will be explained.

In the charge generation layer 35, the TiOPc crystal of the present invention having a specific X-ray diffraction spectrum is mainly included as the charge generation material.

The TiOPc is dispersed in a proper solvent, if desired together with a binder resin, using a dispersing device such as ball mills, attritors, sand mills, super sonic dispersing machines, etc., to prepare a coating liquid. The thus prepared coating liquid is coated on the substrate 31 and dried, resulting in formation of the charge generation layer 35.

Suitable binder resins, which are optionally mixed in the charge generation layer coating liquid, include polyamides, polyurethanes, epoxy resins, polyketones, polycarbonates, silicone resins, acrylic resins, polyvinyl butyral, polyvinyl formal, polyvinyl ketones, polystyrene, polysulfone, poly-N-vinylcarbazole, polyacrylamide, polyvinyl benzal, polyesters, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like resins.

Among these resins, polyvinyl acetal resins such as polyvinyl butyral resins are preferably used. In particular, polyvinyl acetal (butyral) resins having an acetylation (butyralation) degree not less than 4% by mole are more preferable. The content of the binder resin in the charge generation layer 35 is preferably from 0 to 500 parts by weight, and more preferably from 10 to 300 parts by weight, per 100 parts by weight of the charge generation material included therein.

The charge generation layer 35 may include one or more charge generation materials other than the TiOPc crystal of the present invention. Specific examples of such charge generation materials include monoazo pigments, disazo pigments, trisazo pigments, perylene pigments, perynone pigments, quinacridone pigments, quinone type condensed polycyclic compounds, squaric acid type dyes, phthalocyanine pigments other than the TiOPc of the present invention, naphthalocyanine pigments, azulenium salt type dyes, and the like pigments and dyes.

Suitable solvents for use in the charge generation layer coating liquid include isopropanol, acetone, methyl ethyl ketone, cyclohexanone, tetrahydrofuran, dioxane, ethyl cellosolve, ethyl acetate, methyl acetate, dichloromethane, dichloroethane, monochlorobenzene, cyclohexane, toluene, xylene, ligroin, and the like solvents. In particular, ketone type solvents, ester type solvents and ether type solvents are preferably used.

The charge generation layer coating liquid can be coated by a coating method such as dip coating, spray coating, bead coating, nozzle coating, spinner coating and ring coating. The thickness of the charge generation layer 35 is preferably from 0.01 to 5 μm, and more preferably from 0.1 to 2 μm.

The charge transport layer 37 includes a low molecular-weight charge transport material and an inactive polymer. The mobility of the charge transport layer is preferably not less than $1 \times 10^{-5}$ cm$^2$/V·sec when measured in a field strength which is similar to the field strength applied to the charge transport layer of the photoreceptor used in an image forming apparatus. The field strength in image forming apparatus is about $5 \times 10^5$ (V/cm).

The charge transport layer 37 can be formed by coating a charge transport layer coating liquid, which is prepared by dispersing or dissolving a charge transporting material and a binder resin in a proper solvent, on the charge generation layer 35 or on the substrate 31, and then drying the coated liquid. In addition, additives such as plasticizers, leveling agents, antioxidants and the like can be added in the coating liquid, if desired.

Suitable low-molecular-weight charge transport materials include any compounds which can impart the mobility mentioned above to the resultant charge transport layer.

Compounds having one of the following formulas (1) to (6) are preferable used as charge transport materials.

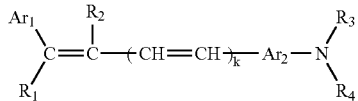

wherein R1, R2, R3 and R4 independently represent a hydrogen atom, a substituted or unsubstituted alkyl group having 1 to 5 carbon atoms, or a substituted or unsubstituted aryl group; Ar1 represents a substituted or unsubstituted aryl group, wherein R1 and Ar1 may be combined to form a ring; Ar2 represents a substituted or unsubstituted arylene group; and k is 0 or 1.

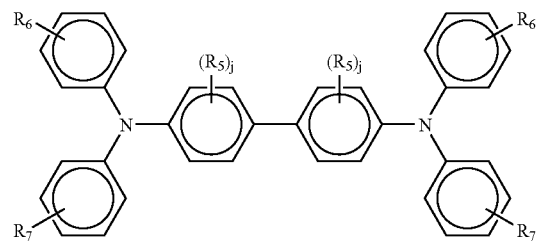

wherein R5 represents an alkyl group having 1 to 5 carbon atoms, an alkoxy group having 1 to 5 carbon atoms, or a halogen atom; R6 and R7 independently represent a hydrogen atom, an alkyl group having 1 to 5 carbon atoms, an alkoxy group having 1 to 5 carbon atoms, or a halogen atom; and j is 0 or an integer of from 1 to 4.

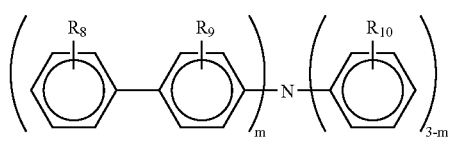

wherein R8, R9 and R10 independently represent a hydrogen atom, an amino group, an alkoxy group, a thioalkoxy group, an aryloxy group, a methylenedioxy group, a substituted or unsubstituted alkyl group, a halogen atom, or a substituted or unsubstituted aryl group; and m is an integer of from 1 to 3.

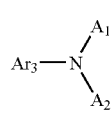

wherein A1 and A2 independently represent a substituted or unsubstituted alkyl group, or a substituted or unsubstituted aryl group; and Ar3 represents a substituted or unsubstituted condensed polycyclic hydrocarbon.

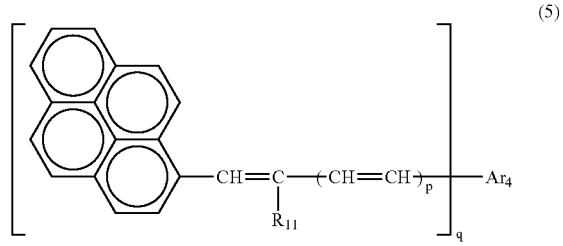

wherein Ar4 represents an aromatic hydrocarbon group; R11 represents a hydrogen atom, a substituted or unsubstituted alkyl group, or a substituted or unsubstituted aryl group; and p is 0 or 1, and q is 1 or 2, wherein when p is 0 and q is 1, Ar4 and R11 may be combined to form a ring.

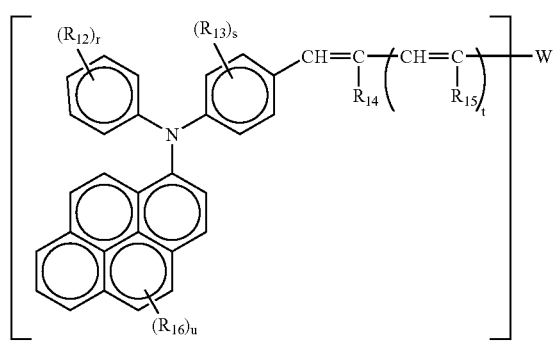

wherein R12 and R13 independently represent a hydrogen atom, a halogen atom, a nitro group, a cyano group, or a substituted or unsubstituted alkyl group; R14 and R15 independently represent a hydrogen atom, a cyano group, an alkoxycarbonyl group, or a substituted or unsubstituted alkyl group; R16 represents a hydrogen atom, an alkyl group having 1 to 5 carbon atoms, or an alkoxy group; W represents a hydrogen atom, or a substituted or unsubstituted alkyl group; r is an integer of from 1 to 5, s is an integer of from 1 to 4, t is 0 or an integer of from 1 to 2, u is an integer of from 1 to 3, and v is an integer of from 1 to 2.

These charge transport materials can be used alone or in combination.

In addition, known charge transport materials can be added to the charge transport layer. Such charge transport materials include positive-hole transport materials and electron transport materials.

Specific examples of the electron transport materials include electron accepting materials such as chloranil, bromanil, tetracyanoethylene, tetracyanoquinodimethane, 2,4,7-trinitro-9-fluorenon, 2,4,5,7-tetranitro-9-fluorenon, 2,4,5,7-tetanitroxanthone, 2,4,8-trinitrothioxanthone, 2,6,8-trinitro-4H-indeno[1,2-b]thiophene-4-one, 1,3,7-trinitrodibenzothiphene-5,5-dioxide, benzoquinone derivatives and the like.

Specific examples of the positive-hole transport materials include known materials such as poly-N-carbazole and its derivatives, poly-γ-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines, diarylamines, triarylamines, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bisstilbene derivatives, enamine derivatives, and the like.

Specific examples of the charge transport material having formula (1) are shown in Table 1.

TABLE 1

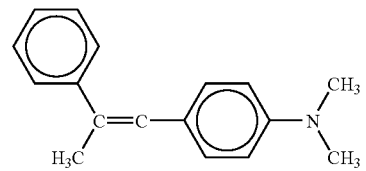

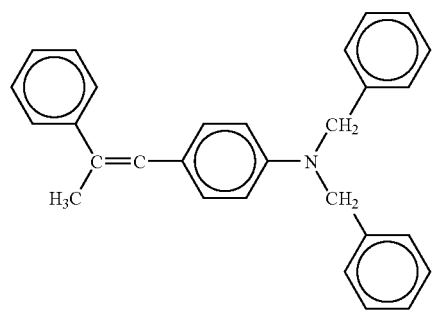

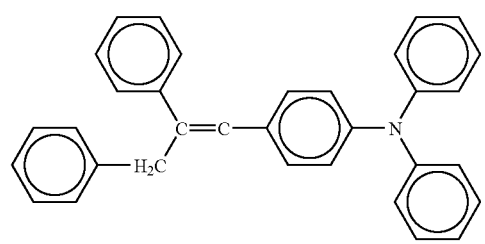

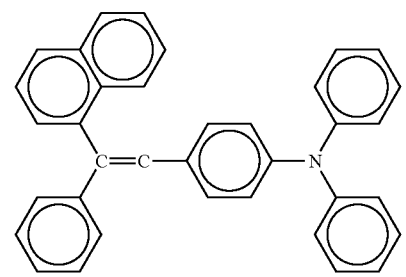

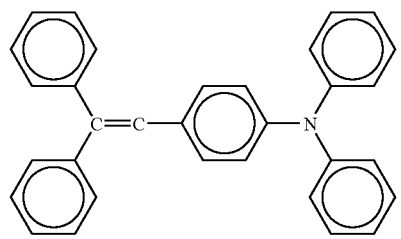

TABLE 1-continued

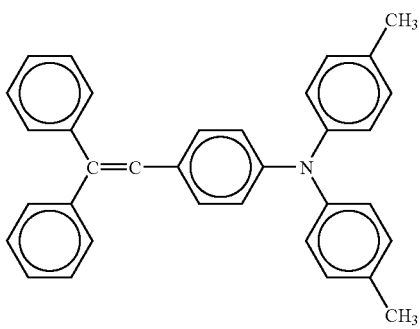

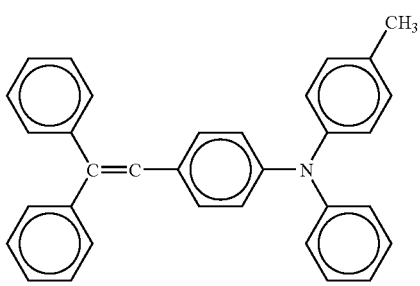

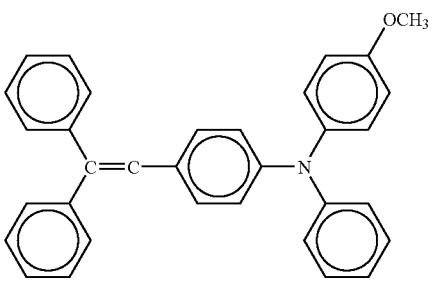

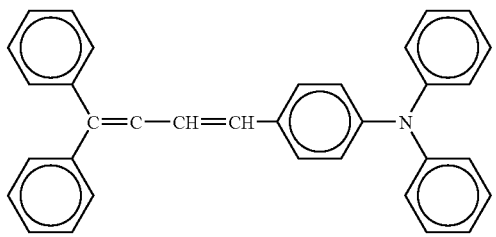

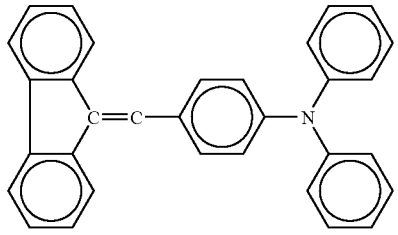

Specific examples of the charge transport material having formula (2) are shown in Table 2.
TABLE 2
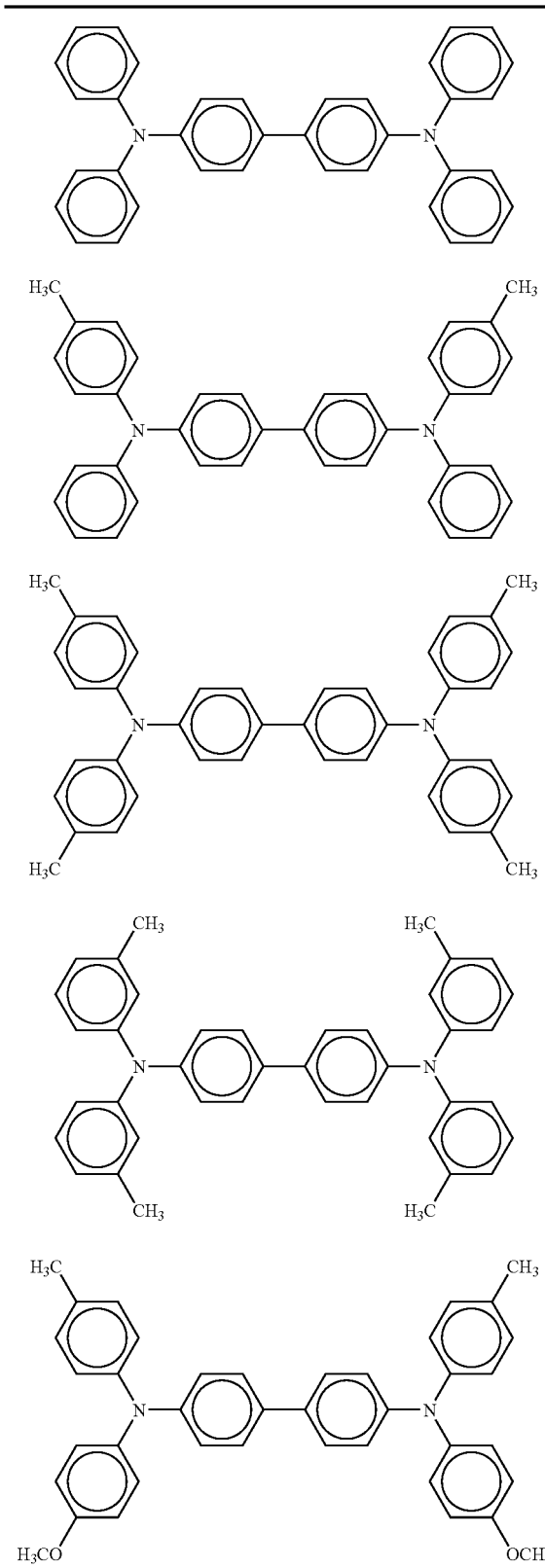
TABLE 2-continued
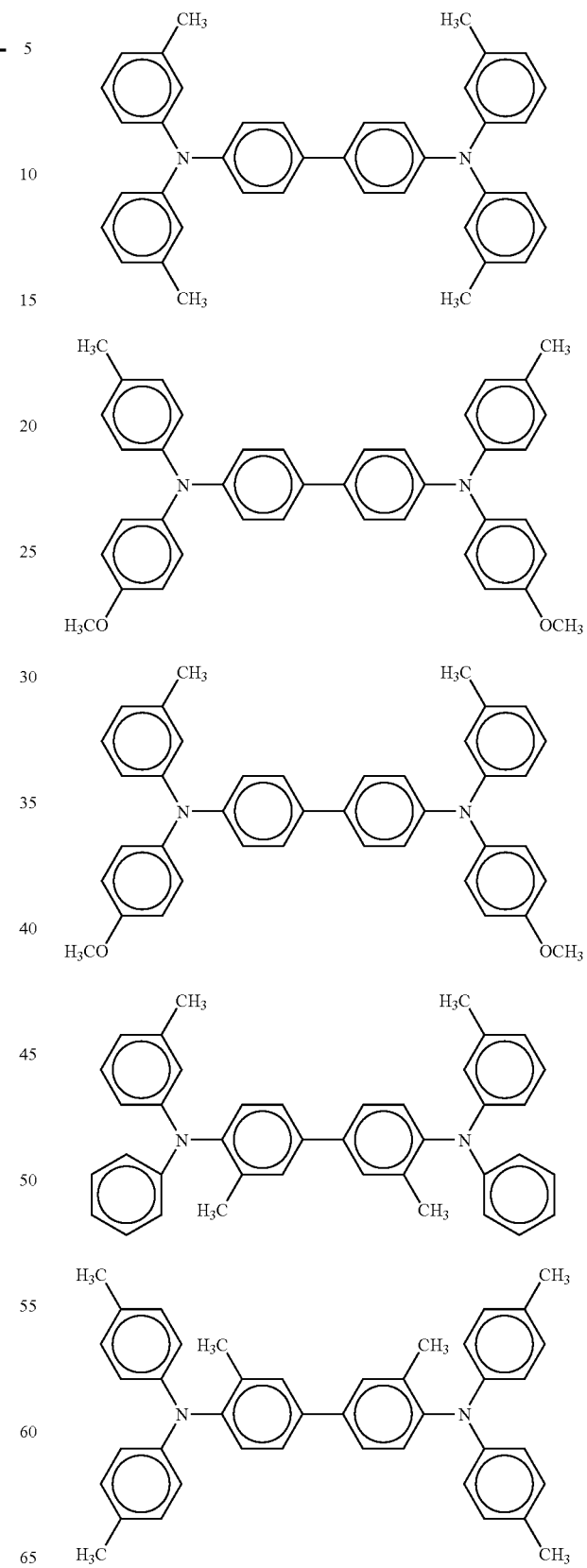

TABLE 2-continued
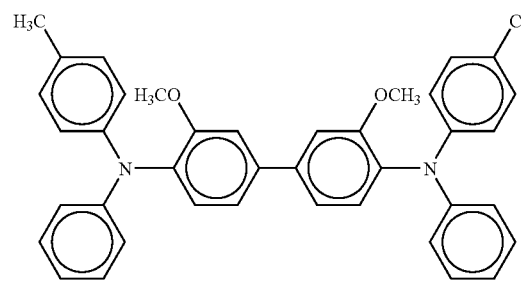
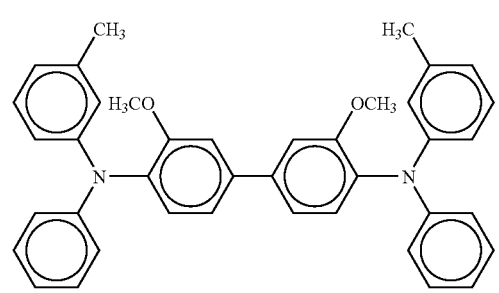
Specific examples of the charge transport material having formula (3) are shown in Table 3.
TABLE 3
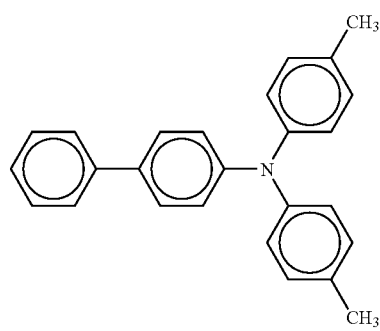
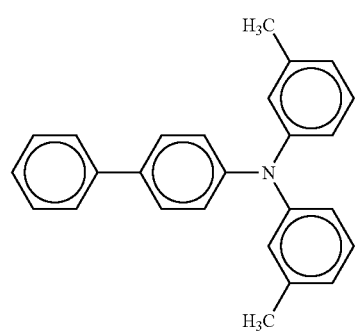
TABLE 3-continued
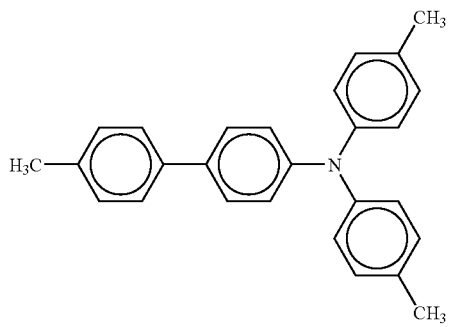
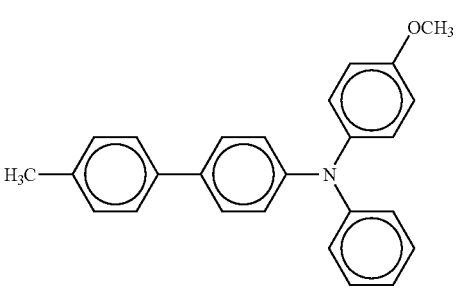
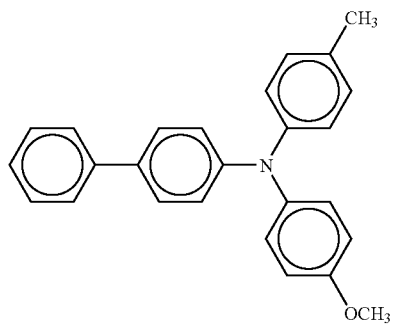
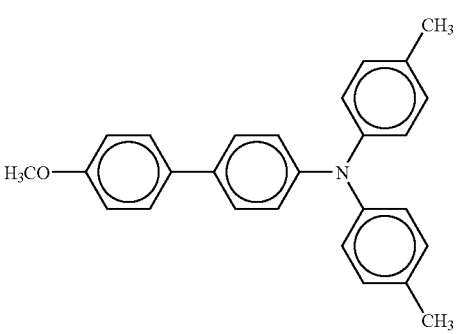

TABLE 3-continued
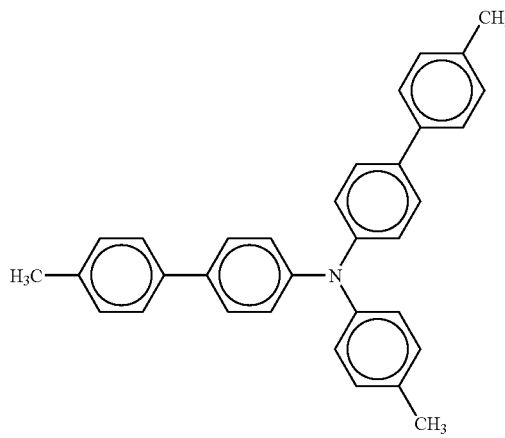
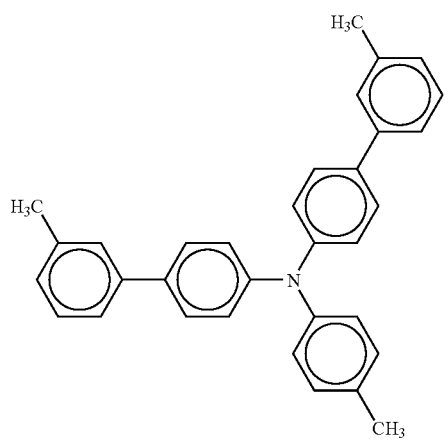
TABLE 3-continued
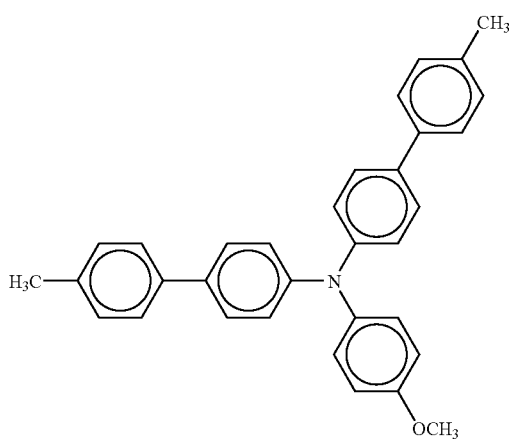
Specific examples of the charge transport material having formula (4) are shown in Table 4.
TABLE 4
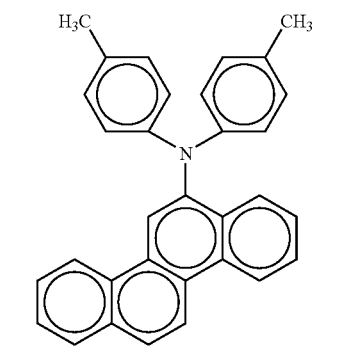
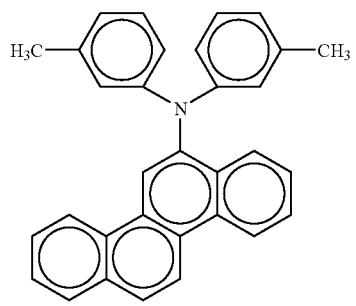
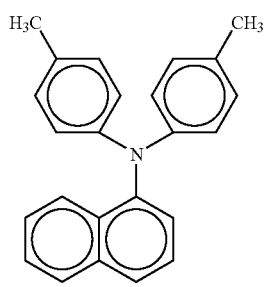

TABLE 4-continued
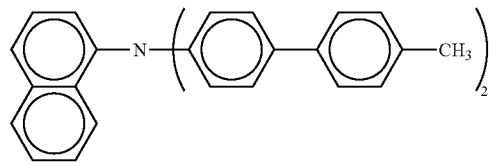
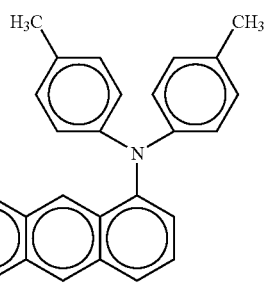
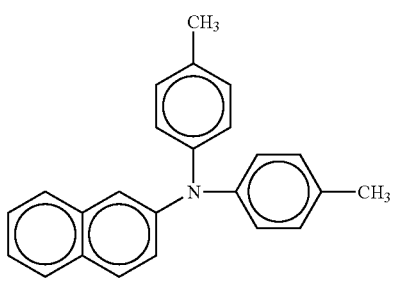
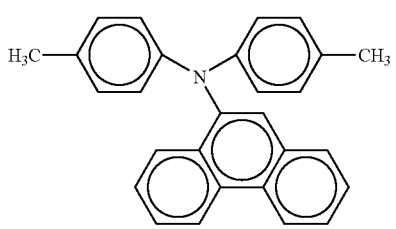
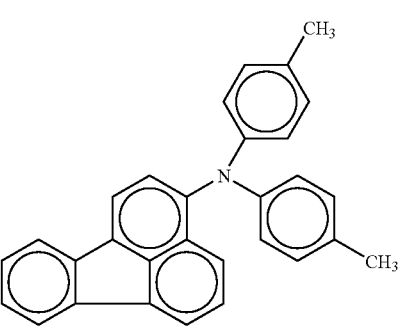
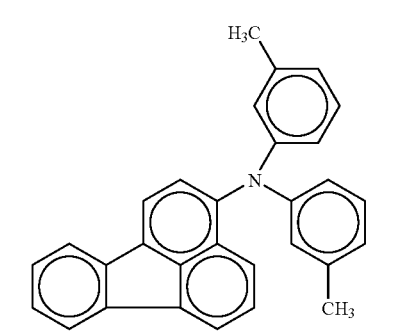
TABLE 4-continued
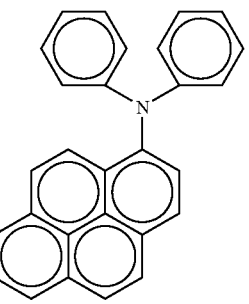
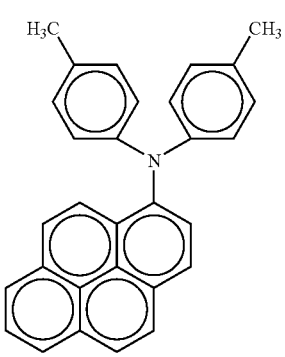
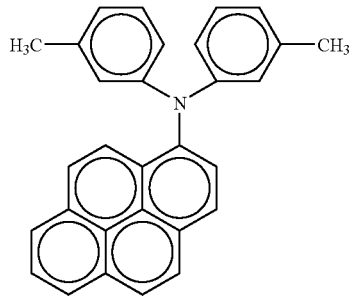
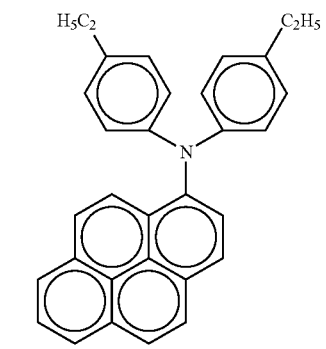

TABLE 4-continued
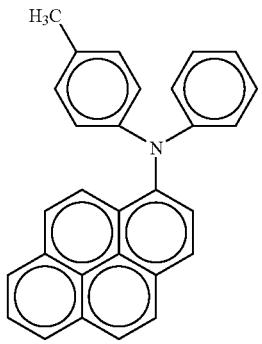
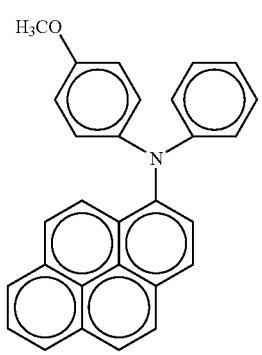
TABLE 4-continued
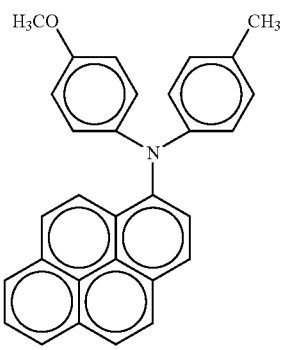
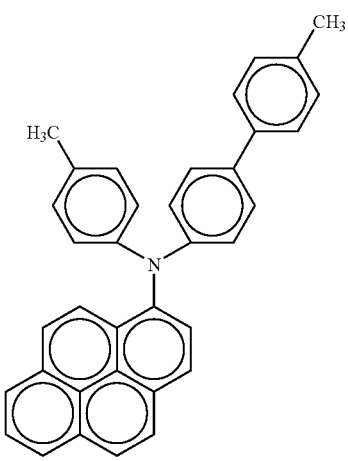
Specific examples of the charge transport material having formula (5) are shown in Table 5.
TABLE 5
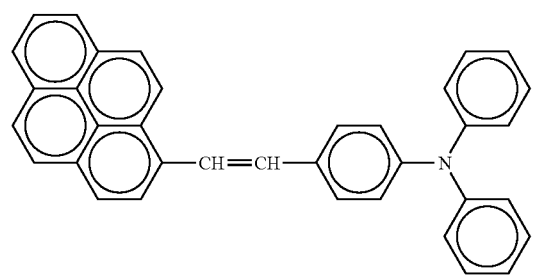
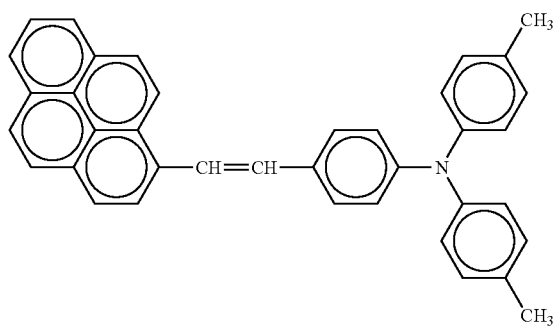
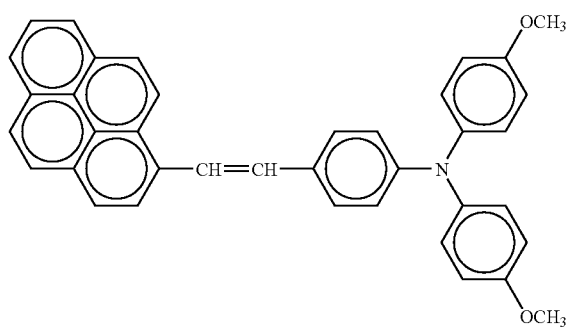
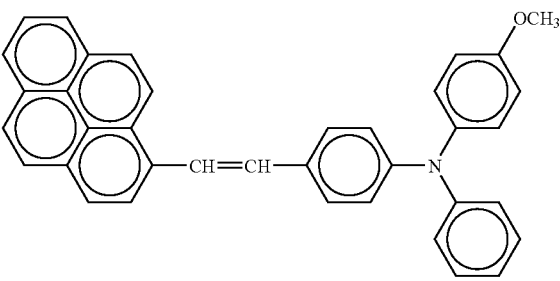

TABLE 5-continued
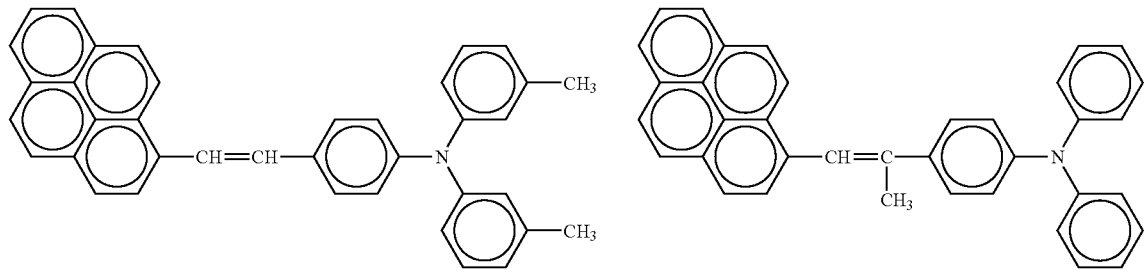
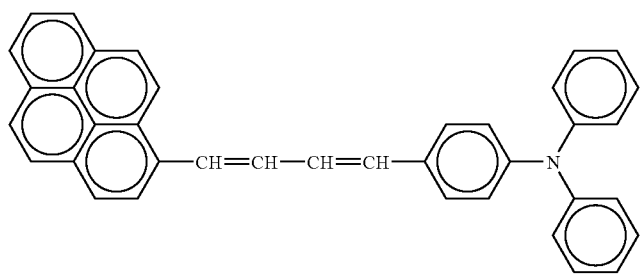
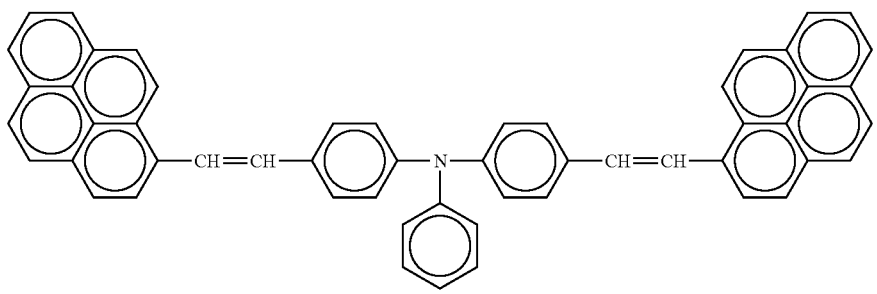
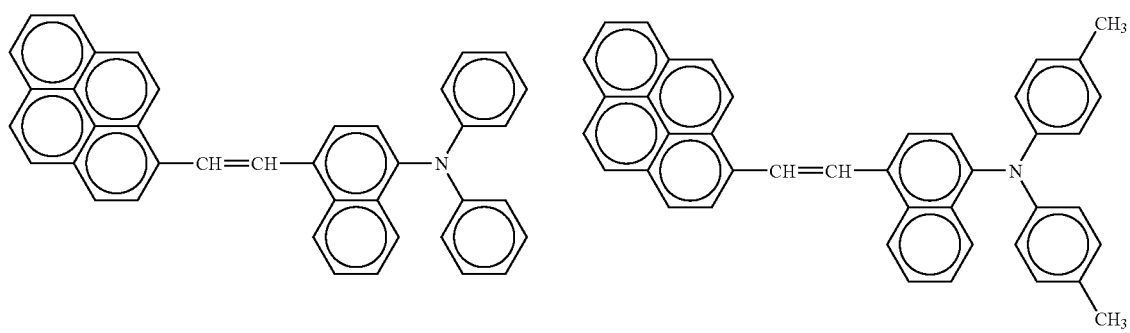

Specific examples of the charge transport material having formula (6) are shown in Table 6.
TABLE 6
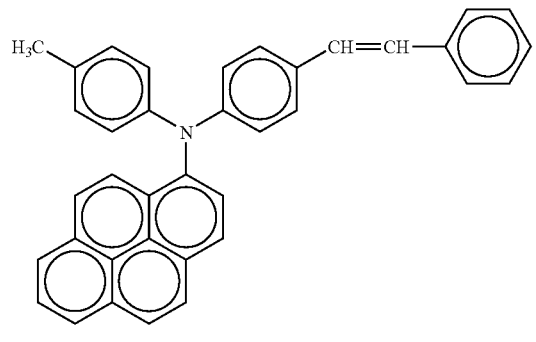
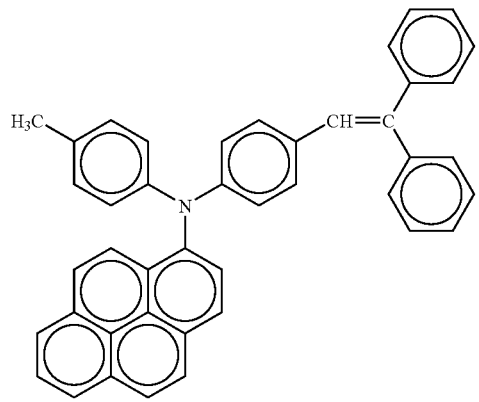
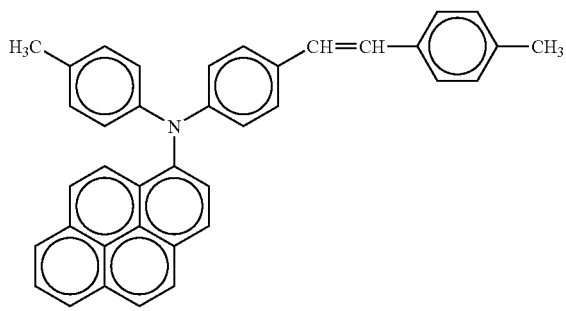
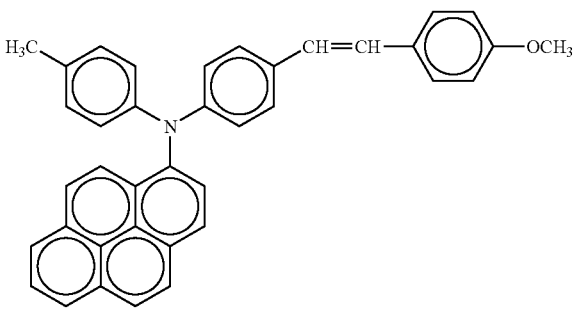
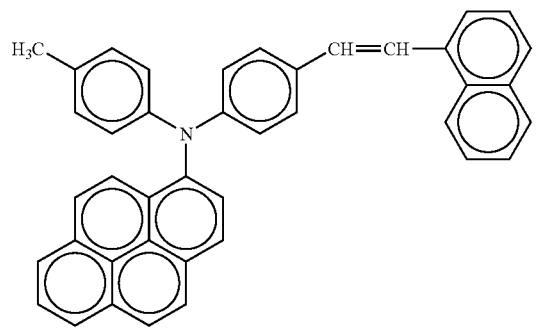
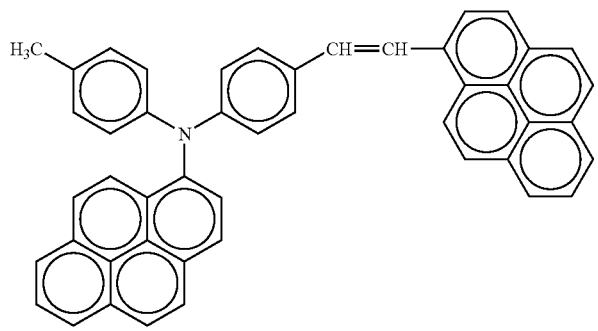
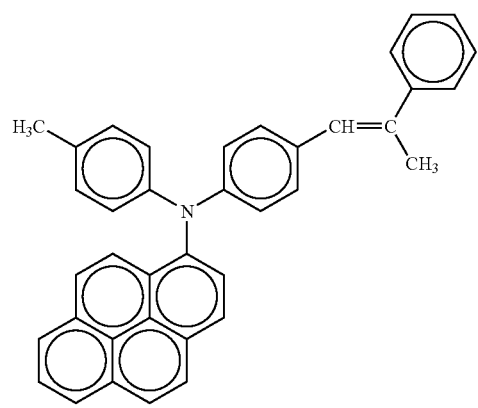
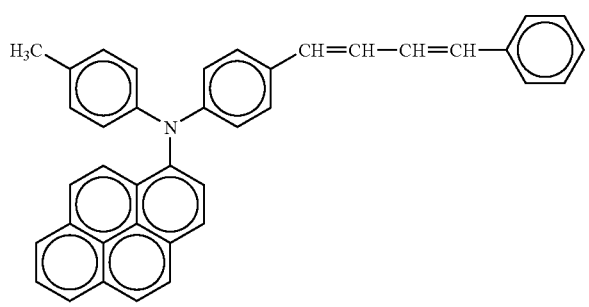

TABLE 6-continued
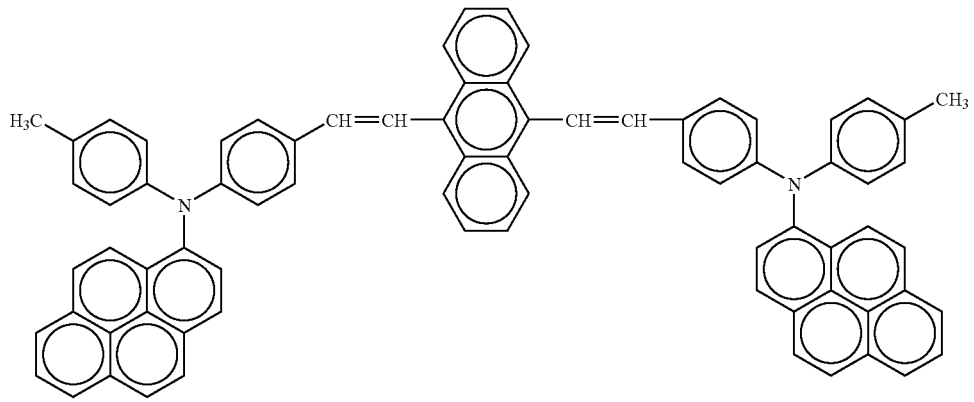
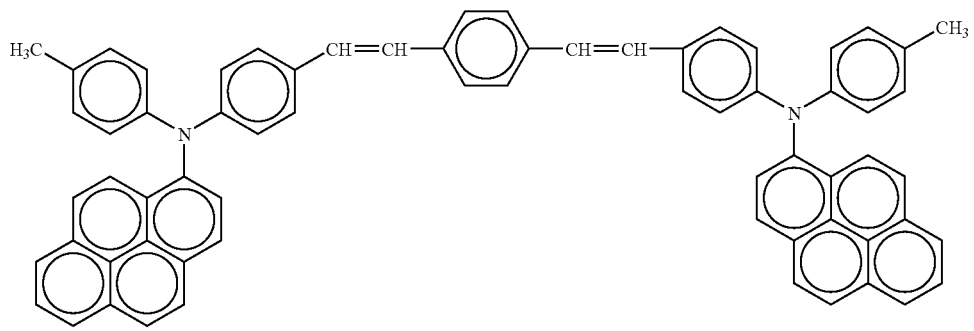
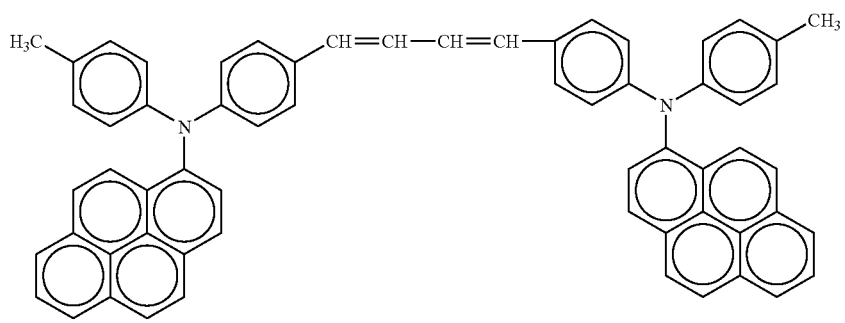
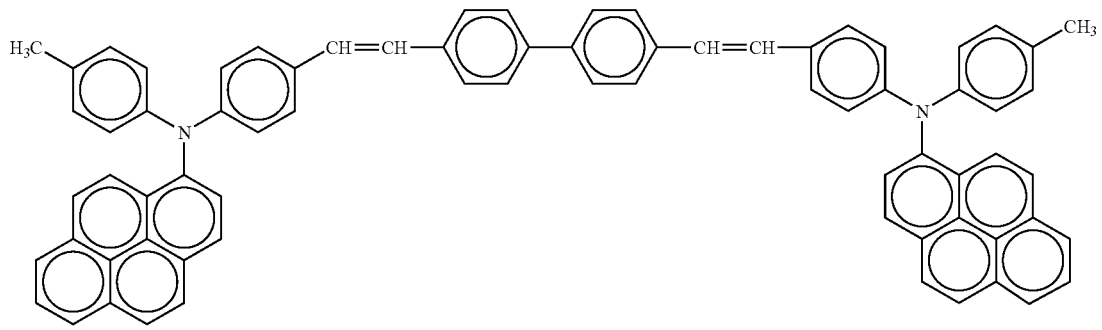

TABLE 6-continued

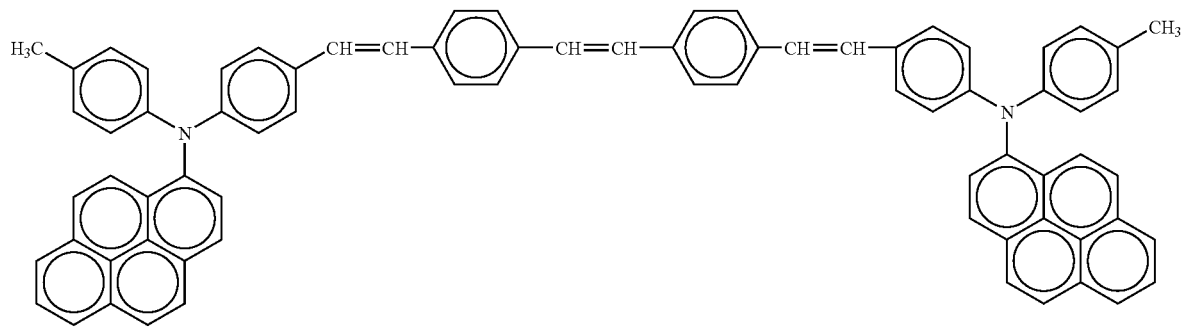

Specific examples of the inactive polymer for use in the charge transport layer include thermoplastic or thermosetting resins such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like.

Among these resins, polycarbonate resins are preferable because of having good transparency and good abrasion resistance.

The content of the low-molecular-weight charge transport material in the charge transport layer is preferably from 20 to 300 parts by weight, and more preferably from 40 to 150 parts by weight, per 100 parts by weight of the inactive resin. In particular, the weight ratio of the low-molecular-weight charge transport material to the charge transport layer is preferably not greater than 45%.

A layer including a charge transport polymer can be used as the charge transport layer instead of the charge transport layer including a low-molecular-weight charge transport material and an inactive polymer.

In this case, the charge transport layer can be prepared by coating a coating liquid, in which a charge transport polymer is dissolved or dispersed in a proper solvent, and then dried the coated liquid. The coating liquid may also include one or more additives such as plasticizers, leveling agents and antioxidants.

Suitable charge transport polymers include known charge transport polymers. Among these polymers, charge transport polymers which can impart the mobility mentioned above to the resultant charge transport layer are preferably used.

In particular, polycarbonate resins having a triarylamine structure in their main chain and/or side chain are preferably used. Among these polycarbonate resins, polycarbonate resins having one of the following formulas (7) to (16) are preferably used.

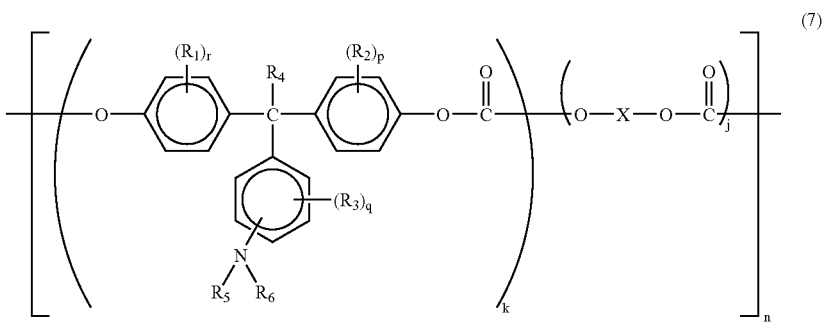

wherein R1, R2 and R3 independently represent a substituted or unsubstituted alkyl group, or a halogen atom; R4 represents a hydrogen atom, or a substituted or unsubstituted alkyl group; R5 and R6 independently represent a substituted or unsubstituted aryl group; r, p and q are independently 0 or an integer of from 1 to 4; k is a number of from 0.1 to 1, j is a number of from 0 to 0.9, and n is an integer of from 5 to 5000; and X represents a divalent aliphatic hydrocarbon group, a divalent alicyclic hydrocarbon group or a divalent group having the following formula (7)':

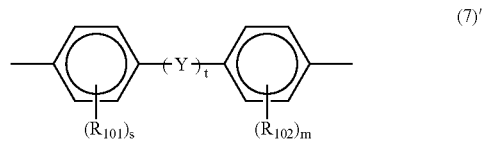

wherein R101 and R102 independently represent a substituted or unsubstituted alkyl group, an aryl group, or a halogen atom; Y represents a linear, branched or a ring alkylene group, —O—, —S—, —SO—, —SO$_2$—, —CO—, or —CO—O—Z—O—CO—, wherein Z represents a divalent aliphatic hydrocarbon group; and s and m is independently 0 or an integer of from 1 to 4, and t is 0 or 1.

Alternatively, X may be a divalent group having the following formula (7)":

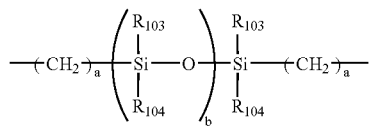
(7)"

wherein a is an integer of from 1 to 20 and b is an integer of from 1 to 2000; R103 and R104 independently represent a substituted or unsubstituted alkyl group, or a substituted or unsubstituted aryl group, wherein R101, R102, R103 and R104 may be the same or different from each other.

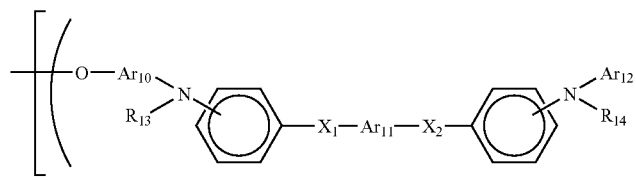
(8)

wherein R7 and R8 independently represent a substituted or unsubstituted aryl group; Ar1, Ar2 and Ar3 independently represent an arylene group; and X, k, j and n are defined above in formula (7).

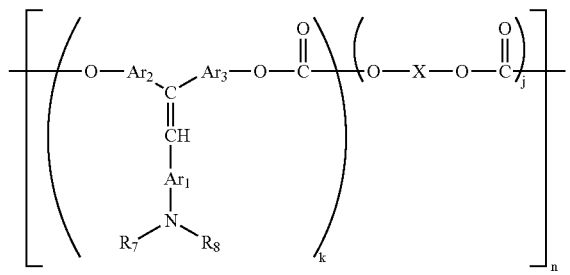
(9)

wherein R9 and R10 independently represent a substituted or unsubstituted aryl group; Ar4, Ar5 and Ar6 independently represent an arylene group; and X, k, j and n are defined above in formula (7).

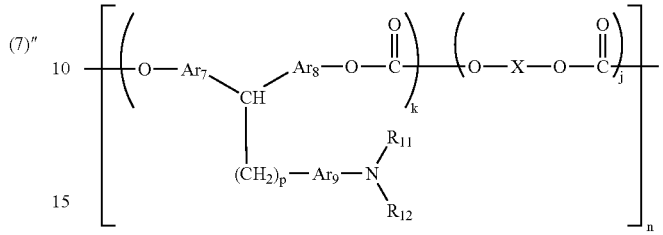
(10)

wherein R11 and R12 independently represent a substituted or unsubstituted aryl group; Ar7, Ar8 and Ar9 independently represent an arylene group; p is an integer of 1 to 5; and X, k, j and n are defined above in formula (7).

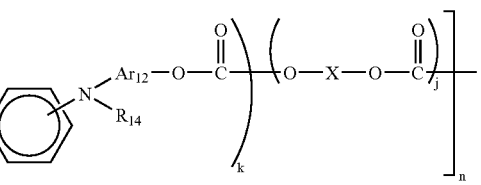
(11)

wherein R13 and R14 independently represent a substituted or unsubstituted aryl group; Ar10, Ar11 and Ar12 independently represent an arylene group; X1 and X2 independently represent a substituted or unsubstituted ethylene group, or a substituted or unsubstituted vinylene group; and X, k, j and n are defined above in formula (7).

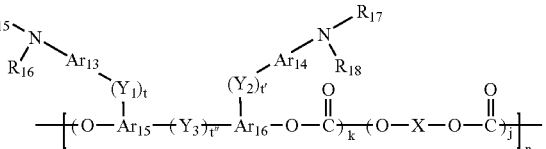
(12)

wherein R15, R16, R17 and R18 independently represent a substituted or unsubstituted aryl group; Ar13, Ar14, Ar15 and Ar16 independently represent an arylene group; Y1, Y2 and Y3 independently represent a substituted or unsubstituted alkylene group, a substituted or unsubstituted cycloalkylene group, a substituted or unsubstituted alkyleneether group, an oxygen atom, a sulfur atom, or a vinylene group; t, t' and t" is independently 0 or 1; and X, k, j and n are defined above in formula (7).

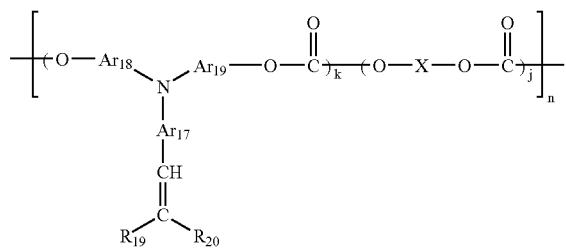

(13)

wherein R19 and R20 independently represent a hydrogen atom, or a substituted or unsubstituted aryl group, wherein R19 and R20 may be combined to form a ring; Ar17, Ar18 and Ar19 independently represent an arylene group; and X, k, j and n are defined above in formula (7).

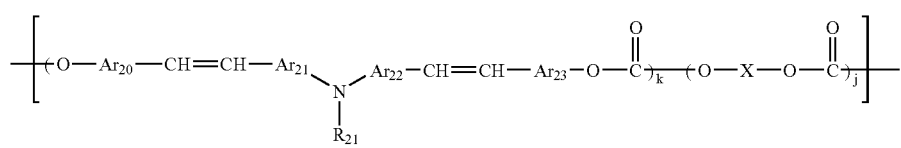

(14)

wherein R21 represents a substituted or unsubstituted aryl group; Ar20, Ar21, Ar22 and Ar23 independently represent an arylene group; and X, k, j and n are defined above in formula (7).

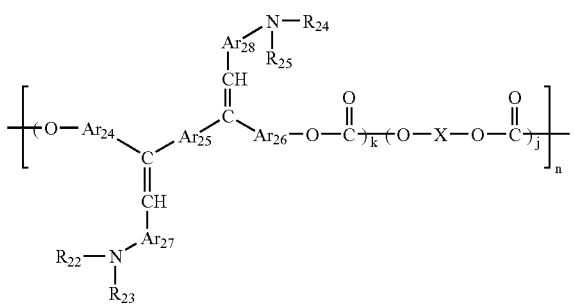

(15)

wherein R22, R23, R24 and R25 independently represent a substituted or unsubstituted aryl group; Ar24, Ar25, Ar26, Ar27 and Ar28 independently represent an arylene group; and X, k, j and n are defined above in formula (7).

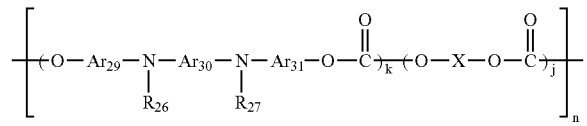

(16)

wherein R26 and R27 independently represent a substituted or unsubstituted aryl group; Ar29, Ar30 and Ar31 independently represent an arylene group; and X, k, j and n are defined above in formula (7).

These charge transport polymers can be used alone or in combination. In addition, one or more low-molecular-weight charge transport materials can be added thereto.

Suitable low-molecular-weight charge transport materials, which can be used in combination with the charge transport polymers, include the positive-hole charge transport materials and the electron charge transport materials mentioned above.

In addition, one or more inactive polymers can be added to the charge transport polymers, if desired. Specific examples of such inactive polymers include the inactive polymers mentioned above.

The thickness of the charge transport layer 37 is preferably from 5 to 100 μm whether the layer is a layer using a low-molecular-weight charge transfer material or a layer using a charge transfer polymer.

Suitable solvents for use in the charge transport layer coating liquid include tetrahydrofuran, dioxane, toluene, dichloromethane, monochlorobenzene, dichloroethane, cyclohexanone, methyl ethyl ketone, acetone and the like.

The charge transport layer 37 may include additives such as plasticizers and leveling agents. Specific examples of the plasticizers include known plasticizers, which are used for plasticizing resins, such as dibutyl phthalate, dioctyl phthalate and the like. The addition amount of the plasticizer is 0 to 30% by weight of the binder resin used in the charge transport layer.

Specific examples of the leveling agents include silicone oils such as dimethyl silicone oil, and methyl phenyl silicone oil; polymers or oligomers including a perfluoroalkyl group in their side chain; and the like. The addition amount of the leveling agents is 0 to 1% by weight of the binder resin used in the charge transport layer.

Figure 3:
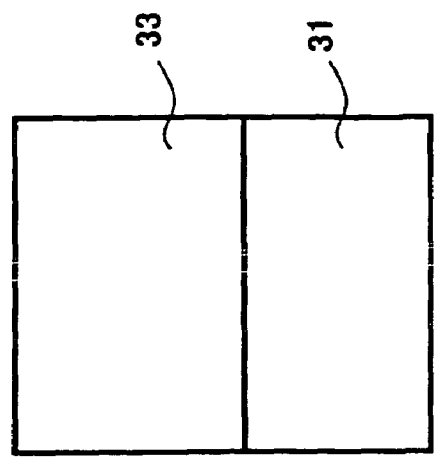
FIG. 3 is a schematic cross-sectional view of yet another embodiment of the electrophotographic photoreceptor of the present invention.

Next, a single-layer type photosensitive layer will be explained. FIG. 3 illustrates a cross-sectional view of a single-layer type photoreceptor in which a photosensitive layer 33 is formed on an electroconductive substrate 31. The photosensitive layer 33 is a layer in which the TiOPc crystal of the present invention (i.e., a charge generation material) and a charge transport material are dispersed in a binder resin. In addition, the photosensitive layer 33 can be formed by coating a coating liquid in which a charge generation material, a charge transport material and a binder resin are dissolved or dispersed in a solvent, and then drying the coated liquid. The photosensitive layer 33 may include additives such as plasticizers, leveling agents and antioxidants.

Suitable binder resins for use in the photosensitive layer 33 include the resins mentioned above for use in the charge transport layer 37. The resins for use in the charge generation layer 35 can be added as a binder resin. In addition, the charge transport polymers mentioned above can also be used as a binder resin.

The addition amount of the charge generation material is preferably from 5 to 40 parts by weight per 100 parts by weight of the binder resin used. The addition amount of the charge transport material is preferably from 0 to 190 parts, and more preferably from 50 to 150 parts by weight, per 100 parts by weight of the binder resin used.

Suitable solvents for use in the photosensitive layer coating liquid include known organic solvents such as tetrahydrofuran, dioxane, dichloroethane, cyclohexane and the like solvents. Suitable coating methods include known coating methods such as dip coating, spray coating, bead coating, and the like. The thickness of the photosensitive layer 33 is preferably from 5 to 100 µm.

The photoreceptor of the present invention may have an undercoat layer between the substrate 31 and the photosensitive layer (i.e., the photosensitive layer 33 in FIG. 3, the charge generation layer 35 in FIG. 1, or the charge transport layer 37 in FIG. 2).

The undercoat layer includes a resin as a main component. Since a photoconductive layer is typically formed on the undercoat layer by coating a liquid including an organic solvent, the resin in the undercoat layer preferably has good resistance to the organic solvent. Specific examples of such resins include water-soluble resins such as polyvinyl alcohol resins, casein and polyacrylic acid sodium salts; alcohol soluble resins such as nylon copolymers and methoxymethylated nylon resins; and thermosetting resins capable of forming a three-dimensional network such as polyurethane resins, melamine resins, alkyd-melamine resins, epoxy resins and the like.

The undercoat layer may include a fine powder of metal oxides such as titanium oxide, silica, alumina, zirconium oxide, tin oxide, and indium oxide to prevent the occurrence of moiré in the recorded images and to decrease the residual surface potential of the photoreceptor. The undercoat layer can also be formed by coating a coating liquid using a proper solvent and a proper coating method as mentioned above in the photosensitive layer.

A metal oxide layer which is formed, for example, by a sol-gel method using a silane coupling agent, titanium coupling agent or a chromium coupling agent can also be used as an undercoat layer.

A layer of aluminum oxide which is formed by an anodic oxidation method and a layer of an organic compound such as polyparaxylylene or an inorganic compound such as SiO, $SnO_2$, $TiO_2$, ITO or $CeO_2$ which is formed by a vacuum evaporation method are also preferably used as an undercoat layer. The thickness of the undercoat layer is preferably 0 to about 5 µm.

The photoreceptor of the present invention may include a protective layer, which is formed overlying the photosensitive layer (i.e., the charge transport layer 37 in FIG. 1, the charge generation layer 35 in FIG. 2, or the photosensitive layer 33 in FIG. 3), to protect the photosensitive layer. Suitable materials for use in the protective layer include ABS resins, ACS resins, olefin-vinyl monomer copolymers, chlorinated polyethers, aryl resins, phenolic resins, polyacetal, polyamides, polyamideimide, polyacrylates, polyarylsulfone, polybutylene, polybutylene terephthalate, polycarbonate, polyethersulfone, polyethylene, polyethylene terephthalate, polyimides, acrylic resins, polymethylpentene, polypropylene, polyphenyleneoxide, polysulfone, polystyrene, AS resins, butadiene-styrene copolymers, polyurethane, polyvinyl chloride, polyvinylidene chloride, epoxy resins and the like. The protective layer may include a fluorine-containing resin or a silicone resin to improve abrasion resistance of the photoreceptor. The protective layer may include an inorganic filler such as titanium oxide, tin oxide, potassium titanate and the like, which is dispersed in a resin.

The protective layer can be formed by one of the known coating methods mentioned above for use in the photosensitive layer. The thickness of the protective layer is from 0.1 to 10 µm. In addition, a layer of amorphous carbon or amorphous silicon carbide which is formed by a vacuum evaporation method can also be used as the protective layer.

In the present invention, an intermediate layer may be formed between the photosensitive layer and the protective layer. The intermediate layer includes a resin as a main component. Specific examples of the resin include polyamides, alcohol soluble nylons, polyvinyl butyral having a hydroxide group, polyvinyl butyral, polyvinyl alcohol, and the like. The intermediate layer can be formed by one of the above-mentioned known coating methods. The thickness of the intermediate layer is preferably from 0.05 to 2 µm.

In the photoreceptor of the present invention, one or more additives such as antioxidants, plasticizers, lubricants, ultraviolet absorbents and leveling agents can be used in one or more of the layers.

Suitable antioxidants for use in the layers of the photoreceptor include the following compounds but are not limited thereto.

(a) Phenolic Compounds 2,6-di-t-butyl-p-cresol, butylated hydroxyanisole, 2,6-di-t-butyl-4-ethylphenol, n-octadecyl-3-(4'-hydroxy-31,5'-di-t-butylphenol), 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3', 5'-di-t-butyl-4'-hydroxyphenyl)propionate]methane, bis[3, 3'-bis(4'-hydroxy-3'-t-butylphenyl)butyric acid]glycol ester, tocophenol compounds, and the like.

(b) Paraphenylenediamine Compounds

N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, N,N'-dimethyl-N,N'-di-t-butyl-p-phenylenediamine, and the like.

(c) Hydroquinone Compounds 2,5-di-t-octylhydroquinone, 2,6-didodecylhydroquinone, 2-dodecylhydroquinone, 2-dodecyl-5-chlorohydroquinone, 2-t-octyl-5-methylhydroquinone, 2-(2-octadecenyl)-5-methylhydroquinone and the like.

(d) Organic Sulfur-Including Compounds dilauryl-3,3'-thiodipropionate, distearyl-3,3'-thiodipropionate, ditetradecyl-3,3'-thiodipropionate, and the like.

(e) Organic-Phosphorus-Containing Compounds triphenylphosphine, tri(nonylphenyl)phosphine, tri(dinonylphenyl)phosphine, tricresylphosphine, tri(2,4-dibutylphenoxy)phosphine and the like.

Suitable plasticizers for use in the layers of the photoreceptor include the following compounds but are not limited thereto:

(a) Phosphoric Acid Esters triphenyl phosphate, tricresyl phosphate, trioctyl phosphate, octyldiphenyl phosphate, trichloroethyl phosphate, cresyldiphenyl phosphate, tributyl phosphate, tri-2-ethylhexyl phosphate, triphenyl phosphate, and the like.

(b) Phthalic Acid Esters dimethyl phthalate, diethyl phthalate, diisobutyl phthalate, dibutyl phthalate, diheptyl phthalate, di-2-ethylhexyl phthalate, diisooctyl phthalate, di-n-octyl phthalate, dinonyl phthalate, diisononyl phthalate, diisodecyl phthalate, diundecyl phthalate, ditridecyl phthalate, dicyclohexyl phthalate, butylbenzyl phthalate, butyllauryl phthalate, methyloleyl phthalate, octyldecyl phthalate, dibutyl fumarate, dioctyl fumarate, and the like.

(c) Aromatic Carboxylic Acid Esters trioctyl trimellitate, tri-n-octyl trimellitate, octyl oxybenzoate, and the like.

(d) Dibasic Fatty Acid Esters dibutyl adipate, di-n-hexyl adipate, di-2-ethylhexyl adipate, d-n-octyl adipate, n-octyl-n-decyl adipate, diisodecyl adipate, dialkyl adipate, dicapryl adipate, di-2-etylhexyl azelate, dimethyl sebacate, diethyl sebacate, dibutyl sebacate, di-n-octyl sebacate, di-2-ethylhexyl sebacate, di-2-ethoxyethyl sebacate, dioctyl succinate, diisodecyl succinate, dioctyl tetrahydrophthalate, di-n-octyl tetrahydrophthalate, and the like.

(e) Fatty Acid Ester Derivatives butyl oleate, glycerin monooleate, methyl acetylricinolate, pentaerythritol esters, dipentaerythritol hexaesters, triacetin, tributyrin, and the like.

(f) Oxyacid Esters methyl acetylricinolate, butyl acetylricinolate, butylphthalylbutyl glycolate, tributyl acetylcitrate, and the like.

(g) Epoxy Compounds epoxydized soybean oil, epoxydized linseed oil, butyl epoxystearate, decyl epoxystearate, octyl epoxystearate, benzyl epoxystearate, dioctyl epoxyhexahydrophthalate, didecyl epoxyhexahydrophthalate, and the like.

(h) Dihydric Alcohol Esters diethylene glycol dibenzoate, triethylene glycol di-2-ethylbutyrate, and the like.

(i) Chlorine-Containing Compounds chlorinated paraffin, chlorinated diphenyl, methyl esters of chlorinated fatty acids, methyl esters of methoxychlorinated fatty acids, and the like.

(j) Polyester Compounds polypropylene adipate, polypropylene sebacate, acetylated polyesters, and the like.

(k) Sulfonic Acid Derivatives p-toluene sulfonamide, o-toluene sulfonamide, p-toluene sulfoneethylamide, o-toluene sulfoneethylamide, toluene sulfone-N-ethylamide, p-toluene sulfone-N-cyclohexylamide, and the like.

(l) Citric Acid Derivatives triethyl citrate, triethyl acetylcitrate, tributyl citrate, tributyl acetylcitrate, tri-2-ethylhexyl acetylcitrate, n-octyldecyl acetylcitrate, and the like.

(m) Other Compounds terphenyl, partially hydrated terphenyl, camphor, 2-nitro diphenyl, dinonyl naphthalene, methyl abietate, and the like.

Suitable lubricants for use in the layers of the photoreceptor include the following compounds but are not limited thereto.

(a) Hydrocarbons liquid paraffins, paraffin waxes, micro waxes, low molecular weight polyethylenes, and the like.

(b) Fatty Acids lauric acid, myristic acid, palmitic acid, stearic acid, arachidic acid, behenic acid, and the like.

(c) Fatty Acid Amides

Stearic acid amide, palmitic acid amide, oleic acid amide, methylenebisstearamide, ethylenebisstearamide, and the like.

(d) Ester Compounds lower alcohol esters of fatty acids, polyhydric alcohol esters of fatty acids, polyglycol esters of fatty acids, and the like.

(e) Alcohols cetyl alcohol, stearyl alcohol, ethylene glycol, polyethylene glycol, polyglycerol, and the like.

(f) Metallic Soaps lead stearate, cadmium stearate, barium stearate, calcium stearate, zinc stearate, magnesium stearate, and the like.

(g) Natural Waxes

Carnauba wax, candelilla wax, beeswax, spermaceti, insect wax, montan wax, and the like.

(h) Other Compounds silicone compounds, fluorine compounds, and the like.

Suitable ultraviolet absorbing agents for use in the layers of the photoreceptor include the following compounds but are not limited thereto.

(a) Benzophenone Compounds 2-hydroxybenzophenone, 2,4-dihydroxybenzophenone, 2,2',4-trihydroxybenzophenone, 2,2',4,4'-tetrahydroxybenzophenone, 2,2'-dihydroxy-4-methoxybenzophenone, and the like.

(b) Salicylate Compounds phenyl salicylate, 2,4-di-t-butylphenyl-3,5-di-t-butyl-4-hydroxybenzoate, and the like.

(c) Benzotriazole Compounds (2'-hydroxyphenyl)benzotriazole, (2'-hydroxy-5'-methylphenyl)benzotriazole, (2'-hydroxy-3'-t-butyl-5'-methylphenyl)-5-chlorobenzotriazole, and the like.

(d) Cyano Acrylate Compounds ethyl-2-cyano-3,3-diphenyl acrylate, methyl-2-carbomethoxy-3-(paramethoxy) acrylate, and the like.

(e) Quenchers (Metal Complexes)

nickel(2,2'-thiobis(4-t-octyl)phenolate)-n-butylamine, nickeldibutyldithiocarbamate, cobaltdicyclohexyldithiophosphate, and the like.

(f) HALS (Hindered Amines)

bis(2,2,6,6-tetramethyl-4-piperidyl)sebacate, bis(1,2,2,6,6-pentamethyl-4-piperidyl)sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetrametylpyridine, 8-benzyl-7,7,9,9-tetramethyl-3-octyl-1,3,8-triazaspiro[4,5]undecane-2,4-dione, 4-benzoyloxy-2,2,6,6-tetramethylpiperidine, and the like.

Hereinafter the image forming method and image forming apparatus using the photoreceptor of the present invention will be explained referring to drawings.

Figure 4:
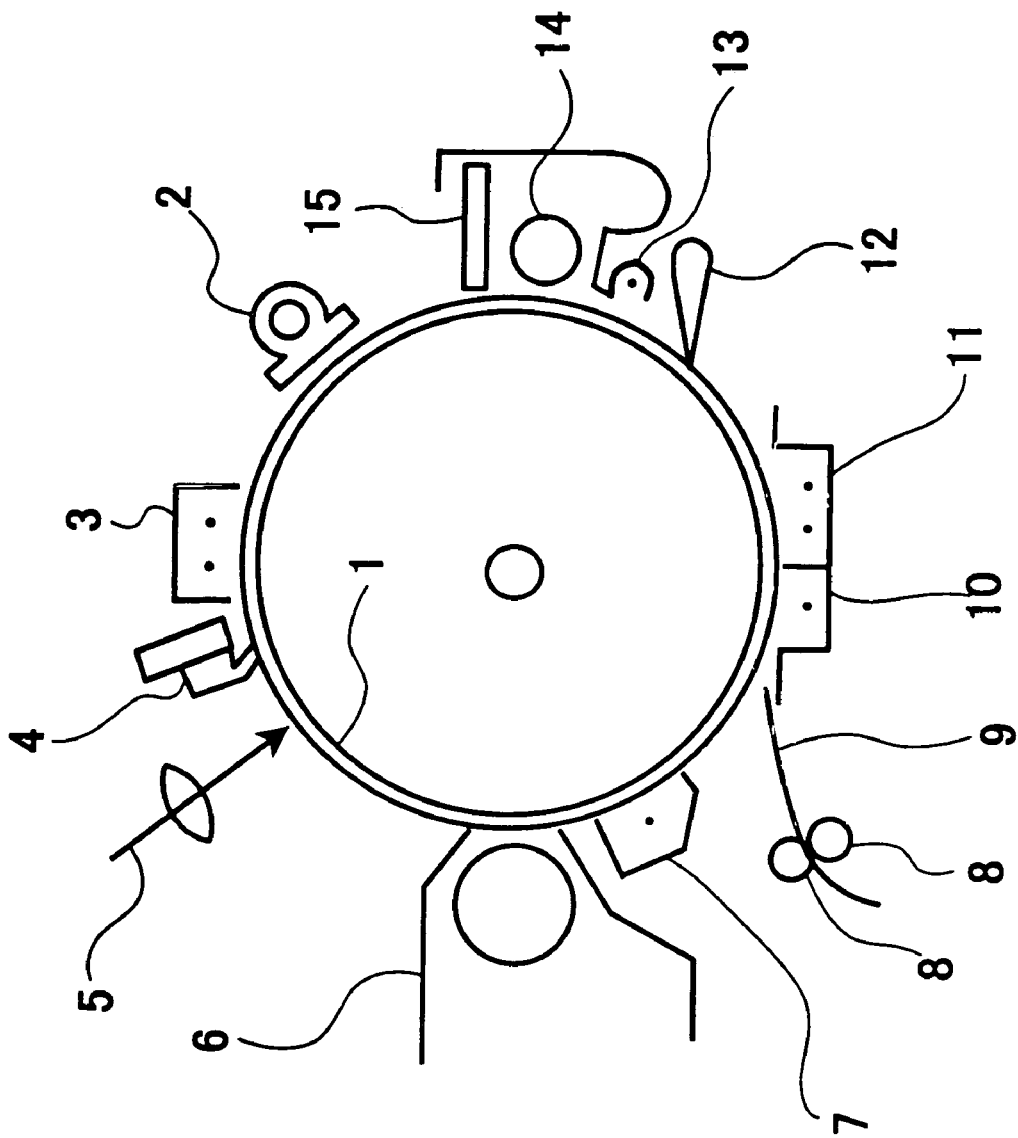
FIG. 4 is a schematic diagram used for explaining an embodiment of the electrophotographic image forming method and apparatus of the present invention.

FIG. 4 is a schematic view illustrating a main part of an embodiment of the image forming apparatus of the present invention.

In FIG. 4, numeral 1 denotes a cylindrical photoreceptor. The photoreceptor 1 has a photosensitive layer (i.e., the photosensitive layer 33, or the photosensitive layer including the charge generation layer 35 and charge transport layer 37) in which the TiOPc crystal of the present invention is included. Around the photoreceptor 1, a discharging lamp 2, a charger 3, an eraser 4, an imagewise light irradiating device 5, a developing unit 6, a pre-transfer charger 7, a transfer charger 10, a separating charger 11, a separating pick 12, a pre-cleaning charger 13, a cleaning brush 14, and a cleaning blade 15 are counterclockwise configured in this order. In addition, a pair of registration rollers 8 are provided to feed a transfer paper 9 to the space between the photoreceptor 1 and the transfer charger 10 (and the separating charger 11). The photoreceptor 1 rotates in a counterclockwise direction.

In the image forming apparatuses of the present invention, the cleaning members such as the pre-cleaning charger 13, cleaning brush 14 and cleaning blade 15, and the discharging members such as the discharging lamp 2 may be removed from the image forming apparatuses.

The photoreceptor 1 is positively or negatively charged with the charger 3 while the photoreceptor 1 is rotating. Residual toner is removed from the photoreceptor 1 by the eraser 4, and then the imagewise light irradiating device 5 irradiates the photoreceptor 1 with imagewise light to form an electrostatic latent image on the photoreceptor 1.

Suitable charging devices for use as the charger 3, pre-transfer charger 7, transfer charger 10, separating charger 11, and pre-cleaning charger 13 include known charging devices such as corotrons, scorotrons, solid state chargers, charging rollers and the like.

Any known charging devices can be used as the transfer charger 10; however, the transfer device as shown in FIG. 4, i.e., a combination of the transfer charger 10 with the separating charger 11, is preferable because of being efficient.

Suitable light sources for use in the imagewise light irradiating device 5 and the discharging lamp 2 include fluorescent lamps, tungsten lamps, halogen lamps, mercury lamps, sodium lamps, light emitting diodes (LEDs), laser diodes (LDs), light sources using electroluminescence (EL), and the like. In addition, in order to obtain light having a desired wave length range, filters such as sharp-cut filters, band pass filters, near-infrared cutting filters, dichroic filters, interference filters, color temperature converting filters and the like can be used. These light sources can also be used for the image transfer process, discharging process, and cleaning process, and a pre-exposure process which is optionally performed, if it is needed to irradiate the photoreceptor 1 with light in the processes.

The electrostatic latent image formed on the photoreceptor 1 is then developed with a toner on a developing roller 61 in the developing unit 6. The toner image formed on the photoreceptor 1 is then charged with the pre-transfer charger 7 so that the toner image has a charge suitable for transferring. The toner image is then transferred onto the transfer paper 9 while the transfer paper 9 is charged with the transfer charger 10. The transfer paper 9 is then charged with the separating charger 11 so as to easily separate from the photoreceptor 1 by being released from the state in which the transfer paper 9 and the photoreceptor 1 are electrostatically adhered to each other. The transfer paper 9 is then separated from the photoreceptor 1 with the separating pick 12. After the toner image transferring process, the surface of the photoreceptor 1 is cleaned using the pre-cleaning charger 13, the fur brush 14 and the cleaning blade 15. The residual toner remaining on the photoreceptor 1 can be removed by only a cleaning brush.

When the photoreceptor 1 which is previously charged positively or negatively is exposed to imagewise light, an electrostatic latent image having a positive or negative charge is formed on the photoreceptor 1. When the latent image having a positive (negative) charge is developed with a toner having a negative (positive) charge, a positive image (i.e., the same image as the latent image) can be obtained. In contrast, when the latent image having a positive (negative) charge is developed with a toner having a positive (negative) charge, a negative image (i.e., a reversal image) can be obtained. As the developing method, known developing methods can be used. In addition, as the discharging methods, known discharging methods can also be used.

In the image forming apparatus as shown in FIG. 4, a cylindrical photoreceptor is used; however, a sheet-shaped or endless-belt-shaped photoreceptor can also be used. In addition, corotrons, scorotrons, solid state chargers, and charging rollers can be used as the pre-cleaning charger 13. These chargers can also be used as a substitute for the transfer charger 10 and the separating charger 11; however, the unity of the transfer charger 10 and the separating charger 11 is preferable because of being efficient. Further, known brushes such as fur brushes and magnetic fur brushes can be used as the cleaning brush 14.

Figure 5:
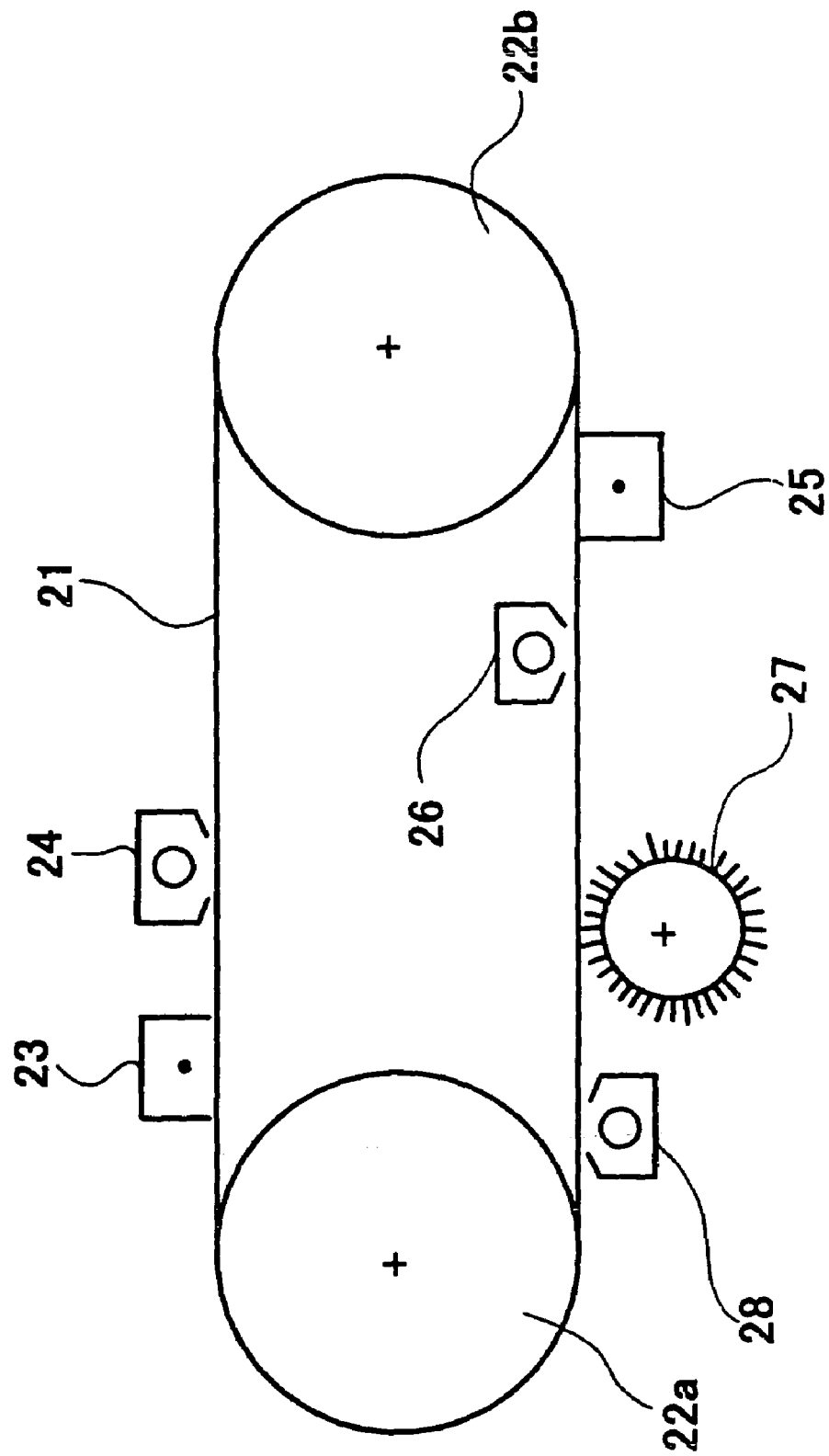
FIG. 5 is a schematic diagram used for explaining another embodiment of the electrophotographic image forming method and apparatus of the present invention.

FIG. 5 is a schematic view illustrating a main part of another embodiment of the image forming apparatus of the present invention. In this embodiment, a belt-shaped photoreceptor 21 is used. The photoreceptor 21 has a photosensitive layer including the TiOPc crystal of the present invention. The belt-shaped photoreceptor 21 is rotated by rollers 22a and 22b. The photoreceptor 21 is charged with a charger 23, and then exposed to imagewise light emitted by an imagewise light irradiating device 24 to form an electrostatic latent image in the photoreceptor 21. The latent image is developed with a developing unit (not shown in FIG. 5) to form a toner image on the photoreceptor 21. The toner image is transferred onto a transfer paper (not shown) using a transfer charger 25. After the toner image transferring process, the surface of the photoreceptor 21 is cleaned with a cleaning brush 27 after performing a pre-cleaning light irradiating operation using a pre-cleaning light irradiating device 26. Then the photoreceptor 21 is discharged by being exposed to light emitted by a discharging light-source 28. In the pre-cleaning light irradiating process, light may irradiate the photoreceptor 21 from the side of the substrate thereof. In this case, the substrate has to be light-transmissive.

Figure 13:
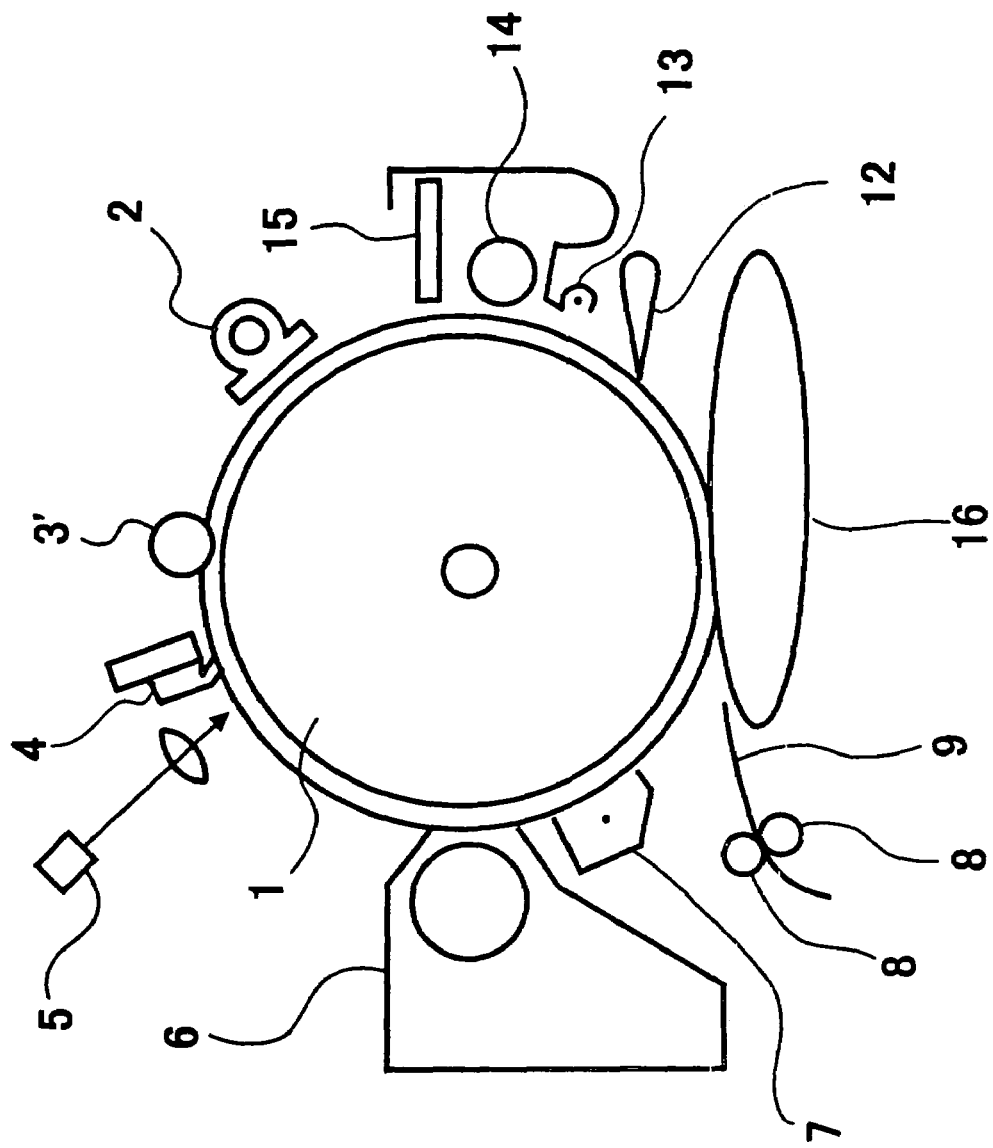
FIG. 13 is a schematic diagram used for explaining yet another embodiment of the electrophotographic image forming method and apparatus of the present invention.

FIG. 13 illustrates yet another embodiment of the electrophotographic image forming apparatus of the present invention.

In FIG. 13, a charging roller 3' is provided while the charging roller 3' contacts or is configured to be close to a photoreceptor 1. A pre-transfer charger 7, a transfer charger (not shown), a separation charger (not shown), and a pre-cleaning charger 13 are optionally configured around the photoreceptor 1. Known chargers can be used for the chargers. In the charging process, it is preferable to apply a voltage, in which a DC voltage and an AC voltage are overlapped, to the photoreceptor 1 for uniformly charging the photoreceptor 1. In addition, the charging roller 3' is preferably set so as to be close to the photoreceptor 1 because when set so as to contact the photoreceptor 1, the toner remaining on the photoreceptor 1 tends to adhere to the charging roller 3'.

In this case, the toner image formed on the photoreceptor 1 is transferred to a paper 9 using a transfer belt 16.

The image forming apparatus of the present invention is not limited to the image forming units as shown in FIGS. 4, 5 and 13. For example, in FIG. 5, the pre-cleaning light irradiating operation can be performed from the photosensitive layer side of the photoreceptor 21. In addition, the light irradiation in the light image irradiating process and the discharging process may be performed from the substrate side of the photoreceptor 21. Further, a pre-transfer light irradiation operation, which is performed before the transferring of the toner image, and a preliminary light irradiation operation, which is performed before the imagewise light irradiation, and other light irradiation operations may also be performed.

Figure 6:
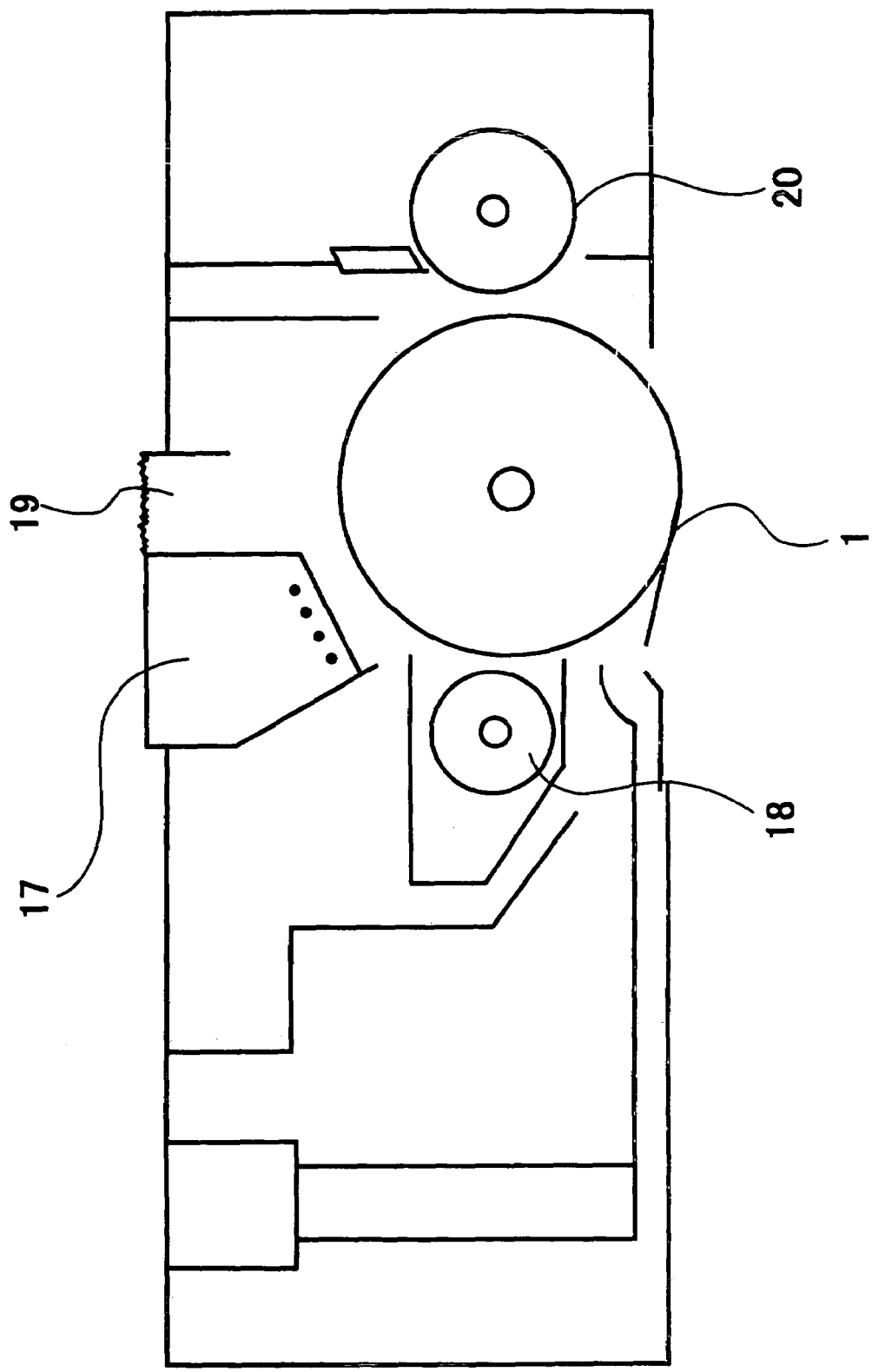
FIG. 6 is a schematic diagram illustrating an embodiment of the electrophotographic image forming process cartridge of the present invention.
Figure 14:
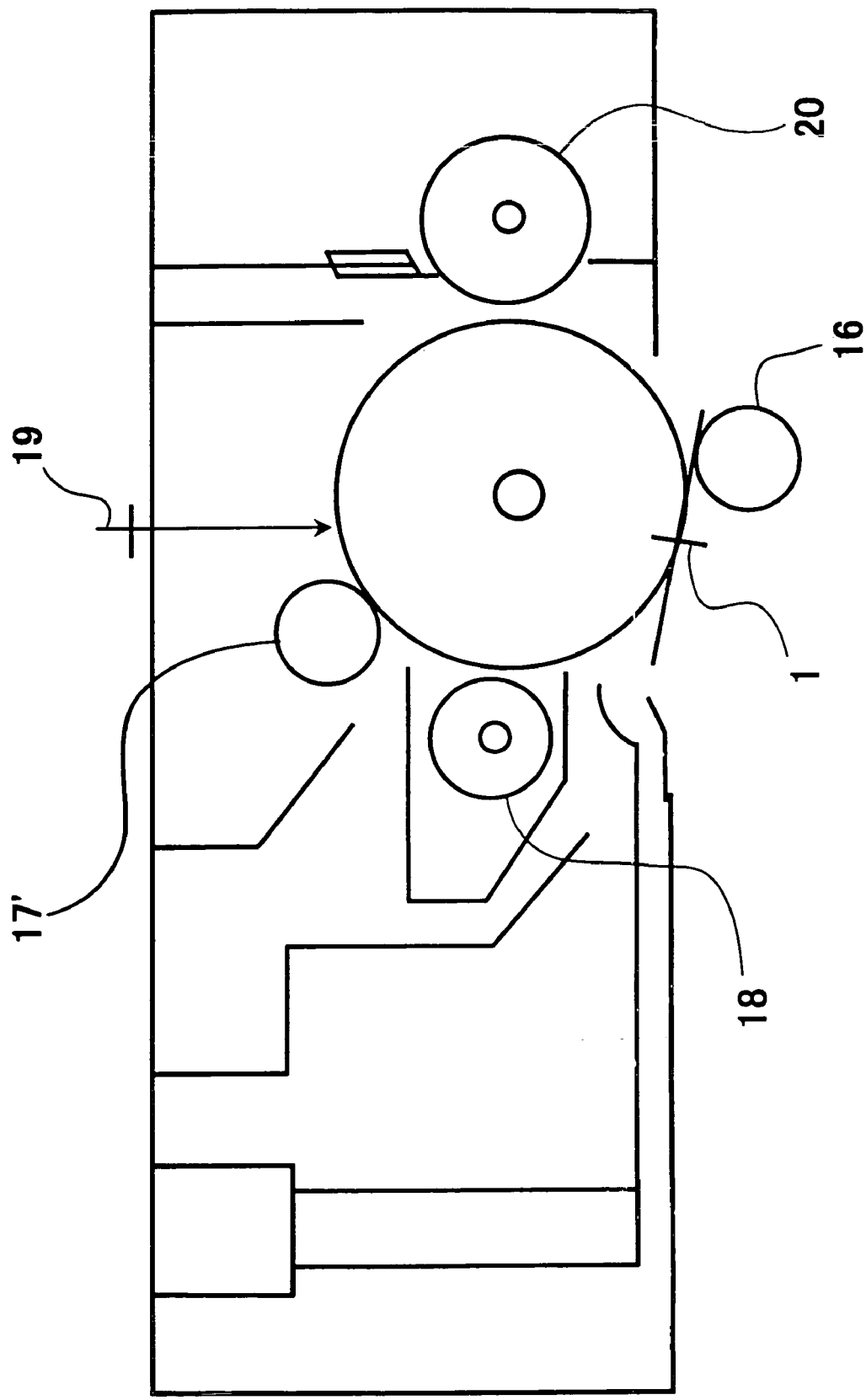
FIG. 14 is a schematic diagram used for explaining still another embodiment of the electrophotographic image forming process cartridge of the present invention.

The above-mentioned image forming units as shown in FIGS. 4, 5 and 13 can be fixedly incorporated in image forming apparatuses such as copying machines, facsimile machines, printers and the like. Alternatively, the image forming units can be set in the image forming apparatuses as a process cartridge. The process cartridge is, for example, a cartridge which includes a charger, a light irradiating device, a developing device, a transfer device, a cleaning device, a discharging device and the like as well as a photoreceptor. Process cartridges having various shapes can be available in the present invention. Typical embodiments of the process cartridges of the present invention are shown in FIGS. 6 and 14. FIG. 6 illustrates a compact process cartridge in which a charger 17, a cleaning brush 18, an imagewise light irradiating device 19, and a developing roller 20 are provided around a photoreceptor 16. The photoreceptor 16 has a photosensitive layer which includes the TiOPc crystal of the present invention and which is formed on an electroconductive substrate.

In FIG. 14, a charging roller 17' is provided in the process cartridge while the charging roller 17' contacts or is configured to be close to the photoreceptor 1. In addition, a transfer roller 16 is provided to transfer toner images formed on the photoreceptor 1 to a receiving material.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis of Titanyl Phthalocyanine

At first, the method for synthesizing the titanyl phthalocyanine crystal of the present invention will be explained in detail.

Synthesis Examples 1 to 6 and Comparative Synthesis Examples 1 and 2

In a container, 29.2 g of 1,3-diiminoisoindoline and 200 ml of sulfolane were contained and stirred. Under a nitrogen current, 20.4 g of titanium tetrabutoxide were dropped therein. After titanium tetrabutoxide was added, the temperature of the mixture was gradually increased to 180° C. The temperature of the mixture was maintained at a temperature range of from 170° C. to 180° C. for 5 hours while stirring the mixture to react the compounds. After the reaction was terminated, the reaction product was cooled. Then the reaction product was filtered to obtain the precipitate. Then the precipitate was washed with chloroform until the precipitate colored blue. The cake was then washed with methanol several times, and further washed with hot water of 80° C. several times. Then the cake was dried. Thus, a rough titanyl phthalocyanine powder was obtained. The thus prepared rough titanyl phthalocyanine powder was added in concentrated sulfuric acid having a weight of 20 times the weight of the powder to dissolve the powder. The solution was dropped into iced water having a weight of 100 times the weight of the powder while stirring, to deposit a pigment. The mixture was filtered to obtain the crystal. The crystal was washed with water until the filtrate became neutral (pH of 7.0). Thus, a wet cake of a titanyl phthalocyanine pigment was prepared.

Two grams of the wet cake of the titanyl phthalocyanine pigment were added in 20 g of each of the organic solvents as shown in Table 7, and each mixture was stirred for 4 hours. Then 100 g of methanol were added therein, and each mixture was stirred for one hour and then filtered. The filtered cake was then dried.

Thus titanyl phthalocyanine crystals of the present invention of Synthesis Examples 1 to 6 and comparative titanyl phthalocyanine crystals of Comparative Synthesis Examples 1 to 2 were prepared.

X-ray irradiated each of the titanyl phthalocyanine crystals to obtain X-ray diffraction spectra. The conditions were as follows:

X-ray tube: copper

Voltage: 50 kV

Current: 30 mA

Scanning speed: 2°/min

Scanning range: 3° to 40°

Time constant: 2 seconds

The position of a peak which was observed at a lowest Bragg (2θ) angle in the spectrum (hereinafter referred to as a lowest angle peak) was determined. In addition, a peak ratio of the peak intensity of a peak at a Bragg (2θ) angle of 28.6° to the peak intensity of a peak at a Bragg (2θ) angle of 27.2° was determined. Before the peak ratio was determined, the base line was corrected.

The results are shown in Table 7.

The ratio of the peak intensity observed for a peak at 28.6±0.2° to the maximum diffraction peak at 27.2±0.2° is less than 0.2 for the titanyl phthalocyanine crystal of the invention.

At this point, errors of ±0.2° are introduced with respect to the angles in the synthesis and measurements.

Figure 7:
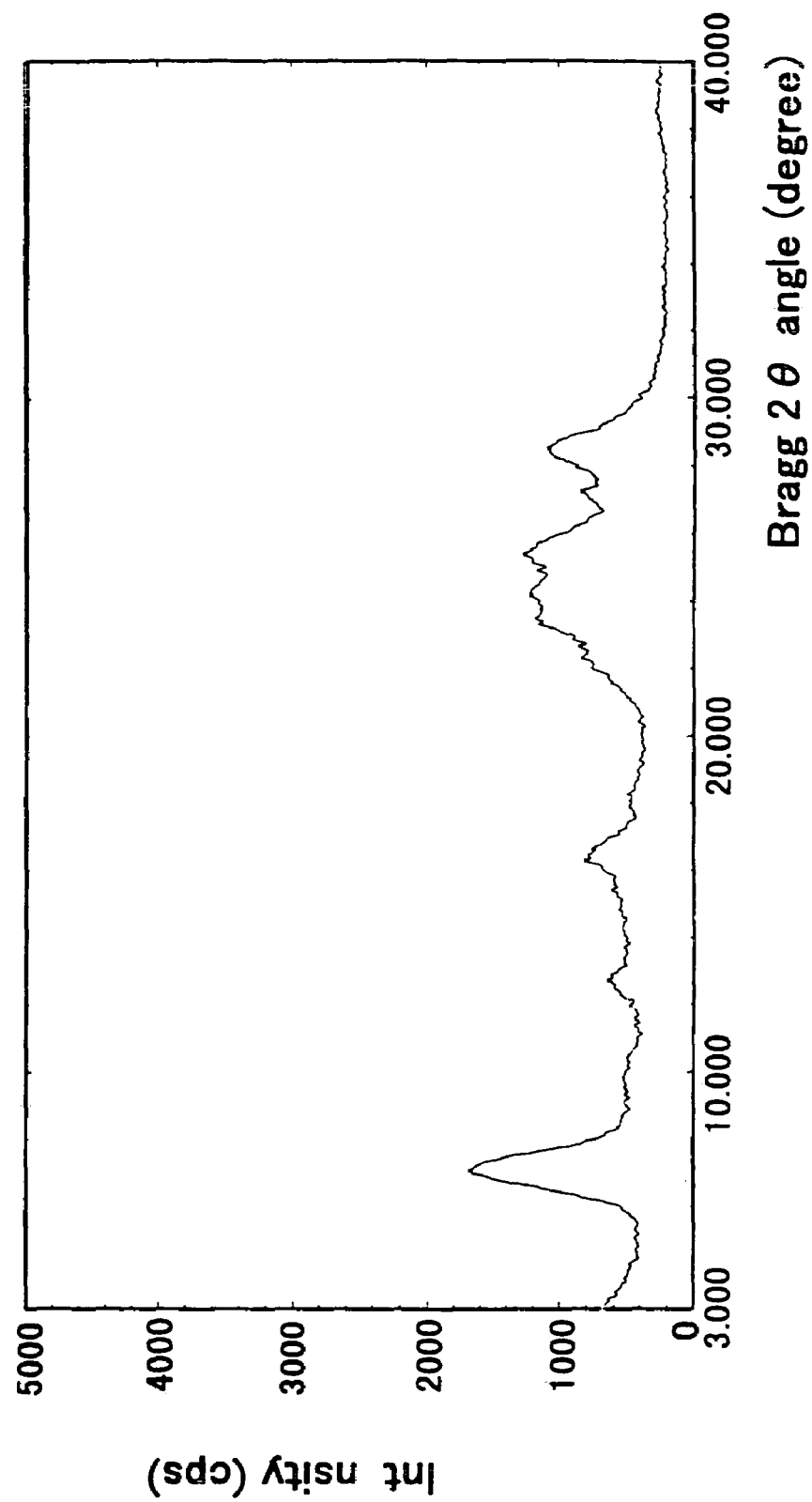
FIG. 7 is a graph illustrating the X-ray diffraction spectrum of a wet cake (i.e., an intermediate product) of the titanyl phthalocyanine crystal of the present invention.

In addition, the X-ray diffraction spectrum of the titanyl phthalocyanine pigment, which was prepared by drying the wet cake of the titanyl phthalocyanine pigment, is shown in FIG. 7.

Figure 8:
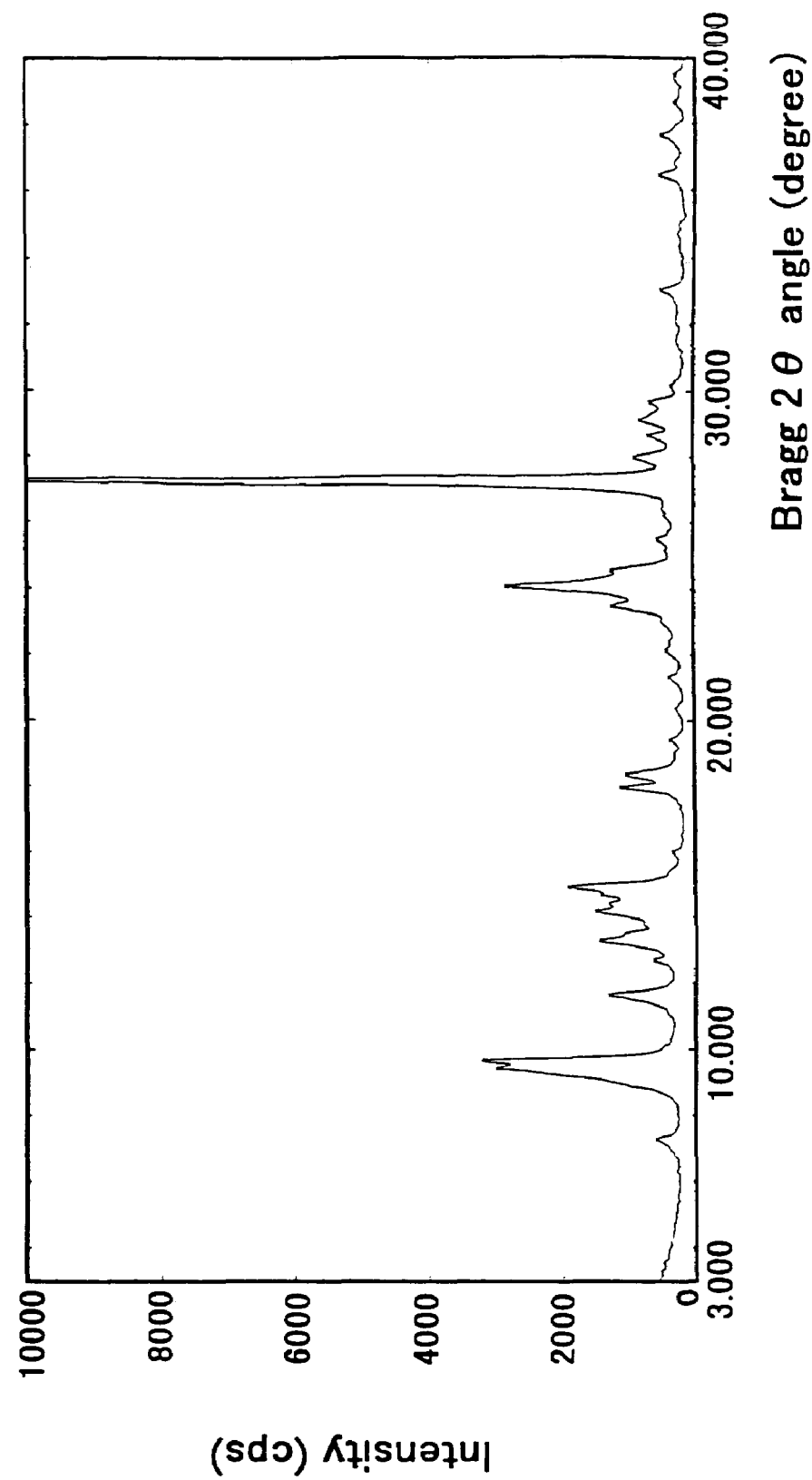
FIG. 8 is a graph illustrating the X-ray diffraction spectrum of an embodiment of the titanyl phthalocyanine crystal prepared in Synthesis Example 4.
Figure 9:
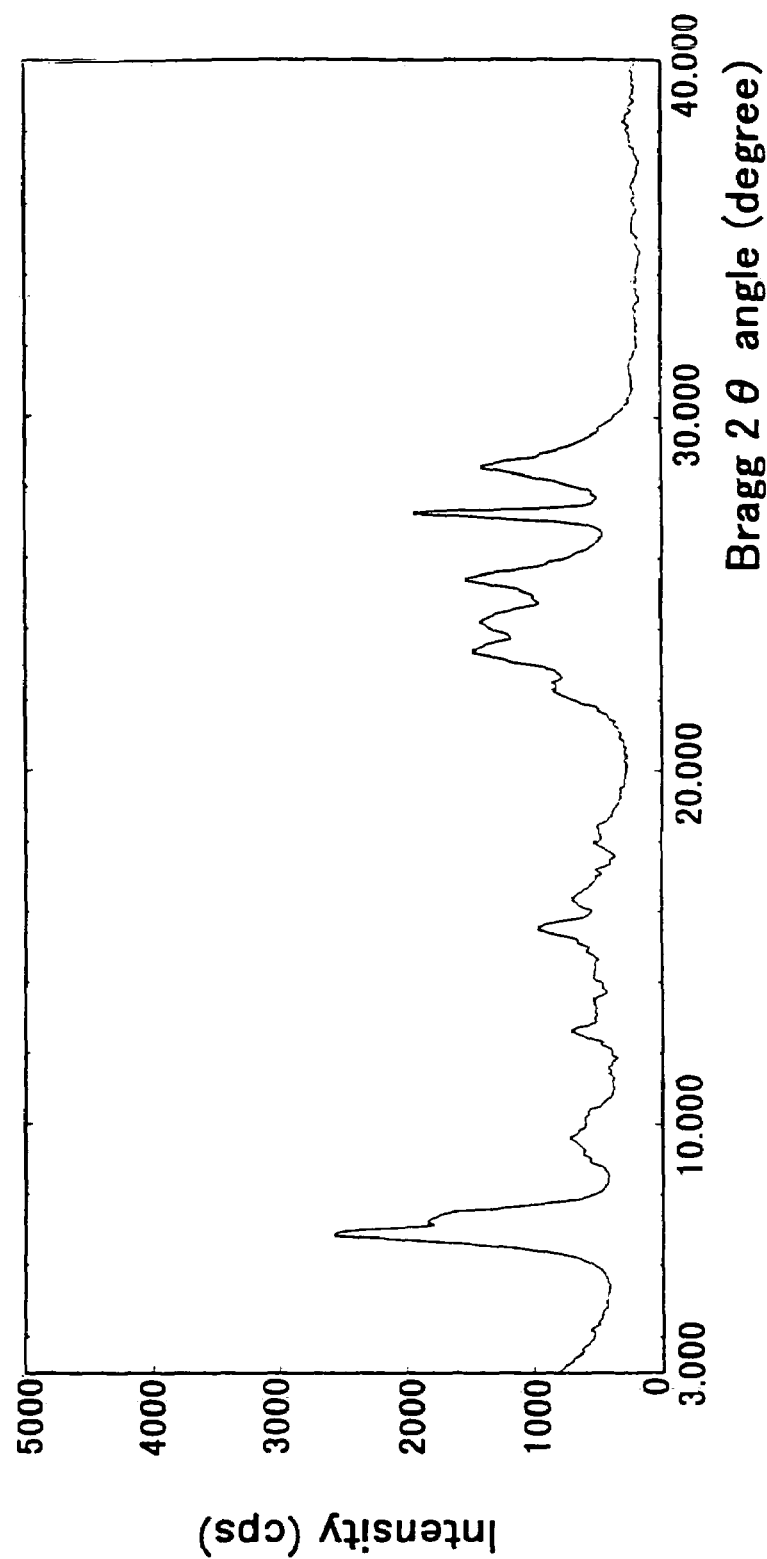
FIG. 9 is a graph illustrating the X-ray diffraction spectrum of another embodiment of the titanyl phthalocyanine crystal prepared in Comparative Synthesis Example 1.
Figure 10:
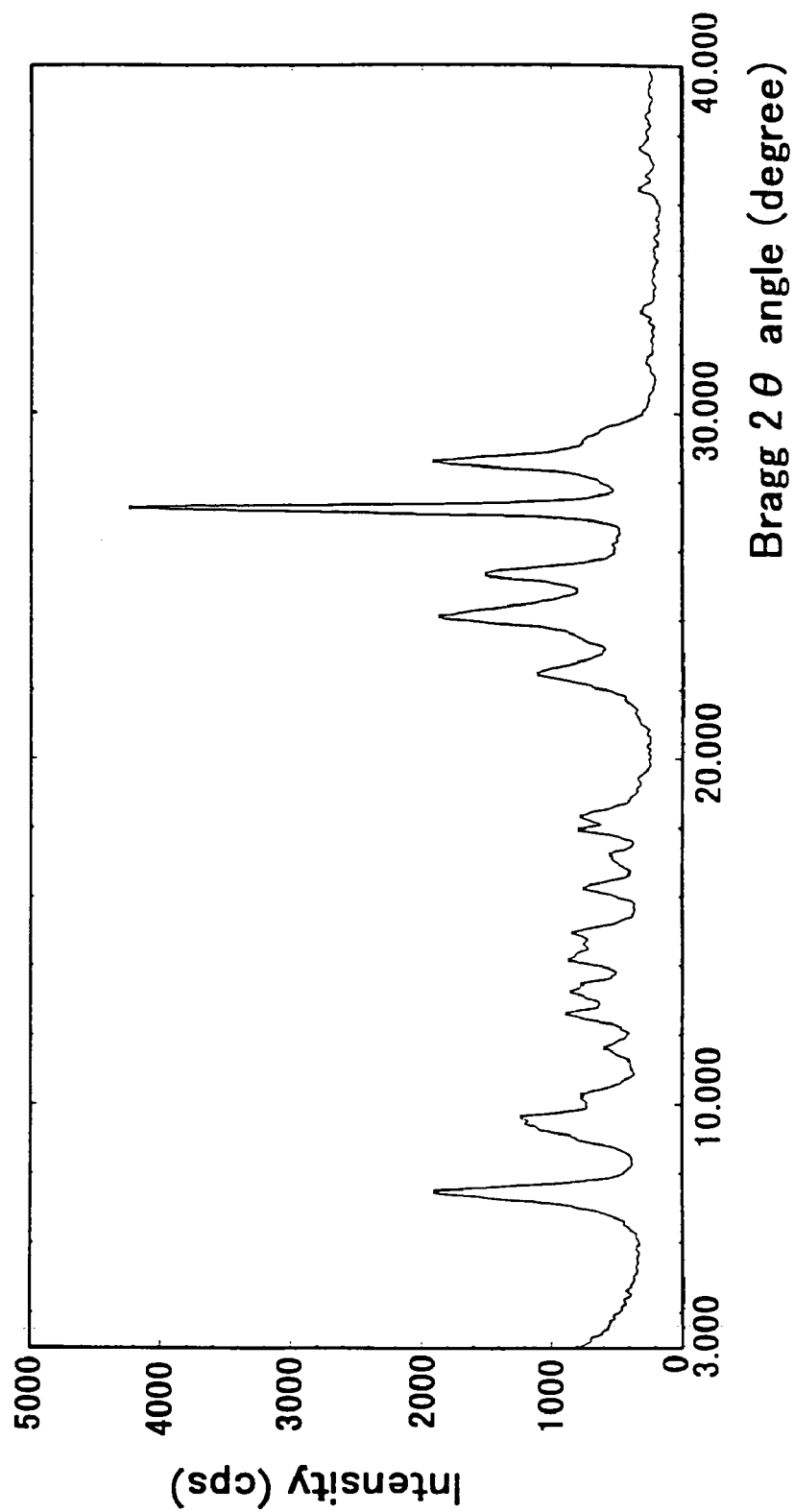
FIG. 10 is a graph illustrating the X-ray diffraction spectrum of another embodiment of the titanyl phthalocyanine crystal prepared in Comparative Synthesis Example 2.

The spectra of the titanyl phthalocyanine crystals prepared in Synthesis Examples 1 to 6 were substantially the same, and therefore the spectrum of the crystal prepared in Synthesis Example 4 is shown in FIG. 8 as a typical example. The X-ray diffraction spectra of the titanyl phthalocyanine crystals prepared in Comparative Synthesis Examples 1 to 2 are shown in FIGS. 9 and 10, respectively.

TABLE 7

| | Solvent used | Position of lowest angle peak (°) | Peak ratio (%) P1(28.6°)/ PI(27.2°)* |
|---|---|---|---|
| Synthesis Example 1 | Tetrahydrofuran | 7.3 | 7.2 |
| Synthesis Example 2 | Toluene | 7.3 | 8.0 |
| Synthesis Example 3 | Methylene chloride | 7.3 | 6.6 |
| Synthesis Example 4 | Carbon disulfide | 7.3 | 5.8 |
| Synthesis Example 5 | o-dichlorobenzene | 7.3 | 8.2 |
| Synthesis Example 6 | 1,1,2-trichloroethane | 7.3 | 7.4 |
| Comparative Synthesis Example 1 | Methanol | 6.9 | 72.4 |
| Comparative Synthesis Example 2 | Aniline | 7.5 | 44.9 |

*Peak ratio (%) = {(Peak intensity of the peak at 28.6°)/(Peak intensity of the peak at 27.2°)} × 100

Comparative Synthesis Example 3

A TiOPc crystal was prepared by the method disclosed in Japanese Laid-Open Patent Publication No. 1-299874, which is as follows:

The wet cake of the titanyl phthalocyanine pigment prepared in Synthesis Example 1 was dried. One gram of the dried pigment was added in polyethylene glycol of 50 g. The mixture was dispersed using a mill in which glass beads of 100 g were included. After this crystal change operation, the pigment was washed with dilute sulfuric acid and then washed with a sodium hydroxide aqueous solution. The washed pigment was dried.

Thus a comparative TiOPc crystal was prepared.

Comparative Synthesis Example 4

A TiOPc crystal was prepared by the method disclosed in Japanese Laid-Open Patent Publication No. 3-269064, which is as follows:

The wet cake of the titanyl phthalocyanine pigment prepared in Synthesis Example 1 was dried. One gram of the dried pigment was added in a mixture solvent of 100 g of a deionized water and 1 g of monochlorobenzene. The mixture was stirred for 1 hour at 50° C. After this operation, the pigment was washed with methanol and then washed with deionized water. The washed pigment was dried.

Thus a comparative TiOPc crystal was prepared.

Comparative Synthesis Example 5

A TiOPc crystal was prepared by the method disclosed in Japanese Laid-Open Patent Publication No. 2-8256, which is as follows:

In a container, 9.8 grams of phthalodinitrile and 75 ml of 1-chloronaphthalene were contained and mixed while stirring. Under a nitrogen current, 2.2 ml of titanium tetrachloride were dropped therein. After titanium tetrachloride was added, the temperature of the mixture was gradually increased to 200° C. The temperature of the mixture was maintained at a temperature range of from 200° C. to 220 for 3 hours while stirring the mixture to react the compounds.

After the reaction was terminated, the reaction product was cooled. When the reaction product was cooled to 130° C., the reaction product was filtered to obtain the precipitate. Then the precipitate was washed with 1-chloronaphthalene until the precipitate colored blue. The precipitate was then washed with methanol several times, and further washed with hot water of 80° C. several times.

Thus a comparative TiOPc was prepared.

Comparative Synthesis Example 6

A TiOPc crystal was prepared by the method disclosed in Japanese Laid-Open Patent Publication No. 64-17066, which is as follows:

Five (5) grams of α-type TiOPc, 10 g of sodium chloride, and 5 g of poyethyleneglycol were mixed and subjected to a crystal changing treatment at 100° C. for 10 hours using a sand grinder. The crystal was washed with deionized water and then with methanol. The crystal was refined using a dilute sulfuric acid, and then washed with deionized water until there was no sulfuric acid therein. Then the crystal was dried to prepare a comparative TiOPc crystal.

Comparative Synthesis Example 7

A TiOPc crystal was prepared by the method disclosed in Japanese Patent No. 2782765 (i.e., Japanese Laid-Open patent Publication No. 2-28265), which is as follows:

In a container, 20.4 parts of o-phthalodinitrile, 7.6 parts of titanium tetrachloride and 50 parts of quinoline were contained. The mixture was heated at 20° C. for 2 hours to react the compounds. Then the solvent was removed by steam-distillation. Then the reaction product was refined with 2% hydrochloric acid and then with 2% sodium hydroxide. The reaction product was washed with methanol and then with N,N-dimethylformamide, and then dried. Thus, titanyl phthalocyanine (TiOPc) was prepared. Two (2) parts of the tus prepared titanyl phthalocyanine were gradually added to 40 parts of 98% sulfuric acid of 5° C. to be dissolved therein. The solution was stirred for 1 hour while the temperature was maintained to be not higher than 5° C. The solution was gradually added to 400 parts of ice water, which were stirred at a high speed, to precipitate a crystal. The crystal was obtained by filtering. The crystal was washed until there was no acid in the filtrate. The thus prepared wet cake was added to 100 parts of tetrahydrofuran and stirred for about 5 hours. The mixture was filtered, and the filter cake was washed with tetrahydrofuran and then dried. Thus a comparative titanyl phthalocyanine crystal was prepared.

It was confirmed that the X-ray diffraction spectrum of the thus prepared titanyl phthalocyanine crystal was the same as that shown in the patent.

The X-ray diffraction spectra of the crystals prepared in Comparative Synthesis Examples 3 to 7 were obtained. The results are shown in Table 8.

TABLE 8

| | Position of lowest angle peak (°) | Peak ratio (PI(28.6°)/Pi(27.2°)) (%) |
|---|---|---|
| Comparative Synthesis Example 3 | 7.3 | 20.5 |
| Comparative Synthesis Example 4 | 9.6 | 11.6 |

TABLE 8-continued

|  | Position of lowest angle peak (°) | Peak ratio (PI(28.6°)/Pi(27.2°)) (%) |
|---|---|---|
| Comparative Synthesis Example 5 | 7.5 | 14.3 |
| Comparative Synthesis Example 6 | 7.3 (a peak is also observed at 7.6°) | 11.7 |
| Comparative Synthesis Example 7 | 7.5 | 6.5 |

Comparative Synthesis Example 8

A pigment which was prepared in the same way as described in Japanese Laid-Open Patent Publication No. 61-239248 was added to the crystal prepared in Synthesis Example 1 in an amount of 3% by weight, and then the mixture was mixed using a mortar. The X-ray diffraction spectrum thereof is shown in FIG. 11.

Figure 11:
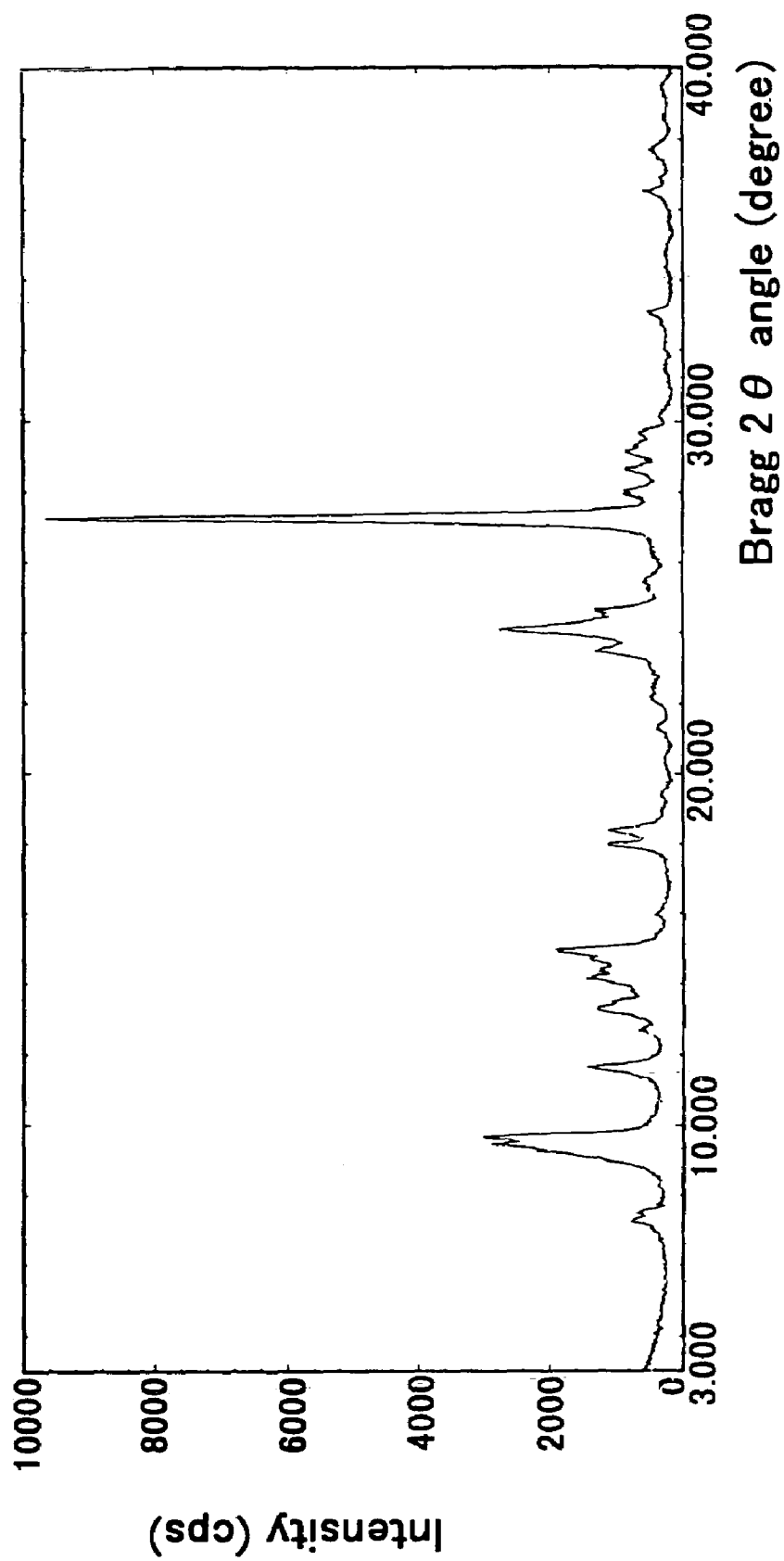
FIG. 11 is a graph illustrating the X-ray diffraction spectrum of another embodiment of the titanyl phthalocyanine crystal prepared in Comparative Synthesis Example 8.

In FIG. 11, two peaks are observed at 7.3° and 7.5° at the low angle side. It can be understood that these two peaks are of the different compounds.

Comparative Synthesis Example 9

A pigment which was prepared in the same way as described in Japanese Laid-Open Patent Publication No. 61-239248 was added to the crystal prepared in Comparative Synthesis Example 7 in an amount of 3% by weight, and then the mixture was mixed using a mortar. The X-ray diffraction spectrum thereof is shown in FIG. 12.

Figure 12:
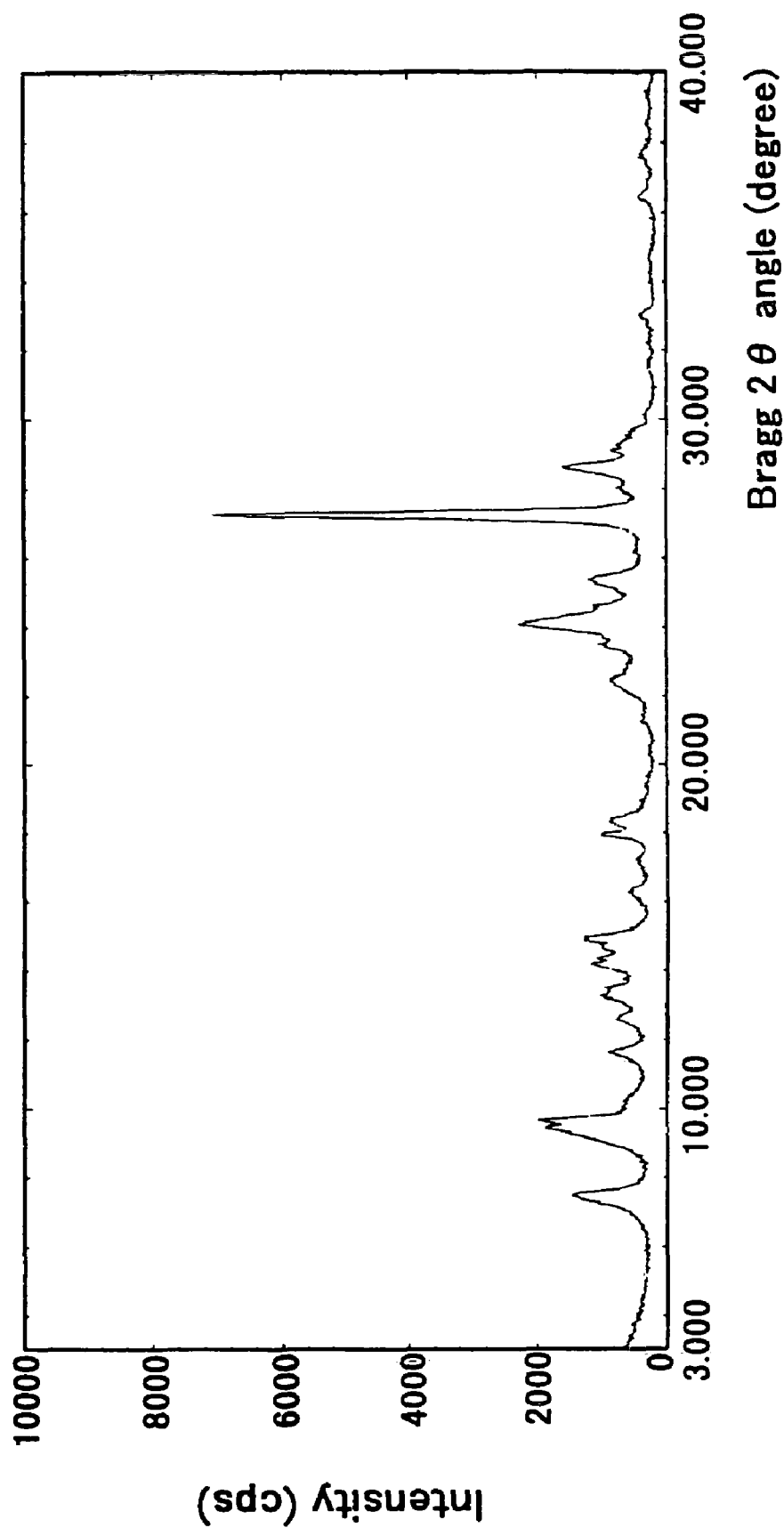
FIG. 12 is a graph illustrating the X-ray diffraction spectrum of another embodiment of the titanyl phthalocyanine crystal prepared in Comparative Synthesis Example 9.

Since only a peak is observed at 7.5° at the low angle side of the spectrum shown in FIG. 12, the spectrum shown in FIG. 12 is clearly different from that in FIG. 11.

Examples 1 to 6 and Comparative Examples 1 to 9

The following dispersions were prepared using the TiOPc crystals prepared in Synthesis Examples 1 to 6 and Comparative Synthesis Examples 1 to 9.

| Formulation of dispersion | |
|---|---|
| TiOPc crystal | 15 |
| Polyvinyl butyral (vinyl acetate unit ratio of 4% by mole) | 10 |
| Methyl ethyl ketone | 600 |

At first, polyvinyl butyral was dissolved in methyl ethyl ketone. Then a crystal was added to the solution and dispersed using a ball mill.

Thus, 15 dispersions of Examples 1 to 6 and Comparative Examples 1 to 9 were prepared.

Examples 7 to 12 and Comparative Examples 10 to 18

The procedure for preparation of the dispersions in Examples 1 to 6 and Comparative Examples 1 to 9 was repeated except that methyl ethyl ketone was replaced with n-butyl acetate.

Thus 15 dispersions of Examples 7 to 12 and Comparative Examples 10 to 18 were prepared.

Comparative Examples 19 to 33

The procedure for preparation of the dispersions in Examples 1 to 6 and Comparative Examples 1 to 9 was repeated except that methyl ethyl ketone was replaced with butanol.

Thus 15 dispersions of Comparative Examples 19 to 33 were prepared.

Each of the thus prepared dispersions of Examples 1 to 12 and comparative Examples 1 to 33 was coated by a dip coating method on a respective aluminum drum whose surface had been subjected to an anodic oxidation treatment.

In addition, the dispersions of Examples 1 to 12 and comparative Examples 1 to 33 were preserved for 1 month. Then each dispersion was also coated on a respective aluminum drum whose surface had been subjected to an anodic oxidation treatment. The formed layers were good when the dispersions of Examples 1 to 12 and Comparative Examples 1 to 18 were used, however, the layers which were prepared using Comparative Examples 19 to 33 were not good because the crystals were not uniformly dispersed therein.

The dispersions preserved for one month were observed whether there was a precipitate therein. As a result, the dispersions of Examples 1 to 12 and Comparative examples 1 to 18 had a small amount of precipitate, and the precipitate could be easily re-dispersed by stirring. However, the dispersions of Comparative Examples of 19 to 33 had a large amount of precipitate. In addition, the precipitate was hard, and could not be easily re-dispersed.

Examples 13 to 18 and Comparative Examples 34 to 42

Photoreceptors of the present invention and comparative photoreceptors were prepared using the dispersions prepared in Examples 1 to 6 and Comparative Examples 1 to 9.

At first, the following undercoat layer coating liquid was coated on fifteen aluminum plates having a thickness of 1 mm and then dried. Thus fifteen aluminum plates having an undercoat layer of 4 μm thick were prepared.

| Formulation of undercoat layer coating liquid | |
|---|---|
| Titanium dioxide powder | 15 |
| Polyvinyl butyral | 6 |
| Methyl ethyl ketone | 150 |

Each of the following charge generation layer coating liquids were coated on the undercoat layer of one of the aluminum plates and then dried. Thus, charge generation layers having a thickness of 0.3 μm were formed.

| Formulation of charge generation layer coating liquid | |
|---|---|
| Each of TiOPc crystal dispersions of Examples 1 to 6 and Comparative Examples 1 to 9 | 100 |

The following charge transport layer coating liquid was coated on each of the charge generation layers and then dried such that the thickness thereof was 25 μm.

| Formulation of charge transport layer coating liquid | |
|---|---|
| Polycarbonate resin | 10 |
| Charge transport material having the following formula (a) | 8 |

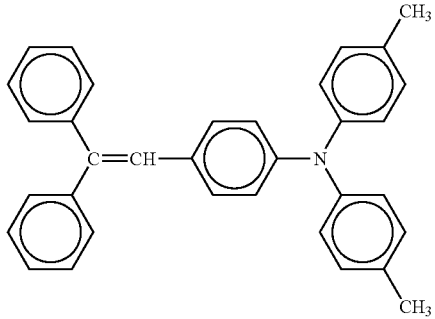

(a)

| | |
|---|---|
| Methylene chloride | 80 |

The charge properties of the thus prepared fifteen photoreceptors were evaluated by the following method using an electrostatic paper analyzer SP-428 manufactured by Kawaguchi Electric Works.

A corona voltage of −5.6 kV was applied to a photoreceptor for 15 seconds to charge the photoreceptor. The surface potential (V15) of the photoreceptor was measured at a time when stopping the corona discharging. At a time 15 seconds after stopping the corona discharging, the photoreceptor was then exposed to light of 1 μW/cm$^2$ whose wavelength was 780±10 nm. At this point, the surface potential (Vd15) of the photoreceptor was measured at a time just before the light irradiation.

In this test, the photoreceptors were evaluated with respect to V15, and a ratio of Vd15 to V15 as the charging properties. In addition, a light quantity (E1/2) needed for decrease the potential Vd15 to one half was measured to evaluate the photosensitivity of the photoreceptors.

Further, after the above-mentioned charging/lighting operation was repeated for 30 minutes, the same operation was performed to check the charge properties of the photoreceptor after the photoreceptor was fatigued by the repeated charging and lighting.

The results are shown in Table 9.

TABLE 9

| Disper-sion used | Initial state | | | After fatigued | | E1/2 (μJ/cm$^2$) |
|---|---|---|---|---|---|---|
| | V15 (−V) | Vd15/ V15 | E1/2 (μJ/cm$^2$) | V15 (−V) | Vd15/ V15 | |
| Ex. 13 | Ex. 1 | 1580 | 0.83 | 0.20 | 1492 | 0.79 | 0.19 |
| Ex. 14 | Ex. 2 | 1570 | 0.84 | 0.22 | 1490 | 0.80 | 0.21 |
| Ex. 15 | Ex. 3 | 1575 | 0.85 | 0.21 | 1488 | 0.80 | 0.20 |
| Ex. 16 | Ex. 4 | 1583 | 0.84 | 0.21 | 1493 | 0.79 | 0.21 |
| Ex. 17 | Ex. 5 | 1580 | 0.83 | 0.21 | 1486 | 0.79 | 0.20 |
| Ex. 18 | Ex. 6 | 1578 | 0.83 | 0.22 | 1480 | 0.78 | 0.21 |
| Comp. Ex. 34 | Comp. Ex. 1 | 1090 | 0.30 | 0.43 | 700 | 0.11 | 0.44 |
| Comp. Ex. 35 | Comp. Ex. 2 | 1580 | 0.74 | 0.35 | 1030 | 0.22 | 0.36 |
| Comp. Ex. 36 | Comp. Ex. 3 | 1492 | 0.73 | 0.23 | 1218 | 0.36 | 0.25 |
| Comp. Ex. 37 | Comp. Ex. 4 | 1523 | 0.81 | 0.30 | 1322 | 0.44 | 0.41 |

TABLE 9-continued

| Disper-sion used | Initial state | | | After fatigued | | E1/2 (μJ/cm$^2$) |
|---|---|---|---|---|---|---|
| | V15 (−V) | Vd15/ V15 | E1/2 (μJ/cm$^2$) | V15 (−V) | Vd15/ V15 | |
| Comp. Ex. 38 | Comp. Ex. 5 | 1486 | 0.45 | 0.33 | 1080 | 0.18 | 0.35 |
| Comp. Ex. 39 | Comp. Ex. 6 | 1477 | 0.60 | 0.24 | 1178 | 0.21 | 0.27 |
| Comp. Ex. 40 | Comp. Ex. 7 | 1510 | 0.65 | 0.23 | 1235 | 0.48 | 0.24 |
| Comp. Ex. 41 | Comp. Ex. 8 | 1490 | 0.80 | 0.20 | 1360 | 0.49 | 0.20 |
| Comp. Ex. 42 | Comp. Ex. 9 | 1470 | 0.59 | 0.24 | 1053 | 0.20 | 0.24 |

As can be understood from Table 9, the photoreceptors of the present invention of Examples 13 to 18 have good charging Example 19

The procedure for preparation of the photoreceptor in Example 13 was repeated except that the charge generation layer coating liquid was changed to the following.

| Formulation of charge generation layer coating liquid | |
|---|---|
| TiOPc crystal (synthesized in Synthesis Example 4) | 15 |
| Polyvinyl butyral (vinyl acetate unit ratio of 5.5% by mole) | 10 |
| Methyl ethyl ketone | 600 |

The way to prepare the charge generation layer coating liquid was as follows:

Polyvinyl butyral was dissolved in methyl ethyl ketone, and then the TiOPc crystal was added thereto. The mixture was dispersed using a ball mill.

Thus a photoreceptor of the present invention was prepared.

Example 20

The procedure for preparation of the photoreceptor in Example 13 was repeated except that the charge generation layer coating liquid was changed to the following.

| Formulation of charge generation layer coating liquid | |
|---|---|
| TiOPc crystal (synthesized in Synthesis Example 4) | 15 |
| Polyvinyl butyral (vinyl acetate unit ratio of 2% by mole) | 10 |
| Methyl ethyl ketone | 600 |

The way to prepare the charge generation coating liquid was the same as that mentioned in Example 19.

Thus a photoreceptor of the present invention was prepared.

The thus prepared photoreceptors were evaluated in the same way as performed in Example 13.

The results are shown in Table 10.

TABLE 10

| | Initial state | | | After fatigued | | |
|---|---|---|---|---|---|---|
| | V15 (−V) | Vd15/ V15 | E1/2 (μJ/cm$^2$) | V15 (−V) | Vd15/ V15 | E1/2 (μJ/cm$^2$) |
| Ex. 19 | 1580 | 0.85 | 0.21 | 1497 | 0.80 | 0.21 |
| Ex. 20 | 1560 | 0.83 | 0.21 | 1350 | 0.58 | 0.21 |

As can be understood from Table 10, the photoreceptor including polyvinyl butyral having a vinyl acetate unit ratio of 5.5% by mole has a relatively good charge properties and photosensitivity compared to the photoreceptor including polyvinyl butyral having a vinyl acetate unit ratio of 2% by mole in particular when repeatedly used. Namely, as mentioned above, polyvinyl acetal having a vinyl acetate unit ratio not less than 4% by mole is preferable.

Then examples of photoreceptors using a low-molecular-weight charge transport material and an inactive polymer in the charge transport layer will be explained.

Examples 21 to 26 and Comparative
Examples 43 and 44

The following undercoat layer coating liquid was coated on eight electroformed nickel belts and then dried. Thus an undercoat layer having a thickness of 4 μm was formed on each of the nickel belts.

| Formulation of undercoat layer coating liquid | |
|---|---|
| Titanium dioxide powder | 15 |
| Polyvinyl butyral | 6 |
| Methyl ethyl ketone | 150 |

Each of the following charge generation layer coating liquids was coated on the respective undercoat layer of the nickel belts. Thus charge generation layers having a thickness of 0.3 μm were prepared.

| Formulation of charge generation layer coating liquids | |
|---|---|
| Each of TiOPc crystals of Synthesis Examples 1 to 6 and Comparative Synthesis Examples 1 and 2 | 15 |
| Polyvinyl butyral | 6 |
| Methyl ethyl ketone | 600 |

The way to prepare the charge generation layer coating liquid was as follows:

Polyvinyl butyral was dissolved in methyl ethyl ketone, and then TiOPc was added therein. The mixture was dispersed by bead milling.

The following charge transport layer coating liquid was coated on each of the charge generation layers and then dried. Thus a charge transport layer of 25 μm thick was prepared.

| Formulation of charge transport layer coating liquid | |
|---|---|
| A-type polycarbonate | 10 |
| Methylene chloride | 80 |
| Charge transport material having formula (a) | 7 |

Thus photoreceptors of Examples 21 to 26 and Comparative Examples 43 and 44 were prepared.

Example 27

The procedure for preparation of the photoreceptor in Example 21 was repeated except that the charge transport material (a) in the charge transport layer coating liquid was replaced with a compound having the following formula (b).

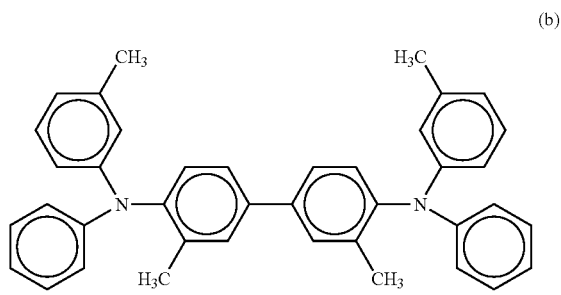

(b)

Thus a photoreceptor of Example 27 was prepared.

Example 28

The procedure for preparation of the photoreceptor in Example 21 was repeated except that the charge transport material (a) in the charge transport layer coating liquid was replaced with a compound having the following formula (c).

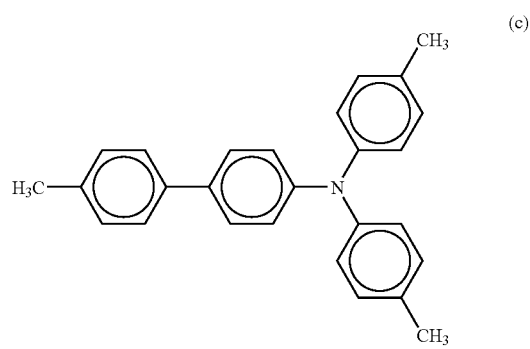

(c)

Thus a photoreceptor of Example 28 was prepared.

Example 29

The procedure for preparation of the photoreceptor in Example 21 was repeated except that the charge transport material (a) in the charge transport layer coating liquid was replaced with a compound having the following formula (d).

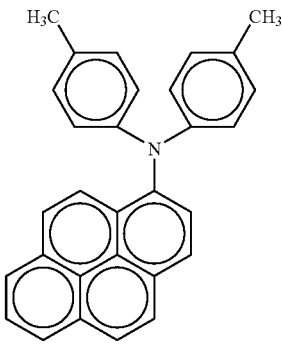
(d)

Thus a photoreceptor of Example 29 was prepared.

Example 30

The procedure for preparation of the photoreceptor in Example 21 was repeated except that the charge transport material (a) in the charge transport layer coating liquid was replaced with a compound having the following formula (e).

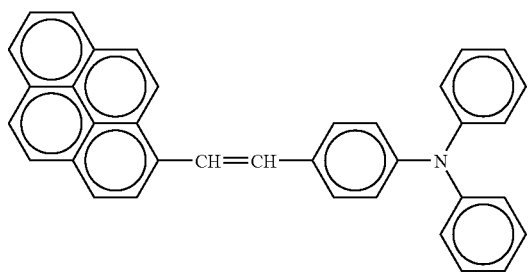
(e)

Thus a photoreceptor of Example 30 was prepared.

Example 31

The procedure for preparation of the photoreceptor in Example 21 was repeated except that the charge transport material (a) in the charge transport layer coating liquid was replaced with a compound having the following formula (f).

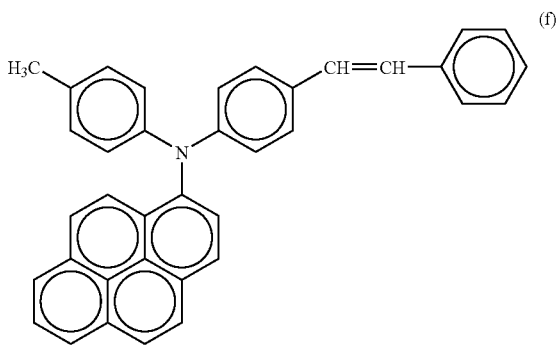
(f)

Thus a photoreceptor of Example 31 was prepared.

Comparative Examples 45 to 50

Six photoreceptors were prepared by replacing the charge transport material (a) in the charge transport layer coating liquid in Examples 21 to 26 with the charge transport material having the following formula (g).

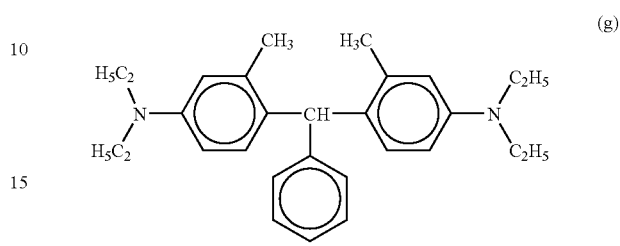
(g)

Thus photoreceptors of Comparative Example 45 to 50 were prepared.

Comparative Examples 51 to 53

The procedure for preparation of the photoreceptor in Comparative Examples 40 to 42 was repeated except that the substrate was changed from the aluminum plate to nickel belt used in Example 21.

Thus photoreceptors of Comparative Examples 51 to 53 were prepared.

Each of the thus prepared photoreceptors of Examples 21 to 31 and Comparative Examples 43 to 53 was set one by one in an electrophotographic image forming apparatus as shown in FIG. 5 to perform a running test in which 10000 copies were continuously produced. At this point, the pre-cleaning light irradiating device 26 was eliminated therefrom. A laser diode emitting a laser having a wavelength of 780 nm was used as a light source of imagewise light irradiating device 24. The laser emitted by the laser diode reflected at a polygon mirror and then irradiated the photoreceptor to form an latent image. In addition, a probe of a surface potential meter was set at a position just before the developing area to measure the surface potential of the photoreceptor to measure the surface potentials of a lighted area of the photoreceptor which had been exposed to light and a dark area which had not been exposed to light. This evaluation was performed with respect to the initial photoreceptors and the photoreceptors after the running test.

The results are shown in Table 11.

In addition, charge transport layers which were the same as those of the photoreceptors of Examples 21 to 31 and Comparative Examples 43 to 53 were prepared. The mobilities of the charge transport layers were measured while applying a field strength thereto corresponding to that formed at the dark area of the photoreceptors.

The results are also shown in Table 11.

TABLE 11

| | Crystal used | Surface potential (Initial) | | Surface potential (after running test) | | Mobility ($\times 10^{-5}$) ($cm^2$/ V·sec) |
| --- | --- | --- | --- | --- | --- | --- |
| | | Dark area (−V) | Light area (−V) | Dark area (−V) | Light area (−V) | |
| Ex. 21 | Synthesis Ex. 1 | 950 | 120 | 945 | 125 | 1.7 |

TABLE 11-continued

| | Crystal used | Surface potential (Initial) Dark area (−V) | Surface potential (Initial) Light area (−V) | Surface potential (after running test) Dark area (−V) | Surface potential (after running test) Light area (−V) | Mobility (×10⁻⁵) (cm²/ V·sec) |
|---|---|---|---|---|---|---|
| Ex. 22 | Synthesis Ex. 2 | 945 | 125 | 945 | 130 | 1.7 |
| Ex. 23 | Synthesis Ex. 3 | 960 | 130 | 955 | 135 | 1.7 |
| Ex. 24 | Synthesis Ex. 4 | 965 | 125 | 965 | 125 | 1.7 |
| Ex. 25 | Synthesis Ex. 5 | 955 | 120 | 950 | 125 | 1.7 |
| Ex. 26 | Synthesis Ex. 6 | 960 | 125 | 955 | 130 | 1.7 |
| Ex. 27 | Synthesis Ex. 1 | 955 | 130 | 950 | 130 | 1.3 |
| Ex. 28 | Synthesis Ex. 1 | 965 | 120 | 960 | 115 | 2.2 |
| Ex. 29 | Synthesis Ex. 1 | 945 | 130 | 940 | 125 | 1.5 |
| Ex. 30 | Synthesis Ex. 1 | 950 | 125 | 945 | 120 | 1.4 |
| Ex. 31 | Synthesis Ex. 1 | 940 | 115 | 930 | 115 | 4.0 |
| Comp. Ex. 43 | Comp. Synthesis Ex. 1 | 900 | 180 | 760 | 230 | 1.7 |
| Comp. Ex. 44 | Comp. Synthesis Ex. 2 | 920 | 150 | 790 | 185 | 1.7 |
| Comp. Ex. 45 | Synthesis Ex. 1 | 960 | 150 | 910 | 250 | 0.4 |
| Comp. Ex. 46 | Synthesis Ex. 2 | 965 | 155 | 900 | 260 | 0.4 |
| Comp. Ex. 47 | Synthesis Ex. 3 | 960 | 150 | 910 | 255 | 0.4 |
| Comp. Ex. 48 | Synthesis Ex. 4 | 965 | 160 | 905 | 260 | 0.4 |
| Comp. Ex. 49 | Synthesis Ex. 5 | 955 | 155 | 910 | 260 | 0.4 |
| Comp. Ex. 50 | Synthesis Ex. 6 | 960 | 160 | 905 | 270 | 0.4 |
| Comp. Ex. 51 | Synthesis Ex. 7 | 930 | 130 | 810 | 140 | 1.7 |
| Comp. Ex. 52 | Synthesis Ex. 8 | 940 | 120 | 830 | 125 | 1.7 |
| Comp. Ex. 53 | Synthesis Ex. 9 | 930 | 140 | 780 | 150 | 1.7 |

As can be understood from Table 11, the photoreceptors of Examples 21 to 31 can maintain good charging properties even when repeatedly used.

Example 32 and Comparative Examples 54 and 55

On three same aluminum cylinders, the following undercoat layer coating liquid was coated and then dried to form an undercoat layer having a thickness of 3.5 μm thereon.

| Formulation of undercoat layer coating liquid | |
|---|---|
| Titanium dioxide powder | 400 |
| Melamine resin | 65 |
| Alkyd resin | 120 |
| Methyl ethyl ketone | 400 |

Each of the following charge generation layer coating liquids was coated on the undercoat layer of the respective aluminum cylinder and then dried to form a charge generation layer having a thickness of 0.2 μm thereon.

| Formulation of charge generation layer coating liquids | |
|---|---|
| Each of TiOPc crystals of Synthesized Example 1 and Comparative Synthesis Examples 3 and 4 | 15 |
| Polyvinyl butyral | 10 |
| n-propyl acetate | 600 |

The way to prepare the charge generation coating liquid was as follows:

Polyvinyl butyral was dissolved in n-propyl acetate, and then TiOPc was added thereto. The mixture was dispersed by bead milling.

The following charge transport layer coating liquid was coated on each of the charge generation layer and then dried to form a charge transport layer having a thickness of 28 μm thereon.

| Formulation of charge transport layer coating liquid | |
|---|---|
| Z-type polycarbonate | 10 |
| Methylene chloride | 80 |
| Charge transport material having formula (a) | 7 |

Thus photoreceptors of Example 32 and Comparative Examples 54 and 55 were prepared.

Example 33

The procedure for preparation of the photoreceptor in Example 32 was repeated except that the charge transport layer coating liquid was replaced with the following coating liquid.

| Formulation of charge transport layer coating liquid | |
|---|---|
| Z-type polycarbonate | 10 |
| Methylene chloride | 80 |
| Charge transport material having formula (a) | 8 |

Thus a photoreceptor of Example 33 was prepared.

Example 34

The procedure for preparation of the photoreceptor in Example 32 was repeated except that the charge transport layer coating liquid was replaced with the following coating liquid.

| Formulation of charge transport layer coating liquid | |
|---|---|
| Z-type polycarbonate | 10 |
| Methylene chloride | 80 |
| Charge transport material having formula (a) | 10 |

Thus a photoreceptor of Example 34 was prepared.

The photoreceptors of Examples 32 to 34 and Comparative Examples 54 and 55 were subjected to the running test mentioned above in Example 21.

The first copy and the 10000th copy were visually observed to determine whether there was image defects.

The results are shown in Table 12.

TABLE 12

|  | TiOPc crystal used | Concentration of charge transport material (% by weight) | Image qualities (first copy) | Image qualities (10000th copy) |
|---|---|---|---|---|
| Ex. 32 | Synthesis Example 1 | 41 | Good | Good |
| Ex. 33 | Synthesis Example 1 | 44 | Good | Good |
| Ex. 34 | Synthesis Example 1 | 50 | Good | Slight black streaks (but still acceptable) |
| Comp. Ex. 54 | Comp. Synthesis Example 3 | 41 | Slight background fouling (but still acceptable) | Background fouling, and decrease of image density |
| Comp. Ex. 55 | Comp. Synthesis Example 4 | 41 | Slight background fouling (but still acceptable) | Background fouling, and decrease of image density |

As can be understood from Table 12, the photoreceptors of Examples 32 and 33 can produce good images even when repeatedly used. The photoreceptor of Example 34 is slightly inferior to the photoreceptors of Examples 32 and 33 with respect to the image qualities after the running test, however, the image qualities thereof are still acceptable.

In addition, the photoreceptors of Comparative Examples 51 to 53 were subjected to a running test in which 30000 copies were continuously produced using the image forming apparatus used in the running test mentioned above in Example 21. At this running test, the charging conditions were as follows:

DC voltage: −900V
AC voltage: 1.8 kV (peak-to-peak voltage)
(frequency of 2 kHz)
The result are shown in Table 13.

TABLE 13

|  | TiOPc crystal used | Image qualities (first copy) | Image qualities (30000th copy) |
|---|---|---|---|
| Comp. Ex. 51 | Comparative Synthesis Example 7 | Good | Black spots and background fouling |
| Comp. Ex. 52 | Comparative Synthesis Example 8 | Good | Black spots and background fouling |
| Comp. Ex. 53 | Comparative Synthesis Example 9 | Slight background fouling | Black spots and background fouling (worse than Comp. Example 51) |

Example 35

On an aluminum cylinder, which had been subjected to an anodic oxidation treatment and then a sealing treatment, the following charge generation layer coating liquid and charge transport layer coating liquid were coated and then dried one by one in this order to prepare a charge generation layer of 0.2 µm and a charge transport layer of 20 µm.

| Formulation of charge generation layer coating liquid | |
|---|---|
| TiOPc crystal (synthesized in Synthesis Example 4) | 15 |
| Polyvinyl butyral | 10 |
| n-butyl acetate | 600 |

The way to prepare the was as follows:

Polyvinyl butyral was dissolved in n-butyl acetate and then TiOPc was added thereto. The mixture was dispersed by bead milling.

| Formulation of charge transport layer coating liquid | |
|---|---|
| Polycarbonate | 10 |
| Methylene chloride | 80 |
| Charge transport material having the following formula (h) | 7 |

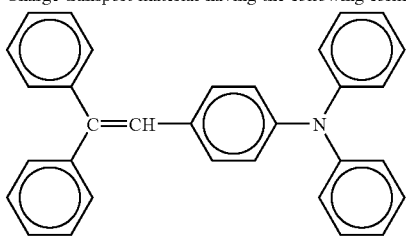

(h)

Thus a photoreceptor of Example 35 was prepared.

Example 36

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |
| Charge transport material having formula (b) | 7 |

Thus a photoreceptor of Example 36 was prepared.

Example 37

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |

| Formulation of charge transport layer coating liquid | |
|---|---|
| Charge transport material having the following formula (i) | 7 |

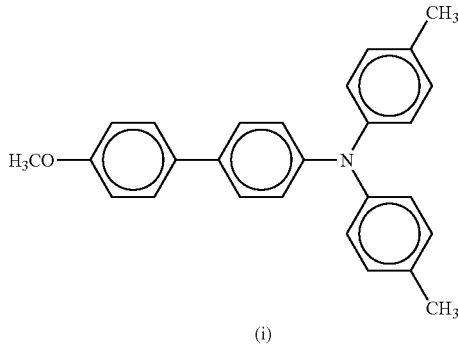

(i)

Thus a photoreceptor of Example 37 was prepared.

Example 38

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |
| Charge transport material having the following formula (j) | 7 |

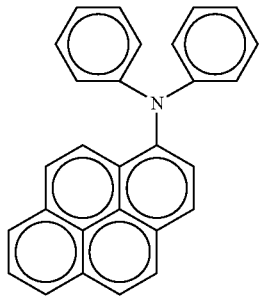

(j)

Thus a photoreceptor of Example 38 was prepared.

Example 39

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |

| Formulation of charge transport layer coating liquid | |
|---|---|
| Charge transport material having the following formula (k) | 7 |

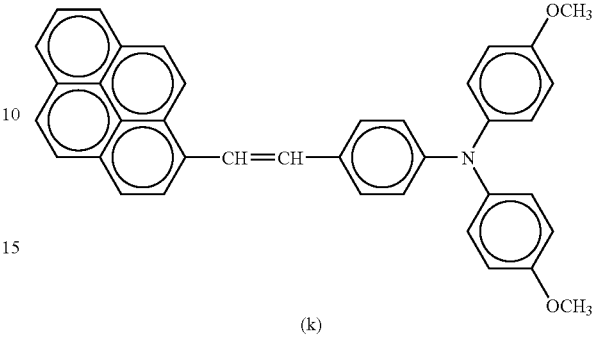

(k)

Thus a photoreceptor of Example 39 was prepared.

Example 40

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |
| Charge transport material having the following formula (m) | 7 |

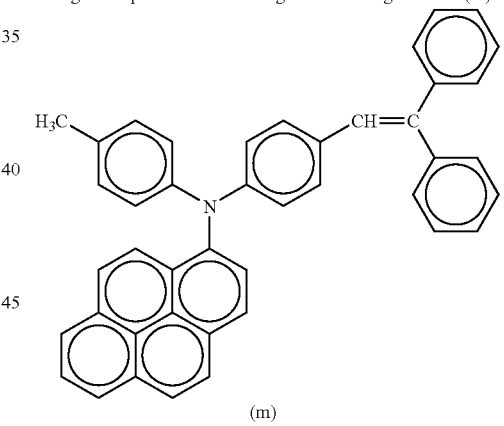

(m)

Thus a photoreceptor of Example 40 was prepared.

Comparative Example 56

The procedure for preparation of the photoreceptor in Example 35 was repeated except that the charge generation layer coating liquid was replaced with the following coating liquid.

| Formulation of charge generation layer coating liquid | |
|---|---|
| TiOPc crystal | 15 |
| (synthesized in Comparative Synthesis Example 5) | |
| Polyvinyl butyral | 10 |
| n-butyl acetate | 600 |

Thus a photoreceptor of Comparative Example 56 was prepared.

Comparative Example 57

The procedure for preparation of the photoreceptor in Example 35 was repeated except that the charge generation layer coating liquid was replaced with the following coating liquid.

| Formulation of charge generation layer coating liquid | |
|---|---|
| TiOPc crystal | 15 |
| (synthesized in Comparative Synthesis Example 6) | |
| Polyvinyl butyral | 10 |
| n-butyl acetate | 600 |

Thus a photoreceptor of Comparative Example 57 was prepared.

Comparative Example 58

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |
| Charge transport material having the following formula (n) | 7 |

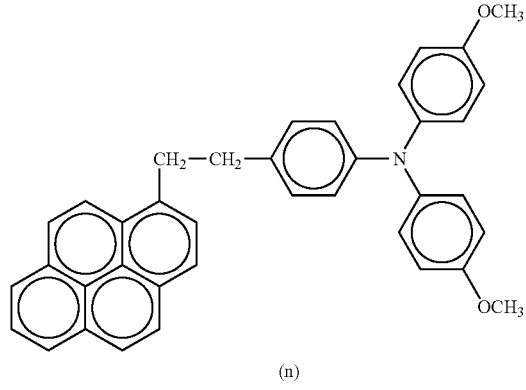

(n)

Thus a photoreceptor of Comparative Example 58 was prepared.

Comparative Example 59

The procedure for preparation of the photoreceptor in Example 35 was repeated except that the charge transport layer coating liquid was replaced with the following coating liquid.

| Formulation of charge transport layer coating liquid | |
|---|---|
| Polycarbonate | 10 |
| Methylene chloride | 80 |

-continued

| Formulation of charge transport layer coating liquid | |
|---|---|
| Charge transport material having the following formula (p) | 7 |

(p)

Thus a photoreceptor of Comparative Example 59 was prepared.

Each of the thus prepared photoreceptors of Examples 35 to 40 and Comparative Examples 56 to 59 was subjected to a running test which is the same as that mentioned in Example 21 except that the image forming apparatus was replaced with an apparatus including the process cartridge which is shown in FIG. 6. Each photoreceptor was set in the process cartridge and then the cartridge was set in its image forming apparatus.

The results are shown in Table 14.

TABLE 14

| | | Surface potential (Initial) | | Surface potential (after running test) | | Mobility |
|---|---|---|---|---|---|---|
| | Crystal used | Dark area (−V) | Light area (−V) | Dark area (−V) | Light area (−V) | (×10⁻⁵) (cm²/ V · sec) |
| Ex. 35 | Synthesis Ex. 4 | 950 | 120 | 945 | 120 | 1.6 |
| Ex. 36 | Synthesis Ex. 4 | 945 | 115 | 940 | 115 | 1.7 |
| Ex. 37 | Synthesis Ex. 4 | 955 | 120 | 945 | 125 | 1.5 |
| Ex. 38 | Synthesis Ex. 4 | 950 | 115 | 950 | 120 | 1.1 |
| Ex. 39 | Comp. Synthesis Ex. 4 | 955 | 125 | 950 | 120 | 1.1 |
| Ex. 40 | Comp. Synthesis Ex. 4 | 950 | 120 | 950 | 115 | 3.0 |
| Comp. Ex. 56 | Comp. Synthesis Ex. 5 | 915 | 140 | 710 | 205 | 1.6 |
| Comp. Ex. 57 | Comp. Synthesis Ex. 6 | 945 | 155 | 790 | 170 | 1.6 |
| Comp. Ex. 58 | Synthesis Ex. 4 | 950 | 180 | 970 | 260 | 0.03 |
| Comp. Ex. 59 | Synthesis Ex. 4 | 955 | 130 | 820 | 195 | 0.8 |

As can be understood from Table 14, the photoreceptors of Examples 35 to 40 can maintain good charge properties even when repeatedly used.

Next, the examples of photoreceptors including a charge transport layer including a charge transport polymer will be explained.

Examples 41 to 46 and Comparative Examples 60 and 61

The following undercoat layer coating liquid was coated on eight same electroformed nickel belts and then dried.

Thus an undercoat layer having a thickness of 4 μm was prepared on the respective nickel belt.

| Formulation of undercoat layer coating liquid | |
|---|---|
| Titanium dioxide | 15 |
| Polyvinyl butyral | 6 |
| Methyl ethyl ketone | 150 |

Each of the following charge generation layer coating liquids were coated on the undercoat layer of the respective nickel belt. Thus charge generation layers having a thickness of 0.3 μm were prepared.

| Formulation of charge generation layer coating liquids | |
|---|---|
| Each of TiOPc crystals of Synthesis Examples 1 to 6 and Comparative Synthesis Examples 1 and 2 | 15 |
| Polyvinyl butyral | 6 |
| Methyl ethyl ketone | 600 |

The charge generation layer coating liquids were prepared in the same way as that in Example 21.

The following charge transport layer coating liquid was coated on each of the charge generation layers and then dried. Thus a charge transport layer of 25 μm thick was prepared.

| Formulation of charge transport layer coating liquid | |
|---|---|
| Methylene chloride | 100 |
| Charge transport polymer having the following formula (q) | 10 |

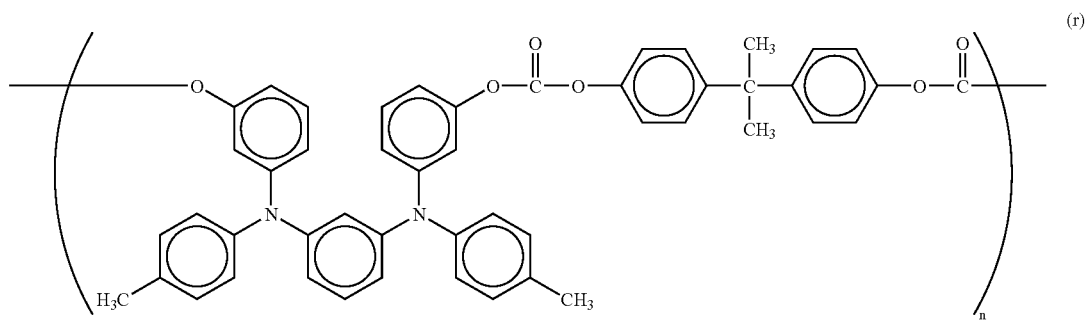

(q)

Thus photoreceptors of Examples 41 to 46 and Comparative Examples 60 and 61 were prepared.

Example 47

The procedure for preparation of the photoreceptors in Example 41 was repeated except that the charge transport polymer (q) in the charge transport layer coating liquid was replaced with a polymer having the following formula (r).

(r)

Thus a photoreceptor of Example 47 was prepared.

Example 48

The procedure for preparation of the photoreceptors in Example 41 was repeated except that the charge transport polymer (q) in the charge transport layer coating liquid was replaced with a polymer having the following formula (s).

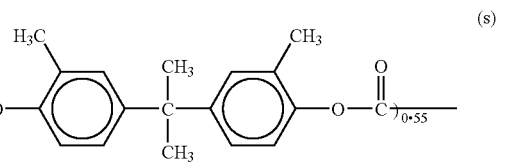

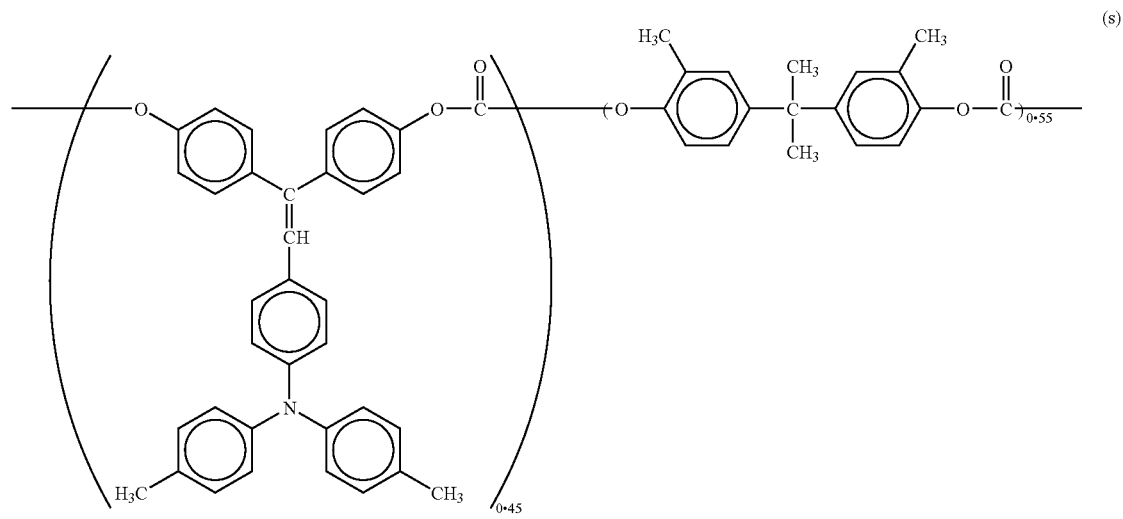

Thus a photoreceptor of Example 48 was prepared.

The thus prepared photoreceptors of Examples 41 to 48 and Comparative Examples 60 and 61 were subjected to a running test which is the same as that mentioned in Example 21 except that 30000 copies were continuously reproduced.

The mobility was measured when the field strength was $5 \times 10^5$ V/cm.

The results are shown in Table 15.

TABLE 15

|  | TiOPc crystal used | Surface potential (Initial) | | Surface potential (after running test) | | Mobility |
|---|---|---|---|---|---|---|
|  |  | Dark area (−V) | Light area (−V) | Dark area (−V) | Light area (−V) | ($\times 10^{-5}$) ($cm^2$/ V · sec) |
| Ex. 42 | Synthesis Ex. 1 | 940 | 125 | 930 | 120 | 1.1 |
| Ex. 42 | Synthesis Ex. 2 | 935 | 120 | 925 | 115 | 1.1 |
| Ex. 43 | Synthesis Ex. 3 | 940 | 130 | 925 | 125 | 1.1 |
| Ex. 44 | Synthesis Ex. 4 | 945 | 125 | 930 | 125 | 1.1 |
| Ex. 45 | Synthesis Ex. 5 | 950 | 130 | 935 | 120 | 1.1 |
| Ex. 46 | Synthesis Ex. 6 | 945 | 125 | 935 | 120 | 1.1 |
| Ex. 47 | Synthesis Ex. 1 | 950 | 130 | 930 | 125 | 1.2 |
| Ex. 48 | Synthesis Ex. 1 | 945 | 130 | 930 | 120 | 1.3 |
| Comp. Ex. 60 | Comp. Synthesis Ex. 1 | 920 | 120 | 780 | 145 | 1.1 |
| Comp. Ex. 61 | Comp. Synthesis Ex. 2 | 910 | 135 | 760 | 180 | 1.1 |

As can be understood from Table 15, the photoreceptors of Examples 41 to 48 can maintain good charge properties even when repeatedly used.

Examples 49 and Comparative Examples 62 and 63

On three same aluminum cylinders, the following undercoat layer coating liquid was coated and then dried to form an undercoat layer having a thickness of 3.5 μm thereon.

| Formulation of undercoat layer coating liquid | |
|---|---|
| Titanium dioxide powder | 400 |
| Melamine resin | 65 |
| Alkyd resin | 120 |
| Methyl ethyl ketone | 400 |

Each of the following charge generation layer coating liquids was coated on the undercoat layer of the respective aluminum cylinder and then dried to form a charge generation layer having a thickness of 0.2 μm thereon.

| Formulation of charge generation layer coating liquids | |
|---|---|
| Each of TiOPc crystal of Synthesis Example 3 and Comparative Synthesis Examples 3 and 4 | 15 |
| Polyvinyl butyral | 10 |
| n-propyl acetate | 600 |

The coating liquid was prepared in the same way as that performed in Example 21.

The following charge transport layer coating liquid was coated on each of the charge generation layers and then dried to form a charge transport layer having a thickness of 28 μm thereon.

| Formulation of charge transport layer coating liquid | |
|---|---|
| Methylene chloride | 100 |
| Charge transport polymer having the following formula (t) | 10 |

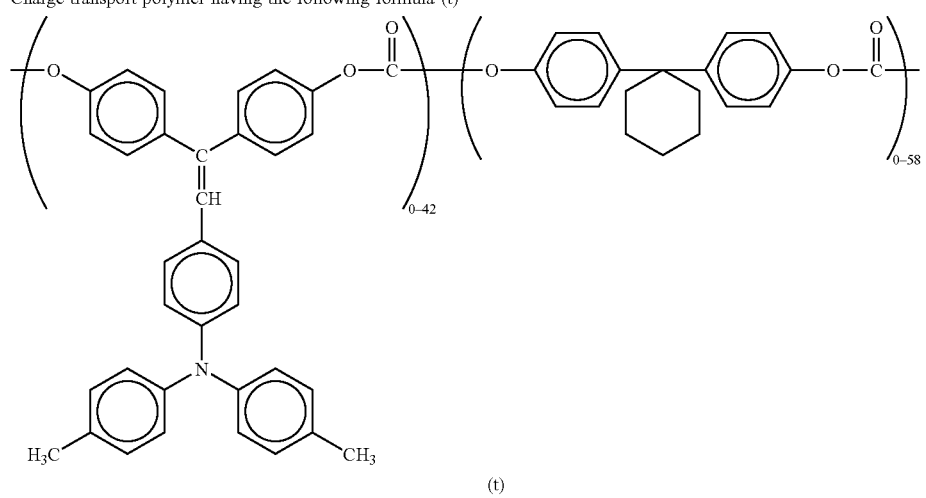

(t)

Thus photoreceptors of Example 49 and Comparative Examples 62 and 63 were prepared.

Example 50

The procedure for preparation of the photoreceptor in Example 49 was repeated except that the charge transport polymer in the charge transport layer coating liquid was replaced with a polymer having the following formula (u).

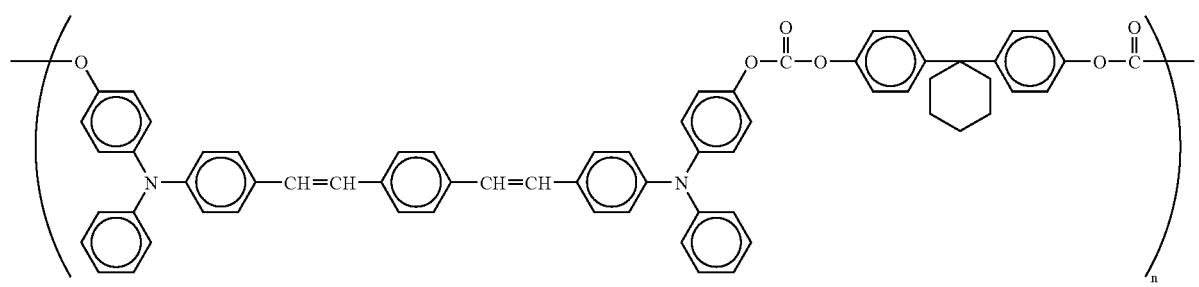

(u)

Thus a photoreceptor of Example 50 was prepared.

Comparative Example 64

The procedure for preparation of the photoreceptor in Example 49 was repeated except that the charge transport layer coating liquid was replaced with the following coating liquid.

| Formulation of charge transport layer coating liquid | |
|---|---|
| A-type polycarbonate | 10 |
| Methylene chloride | 80 |
| Charge transport material having the following formula (v) | 10 |

-continued

| Formulation of charge transport layer coating liquid |
|---|

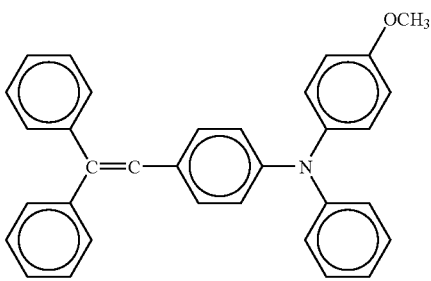

(v)

Thus a photoreceptor of Comparative Example 64 was prepared.

The thus prepared photoreceptors of Examples 49 and 50 and Comparative Examples 62 to 64 were subjected to a running test which is the same as that mentioned in Example 21 except that 50000 copies were continuously reproduced.

The results are shown in Table 16.

TABLE 16

|  | TiOPc crystal used | Image qualities (first copy) | Image qualities (50000th copy) |
|---|---|---|---|
| Ex. 49 | Synthesis Example 3 | Good | Good |
| Ex. 50 | Synthesis Example 3 | Good | Good |
| Comp. Ex. 62 | Comp. Synthesis Example 3 | Slight background fouling (but still acceptable) | Background fouling, and decrease of image density |
| Comp. Ex. 63 | Comp. Synthesis Example 4 | Slight background fouling (but still acceptable) | Background fouling, and decrease of image density |

TABLE 16-continued

|  | TiOPc crystal used | Image qualities (first copy) | Image qualities (50000th copy) |
|---|---|---|---|
| Comp. Ex. 64 | Synthesis Example 3 | Good | Black streaks caused by abrasion of photosensitive layer |

As can be understood from Table 16, the photoreceptors of Examples 49 and 50 can produce good images even when repeatedly used.

The photoreceptors of Example 49 and Comparative Example 64 were subjected to a running test in which 100000 copies were continuously produced, to measure the abrasion amount of the charge transport layer of each photoreceptor. As a result, the abrasion amount in the photoreceptor of Comparative Example 64 was about twice that in the photoreceptor of Example 49.

Example 51

On an aluminum cylinder, which had been subjected to an anodic oxidation treatment and then a sealing treatment, the following charge generation layer coating liquid and charge transport layer coating liquid were coated and then dried one by one in this order to prepare a charge generation layer of 0.2 μm and a charge transport layer of 20 μm.

| Formulation of charge generation layer coating liquid | |
|---|---|
| TiOPc crystal (synthesized in Synthesis Example 4) | 15 |
| Polyvinyl butyral | 10 |
| n-butyl acetate | 600 |

The charge generation layer coating liquid was prepared in the same way as that in Example 35.

| Formulation of charge transport layer coating liquid | |
|---|---|
| Methylene chloride | 100 |
| Charge transport polymer having the following formula (w) | 10 |

$$\left(\!\!O\!\!-\!\!\!\begin{array}{c}\text{Ar}_1\end{array}\!\!-\!\!O\!\!-\!\!\!\overset{O}{\underset{\parallel}{C}}\!\!\right)_{\!\!0\text{-}395}\!\!\left(\!\!O\!\!-\!\!\!\begin{array}{c}\text{Ar}_2\end{array}\!\!-\!\!O\!\!-\!\!\!\overset{O}{\underset{\parallel}{C}}\!\!\right)_{\!\!0\text{-}605}$$

(w)

Thus a photoreceptor of Example 51 was prepared.

Example 52

The procedure for preparation of the photoreceptor in Example 51 was repeated except that the charge transport polymer (w) in the charge transport layer coating liquid was replaced with a charge transport polymer having the following formula (x).

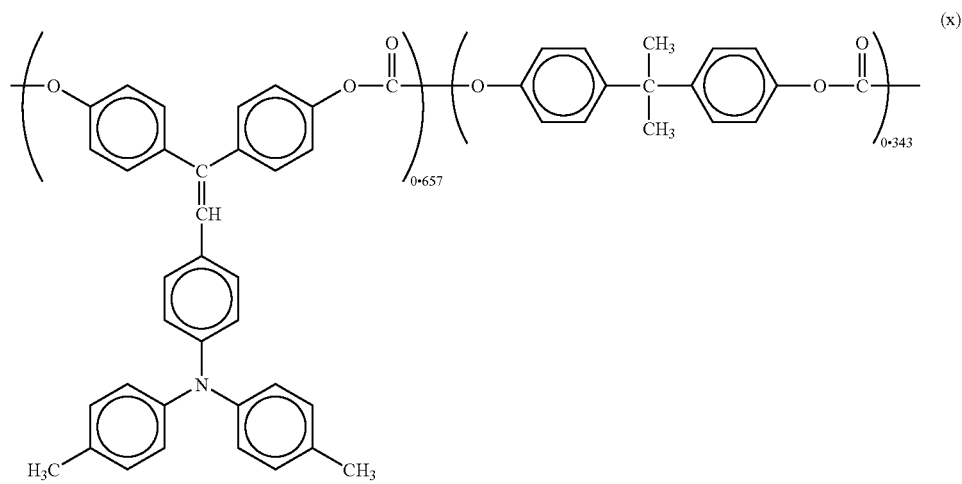

(x)

Thus a photoreceptor of Example 52 was prepared.

Example 53

The procedure for preparation of the photoreceptor in Example 51 was repeated except that the charge transport polymer (w) in the charge transport layer coating liquid was replaced with a charge transport polymer having the following formula (y).

| Formulation of charge generation layer coating liquid | |
|---|---|
| TiOPc crystal | 15 |
| (synthesized in Comparative Synthesis Example 5) | |
| Polyvinyl butyral | 10 |
| n-butyl acetate | 600 |

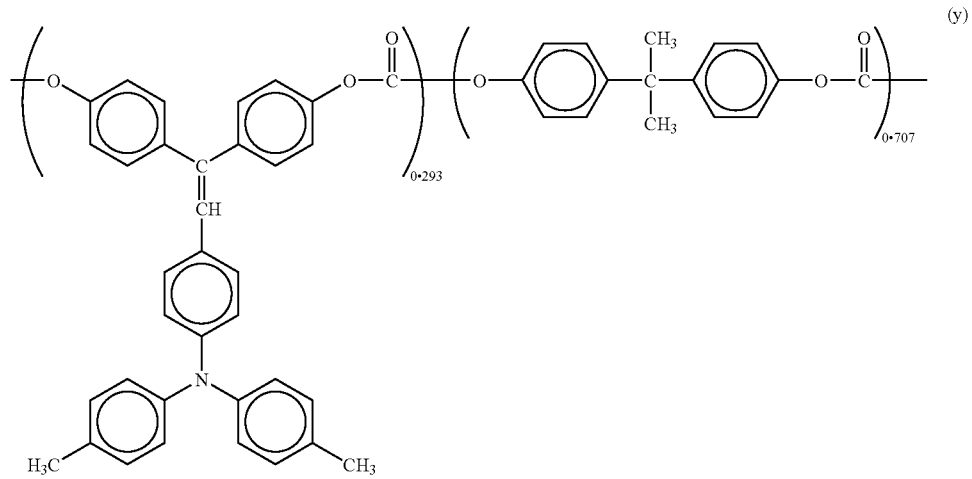

(y)

Thus a photoreceptor of Example 53 was prepared.

Comparative Example 65

The procedure for preparation of the photoreceptor in Example 51 was repeated except that the charge generation layer coating liquid was replaced with the following layer coating liquid.

The charge generation layer coating liquid was prepared in the same way as that in Example 35.

Thus a photoreceptor of Comparative Example 65 was prepared.

Comparative Example 66

The procedure for preparation of the photoreceptor in Example 51 was repeated except that the charge generation layer coating liquid was replaced with the following coating liquid.

| Formulation of charge generation layer coating liquid | |
|---|---|
| TiOPc crystal | 15 |
| (synthesized in Comparative Synthesis Example 6) | |
| Polyvinyl butyral | 10 |
| n-butyl acetate | 600 |

The charge generation layer coating liquid was prepared in the same way as that in Example 35.

Thus a photoreceptor of Comparative Example 66 was prepared.

The thus prepared photoreceptors of Examples 51 to 53 and Comparative Examples 65 and 66 were subjected to a running test which is the same as that mentioned in Example 35 except that 30000 copies were continuously reproduced.

The results are shown in Table 17.

TABLE 17

| | | Surface potential (Initial) | | Surface potential (after running test) | | Mobility |
|---|---|---|---|---|---|---|
| | TiOPc crystal used | Dark area (−V) | Light area (−V) | Dark area (−V) | Light area (−V) | (×10$^{-5}$) (cm$^2$/ V · sec) |
| Ex. 51 | Synthesis Ex. 4 | 960 | 140 | 955 | 140 | 1.1 |
| Ex. 52 | Synthesis Ex. 4 | 965 | 130 | 955 | 135 | 3.0 |
| Ex. 53 | Synthesis Ex. 4 | 960 | 150 | 960 | 185 | 0.5 |
| Comp. Ex. 65 | Comp. Synthesis Ex. 5 | 940 | 160 | 740 | 205 | 1.1 |
| Comp. Ex. 66 | Comp. Synthesis Ex. 6 | 930 | 165 | 720 | 185 | 1.1 |

As can be understood from Table 17, the photoreceptors of Examples 51 and 52 have good charge properties even when repeatedly used.

As can be understood from the above explanation, the photoreceptor of the present invention, which includes a TiOPc crystal having a specific X-ray diffraction spectrum as a charge generation material, and a charge transport layer including a low-molecular-weight charge transport material and an inactive polymer and having a mobility not less than $1 \times 10^{-5}$ cm/V·sec, can maintain high photosensitivity and good charge properties even when repeatedly used for a long time.

In addition, the photoreceptor of the present invention, which includes a TiOPc crystal having a specific X-ray diffraction spectrum in the charge generation layer, and a charge transport polymer in the charge transport layer, can maintain high photosensitivity and good charge properties even when repeatedly used for a long time. In addition, the photoreceptor has good abrasion resistance.

Further, it can be understood that the image forming method, process cartridge and apparatus of the present invention can produce good images without image defects such as background fouling and black streaks for a long period of time.

Having now fully described the invention, it will be apparent to one of ordinary skill in the art that many changes and modifications can be made thereto without departing from the spirit and scope of the invention as set forth therein.

This application is based on Japanese Patent Applications NOS. 11-125872, 11-164181 and 11-299145, filed on May 6, 1999, Jun. 10, 1999, and Oct. 21, 1999, respectively.

What is claimed as new and desired to be secured by Letters Patent of the United States is:

1. A titanyl phthalocyanine crystal having the X-ray diffraction spectrum of FIG. 8 when a specific X-ray of Cu—Kα having a wavelength of 1.542 Å irradiates the titanyl phthalocyanine crystal.

2. The titanyl phthalocyanine crystal according to claim 1, wherein the titanyl phthalocyanine crystal is obtained by:
dissolving a titanyl phthalocyanine powder in sulfuric acid, then
mixing the dissolved titanyl phthalocyanine powder with water to deposit a pigment, then
washing the pigment with water until a filtrate is neutral to form an amorphous titanyl phthalocyanine wet cake, and
subjecting the amorphous titanyl phthalocyanine wet cake to a crystal changing treatment in carbon disulfide and water.

3. The titanyl phthalocyanine crystal according to claim 2, wherein the titanyl phthalocyanine powder is obtained from a non-halogenated titanium compound.

4. The titanyl phthalocyanine crystal according to claim 2, wherein the amorphous titanyl phthalocyanine wet cake has a maximum diffraction peak at a Bragg (2θ) angle of 7.0±0.2° to 7.5±0.2° and a half-width of not less than 1° after drying.

5. A dispersion for a photosensitive layer of a photoreceptor, comprising:
the titanyl phthalocyanine crystal of claim 1.

6. The dispersion according to claim 5, further comprising:
at least one organic solvent selected from the group consisting of a ketone solvent and an ester solvent.

7. The dispersion according to claim 5, further comprising:
a binder resin comprising a polyvinyl acetal having a vinyl acetate unit ratio of not less than 4% by mol.

8. An electrophotographic photoreceptor, comprising:
an electroconductive substrate and a photosensitive layer,
wherein the photosensitive layer comprises a charge generation material and a charge transport material, and
wherein the charge generation material comprises the titanyl phthalocyanine crystal of claim 1.

9. The electrophotographic photoreceptor according to claim 8, wherein the photosensitive layer further comprises a binder resin comprising a polyvinyl acetal having a vinyl acetate unit ratio of not less than 4% by mol.

10. A method for manufacturing the titanyl phthalocyanine crystal of claim 1, comprising:
dissolving a titanyl phthalocyanine powder in sulfuric acid, then
mixing the dissolved titanyl phthalocyanine powder with water to deposit a pigment, then
washing the pigment with water until a filtrate is neutral to form an amorphous titanyl phthalocyanine wet cake,
subjecting the amorphous titanyl phthalocyanine wet cake to a crystal changing treatment in carbon disulfide and water.

11. The method according to claim 10, wherein the amorphous titanyl phthalocyanine wet cake has a maximum X-ray diffraction peak at a Bragg (2θ) angle of from 7.0°±0.2° to 7.5°±0.2° after drying.

12. The method of claim 10, further comprising:
deriving the titanyl-phthalocyanine powder from a non-halogenated titanium compound.

13. The method according to claim 11, wherein the maximum X-ray diffraction peak of the amorphous titanyl phthalocyanine wet cake has a half width of not less than 1° after drying.

14. The method of claim 10, wherein the crystal changing treatment of the amorphous titanyl phthalocyanine wet cake is subjected to a crystal changing treatment with an amount of carbon disulfide that is 10 times the amount of the amorphous titanyl phthalocyanine wet cake.

* * * * *